(12) United States Patent
Wang et al.

(10) Patent No.: US 7,826,074 B1
(45) Date of Patent: Nov. 2, 2010

(54) FAST EMBEDDED INTERACTION CODE PRINTING WITH CUSTOM POSTSCRIPT COMMANDS

(75) Inventors: Jian Wang, Beijing (CN); Hongyun Yang, Beijing (CN); Xiaohui Hou, Beijing (CN); Yongcheng Huang, Beijing (CN); Jiang Wu, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 1139 days.

(21) Appl. No.: 11/066,800

(22) Filed: Feb. 25, 2005

(51) Int. Cl.
G06F 17/00 (2006.01)
(52) U.S. Cl. .............. 358/1.13; 715/230; 715/231; 715/232; 715/233; 715/268
(58) Field of Classification Search .............. 358/1.15, 358/1.13, 1.11, 1.16; 235/487, 494, 375
See application file for complete search history.

(56) References Cited

U.S. PATENT DOCUMENTS

| | | |
|---|---|---|
| 4,686,329 A | 8/1987 | Joyce |
| 4,742,558 A | 5/1988 | Ishibashi et al. |
| 4,745,269 A | 5/1988 | Van Gils et al. |
| 4,829,583 A | 5/1989 | Monroe et al. |
| 4,941,124 A | 7/1990 | Skinner, Jr. |
| 5,032,924 A | 7/1991 | Brown et al. |
| 5,051,736 A | 9/1991 | Bennett et al. |
| 5,073,966 A | 12/1991 | Sato |
| 5,146,552 A | 9/1992 | Cassorla et al. |
| 5,153,928 A | 10/1992 | Iizuka |
| 5,181,257 A | 1/1993 | Steiner et al. |
| 5,196,875 A | 3/1993 | Stuckler |
| 5,235,654 A | 8/1993 | Anderson et al. |
| 5,243,149 A | 9/1993 | Comerford et al. |
| 5,247,137 A | 9/1993 | Epperson |
| 5,253,336 A | 10/1993 | Yamada |
| 5,280,289 A | 1/1994 | Root |
| 5,288,986 A | 2/1994 | Pine et al. |
| 5,294,792 A | 3/1994 | Lewis et al. |
| 5,335,150 A | 8/1994 | Huang |
| 5,365,598 A | 11/1994 | Sklarew |
| 5,394,487 A | 2/1995 | Burger et al. |

(Continued)

FOREIGN PATENT DOCUMENTS

CN 1303494 7/2001

(Continued)

OTHER PUBLICATIONS

U.S. Appl. No. 11/067,193, Yang.
U.S. Appl. No. 12/131,812, Wang.
U.S. Appl. No. 12/138,339, Wang.
U.S. Appl. No. 12/180,484, Wang.
U.S. Appl. No. 12/138,339, Wang et al.
"VPEN, Revolutionizing Human Interaction With the Digital World™," OTM Technologies, pp. 1-6, Jul. 15, 2002.

(Continued)

*Primary Examiner*—Edward L Coles
*Assistant Examiner*—Haris Sabah
(74) *Attorney, Agent, or Firm*—Perkins Coie LLP

(57) ABSTRACT

Processes and apparatuses print documents containing embedded interactive code (EIC) information by the use of custom postscript commands that are printer independent, with little overhead when printing, smaller print file size, and faster print times. In order to determine the postscript commands, the EIC array may be represented as a bit for every point, as EIC symbols in which each kind of EIC symbol is a glyph of a font, or as graphics procedures. The postscript approach may be selected based on memory and printing time requirements.

21 Claims, 28 Drawing Sheets

U.S. PATENT DOCUMENTS

| | | | |
|---|---|---|---|
| 5,398,082 A | 3/1995 | Henderson et al. | |
| 5,414,227 A | 5/1995 | Schubert et al. | |
| 5,414,538 A | 5/1995 | Eschbach | |
| 5,442,147 A | 8/1995 | Burns et al. | |
| 5,448,372 A | 9/1995 | Axman et al. | |
| 5,450,603 A | 9/1995 | Davies | |
| 5,454,054 A | 9/1995 | Iizuka | |
| 5,471,533 A | 11/1995 | Wang et al. | |
| 5,477,012 A | 12/1995 | Sekendur | |
| 5,511,156 A * | 4/1996 | Nagasaka | 358/1.1 |
| 5,546,515 A | 8/1996 | Mochizuki | |
| 5,581,637 A | 12/1996 | Cass et al. | |
| 5,581,682 A | 12/1996 | Anderson et al. | |
| 5,587,558 A | 12/1996 | Matsushima | |
| 5,612,524 A | 3/1997 | Sant'Anselmo et al. | |
| 5,626,620 A | 5/1997 | Kieval et al. | |
| 5,629,499 A | 5/1997 | Flickinger et al. | |
| 5,635,697 A | 6/1997 | Shellhammer et al. | |
| 5,644,652 A | 7/1997 | Bellegarda et al. | |
| 5,652,412 A | 7/1997 | Lazzouni et al. | |
| 5,661,291 A | 8/1997 | Ahearn et al. | |
| 5,661,506 A | 8/1997 | Lazzouni et al. | |
| 5,670,897 A | 9/1997 | Kean | |
| 5,686,718 A | 11/1997 | Iwai et al. | |
| 5,692,073 A | 11/1997 | Cass | |
| 5,719,884 A | 2/1998 | Roth et al. | |
| 5,721,940 A | 2/1998 | Luther et al. | |
| 5,726,435 A | 3/1998 | Hara et al. | |
| 5,727,098 A | 3/1998 | Jacobson | |
| 5,748,808 A | 5/1998 | Taguchi et al. | |
| 5,754,280 A | 5/1998 | Kato et al. | |
| 5,756,981 A | 5/1998 | Roustaei et al. | |
| 5,765,176 A | 6/1998 | Bloomberg | |
| 5,774,602 A | 6/1998 | Taguchi et al. | |
| 5,817,992 A * | 10/1998 | D'Antonio | 181/295 |
| 5,818,436 A | 10/1998 | Imai et al. | |
| 5,822,436 A | 10/1998 | Rhoads | |
| 5,822,465 A | 10/1998 | Normile et al. | |
| 5,825,015 A | 10/1998 | Chan | |
| 5,825,892 A | 10/1998 | Braudaway et al. | |
| 5,850,058 A | 12/1998 | Tano et al. | |
| 5,852,434 A | 12/1998 | Sekendur | |
| 5,855,483 A | 1/1999 | Collins et al. | |
| 5,855,594 A | 1/1999 | Olive et al. | |
| 5,875,264 A | 2/1999 | Carlstrom | |
| 5,890,177 A | 3/1999 | Moody et al. | |
| 5,897,648 A | 4/1999 | Henderson | |
| 5,898,166 A | 4/1999 | Fukuda et al. | |
| 5,902,968 A | 5/1999 | Sato et al. | |
| 5,937,110 A * | 8/1999 | Petrie et al. | 382/306 |
| 5,939,703 A | 8/1999 | Hecht et al. | |
| 5,960,124 A | 9/1999 | Taguchi et al. | |
| 5,961,571 A | 10/1999 | Gorr et al. | |
| 5,995,084 A | 11/1999 | Chan et al. | |
| 6,000,614 A | 12/1999 | Yang et al. | |
| 6,000,621 A | 12/1999 | Hecht et al. | |
| 6,000,946 A | 12/1999 | Snyders et al. | |
| 6,005,973 A | 12/1999 | Seybold et al. | |
| 6,014,462 A | 1/2000 | Yamakawa | |
| 6,041,335 A | 3/2000 | Merritt et al. | |
| 6,044,165 A | 3/2000 | Perona et al. | |
| 6,044,301 A | 3/2000 | Hartlaub et al. | |
| 6,052,481 A | 4/2000 | Grajski et al. | |
| 6,054,990 A | 4/2000 | Tran | |
| 6,076,734 A | 6/2000 | Dougherty et al. | |
| 6,081,261 A | 6/2000 | Wolff et al. | |
| 6,108,453 A | 8/2000 | Acharya | |
| 6,141,014 A | 10/2000 | Endo et al. | |
| 6,151,424 A | 11/2000 | Hsu | |
| 6,157,935 A | 12/2000 | Tran et al. | |
| 6,173,084 B1 | 1/2001 | Aach et al. | |
| 6,181,329 B1 | 1/2001 | Stork et al. | |
| 6,186,405 B1 | 2/2001 | Yoshioka | |
| 6,188,392 B1 | 2/2001 | O'Connor et al. | |
| 6,192,380 B1 | 2/2001 | Light et al. | |
| 6,202,060 B1 | 3/2001 | Tran | |
| 6,208,771 B1 | 3/2001 | Jared et al. | |
| 6,208,894 B1 | 3/2001 | Schulman et al. | |
| 6,219,149 B1 * | 4/2001 | Kawata et al. | 358/1.15 |
| 6,226,636 B1 | 5/2001 | Abdel-Mottaleb et al. | |
| 6,230,304 B1 | 5/2001 | Groeneveld et al. | |
| 6,243,071 B1 | 6/2001 | Shwarts et al. | |
| 6,249,614 B1 | 6/2001 | Kolesnik et al. | |
| 6,254,253 B1 | 7/2001 | Daum et al. | |
| 6,256,398 B1 | 7/2001 | Chang | |
| 6,259,827 B1 | 7/2001 | Nichani | |
| 6,278,968 B1 | 8/2001 | Franz et al. | |
| 6,294,775 B1 | 9/2001 | Seibel et al. | |
| 6,310,988 B1 | 10/2001 | Flores et al. | |
| 6,327,395 B1 | 12/2001 | Hecht et al. | |
| 6,330,976 B1 | 12/2001 | Dymetman et al. | |
| 6,335,727 B1 | 1/2002 | Morishita et al. | |
| 6,340,119 B2 | 1/2002 | He et al. | |
| 6,356,398 B1 | 3/2002 | Otsuki et al. | |
| 6,396,598 B1 | 5/2002 | Kashiwagi et al. | |
| 6,408,330 B1 | 6/2002 | DeLaHuerga | |
| 6,441,920 B1 * | 8/2002 | Smith | 358/1.2 |
| 6,479,768 B1 | 11/2002 | How | |
| 6,492,981 B1 | 12/2002 | Stork et al. | |
| 6,517,266 B2 | 2/2003 | Saund | |
| 6,522,928 B2 | 2/2003 | Whitehurst et al. | |
| 6,529,638 B1 | 3/2003 | Westerman | |
| 6,532,152 B1 | 3/2003 | White et al. | |
| 6,538,187 B2 | 3/2003 | Beigi | |
| 6,546,136 B1 | 4/2003 | Hull | |
| 6,551,357 B1 | 4/2003 | Madduri | |
| 6,558,006 B2 | 5/2003 | Ioka | |
| 6,560,741 B1 | 5/2003 | Gerety et al. | |
| 6,570,104 B1 | 5/2003 | Ericson et al. | |
| 6,573,887 B1 | 6/2003 | O'Donnell, Jr. | |
| 6,577,299 B1 | 6/2003 | Schiller et al. | |
| 6,580,424 B1 | 6/2003 | Krumm | |
| 6,584,052 B1 | 6/2003 | Phillips et al. | |
| 6,585,154 B1 | 7/2003 | Ostrover et al. | |
| 6,592,039 B1 | 7/2003 | Smith et al. | |
| 6,603,464 B1 | 8/2003 | Rabin | |
| 6,625,313 B1 | 9/2003 | Morita et al. | |
| 6,628,267 B2 | 9/2003 | Karidis et al. | |
| 6,650,320 B1 | 11/2003 | Zimmerman | |
| 6,651,894 B2 * | 11/2003 | Nimura et al. | 235/494 |
| 6,655,597 B1 | 12/2003 | Swartz et al. | |
| 6,661,920 B1 | 12/2003 | Skinner | |
| 6,663,008 B1 | 12/2003 | Pettersson et al. | |
| 6,671,386 B1 | 12/2003 | Shimizu et al. | |
| 6,674,427 B1 | 1/2004 | Pettersson et al. | |
| 6,681,045 B1 | 1/2004 | Lapstun et al. | |
| 6,686,910 B2 | 2/2004 | O'Donnell, Jr. | |
| 6,689,966 B2 | 2/2004 | Wiebe | |
| 6,693,615 B2 | 2/2004 | Hill et al. | |
| 6,697,056 B1 | 2/2004 | Bergelson et al. | |
| 6,728,000 B1 | 4/2004 | Lapstun et al. | |
| 6,729,543 B1 | 5/2004 | Arons et al. | |
| 6,731,271 B1 | 5/2004 | Tanaka et al. | |
| 6,732,927 B2 | 5/2004 | Olsson et al. | |
| 6,738,053 B1 | 5/2004 | Borgstrom et al. | |
| 6,744,967 B2 | 6/2004 | Kaminski et al. | |
| 6,752,317 B2 | 6/2004 | Dymetman et al. | |
| 6,760,009 B2 | 7/2004 | Omura et al. | |
| 6,783,069 B1 | 8/2004 | Hecht et al. | |
| 6,819,776 B2 | 11/2004 | Chang | |
| 6,831,273 B2 | 12/2004 | Jenkins et al. | |
| 6,832,724 B2 | 12/2004 | Yavid et al. | |
| 6,834,081 B2 | 12/2004 | Kim et al. | |
| 6,834,195 B2 | 12/2004 | Brandenberg et al. | |

| | | | | | |
|---|---|---|---|---|---|
| 6,834,337 B1 | 12/2004 | Mitchell et al. | 7,502,508 B2 | 3/2009 | Wang et al. |
| 6,847,356 B1 | 1/2005 | Hasegawa et al. | 7,505,982 B2 | 3/2009 | Wang et al. |
| 6,856,712 B2 | 2/2005 | Fauver et al. | 7,528,848 B2 | 5/2009 | Xu et al. |
| 6,862,371 B2 | 3/2005 | Mukherjee | 7,532,366 B1 | 5/2009 | Yang et al. |
| 6,864,880 B2 | 3/2005 | Hugosson et al. | 7,536,051 B2 | 5/2009 | Lin et al. |
| 6,865,325 B2 | 3/2005 | Ide et al. | 7,542,976 B2 | 6/2009 | Wang et al. |
| 6,870,966 B1 | 3/2005 | Silverbrook et al. | 7,546,524 B1 | 6/2009 | Bryar et al. |
| 6,874,420 B2 | 4/2005 | Lewis, Jr. et al. | 7,570,813 B2 | 8/2009 | Wang et al. |
| 6,879,731 B2 | 4/2005 | Kang et al. | 7,580,576 B2 | 8/2009 | Wang et al. |
| 6,880,124 B1 | 4/2005 | Moore | 7,583,842 B2 | 9/2009 | Lin et al. |
| 6,880,755 B2 | 4/2005 | Gorbet et al. | 2001/0023896 A1 | 9/2001 | He et al. |
| 6,897,854 B2 | 5/2005 | Cho et al. | 2001/0024193 A1* | 9/2001 | Fahraeus ............... 345/173 |
| 6,898,297 B2 | 5/2005 | Katsura et al. | 2001/0037132 A1 | 11/2001 | Whitehurst et al. |
| 6,919,892 B1 | 7/2005 | Cheiky et al. | 2001/0038383 A1 | 11/2001 | Ericson et al. |
| 6,929,183 B2 | 8/2005 | Pettersson | 2001/0038711 A1 | 11/2001 | Williams et al. |
| 6,933,933 B2 | 8/2005 | Fleming | 2001/0053238 A1 | 12/2001 | Katsura et al. |
| 6,935,562 B2 | 8/2005 | Hecht et al. | 2002/0000981 A1 | 1/2002 | Hugosson et al. |
| 6,938,222 B2 | 8/2005 | Hullender et al. | 2002/0020750 A1 | 2/2002 | Dymetman et al. |
| 6,956,968 B1 | 10/2005 | O'Dell et al. | 2002/0024499 A1 | 2/2002 | Karidis et al. |
| 6,960,777 B2 | 11/2005 | Soar | 2002/0028018 A1 | 3/2002 | Hawkins et al. |
| 6,964,483 B2 | 11/2005 | Wang et al. | 2002/0031622 A1 | 3/2002 | Ippel et al. |
| 6,968,083 B2 | 11/2005 | Williams et al. | 2002/0048404 A1 | 4/2002 | Fahraeus et al. |
| 6,970,183 B1 | 11/2005 | Monroe | 2002/0050982 A1* | 5/2002 | Ericson ............... 345/173 |
| 6,975,334 B1 | 12/2005 | Barrus | 2002/0064341 A1 | 5/2002 | Fauver et al. |
| 6,976,220 B1 | 12/2005 | Lapstun et al. | 2002/0069220 A1 | 6/2002 | Tran |
| 6,987,534 B1 | 1/2006 | Seta | 2002/0071488 A1 | 6/2002 | Kim et al. |
| 6,992,655 B2 | 1/2006 | Ericson et al. | 2002/0125324 A1 | 9/2002 | Yavid et al. |
| 6,993,185 B2 | 1/2006 | Guo et al. | 2002/0148655 A1 | 10/2002 | Cho et al. |
| 6,999,622 B2 | 2/2006 | Komatsu | 2002/0163510 A1 | 11/2002 | Williams et al. |
| 7,003,150 B2 | 2/2006 | Trajkovic | 2002/0163511 A1 | 11/2002 | Sekendur |
| 7,009,594 B2 | 3/2006 | Wang et al. | 2002/0179717 A1 | 12/2002 | Cummings et al. |
| 7,012,621 B2 | 3/2006 | Crosby et al. | 2002/0180869 A1 | 12/2002 | Callison et al. |
| 7,024,429 B2 | 4/2006 | Ngo et al. | 2003/0001020 A1* | 1/2003 | Kardach ............... 235/494 |
| 7,036,938 B2 | 5/2006 | Wang et al. | 2003/0007661 A1* | 1/2003 | Noguchi ............... 382/100 |
| 7,048,198 B2 | 5/2006 | Ladas et al. | 2003/0009725 A1 | 1/2003 | Reichenbach |
| 7,082,562 B2 | 7/2006 | Lapstun et al. | 2003/0030638 A1 | 2/2003 | Astrom et al. |
| 7,092,122 B2 | 8/2006 | Iwaki | 2003/0034961 A1 | 2/2003 | Kao |
| 7,110,604 B2 | 9/2006 | Olsson | 2003/0050803 A1 | 3/2003 | Marchosky |
| 7,111,230 B2 | 9/2006 | Euchner et al. | 2003/0063045 A1 | 4/2003 | Fleming |
| 7,116,840 B2 | 10/2006 | Wang et al. | 2003/0063072 A1 | 4/2003 | Brandenberg et al. |
| 7,119,816 B2 | 10/2006 | Zhang et al. | 2003/0081000 A1 | 5/2003 | Watanabe et al. |
| 7,120,853 B2 | 10/2006 | Lapstun et al. | 2003/0086602 A1 | 5/2003 | Trajkovic |
| 7,123,742 B2 | 10/2006 | Chang | 2003/0088781 A1 | 5/2003 | ShamRao |
| 7,133,031 B2 | 11/2006 | Wang et al. | 2003/0090475 A1 | 5/2003 | Paul et al. |
| 7,133,563 B2 | 11/2006 | Wang et al. | 2003/0095098 A1 | 5/2003 | Paul et al. |
| 7,136,054 B2 | 11/2006 | Wang et al. | 2003/0103221 A1* | 6/2003 | Natori ............... 358/1.9 |
| 7,139,740 B2 | 11/2006 | Ayala | 2003/0105817 A1 | 6/2003 | Lapstun et al. |
| 7,142,197 B2 | 11/2006 | Wang et al. | 2003/0117378 A1 | 6/2003 | Carro |
| 7,142,257 B2 | 11/2006 | Callison et al. | 2003/0118233 A1 | 6/2003 | Olsson |
| 7,145,556 B2 | 12/2006 | Pettersson | 2003/0128194 A1 | 7/2003 | Pettersson |
| 7,167,164 B2 | 1/2007 | Ericson et al. | 2003/0146883 A1 | 8/2003 | Zelitt |
| 7,176,906 B2 | 2/2007 | Williams et al. | 2003/0159044 A1 | 8/2003 | Doyle et al. |
| 7,190,843 B2 | 3/2007 | Wei et al. | 2003/0179906 A1 | 9/2003 | Baker et al. |
| 7,222,799 B2 | 5/2007 | Silverbrook | 2003/0189731 A1 | 10/2003 | Chang |
| 7,225,979 B2 | 6/2007 | Silverbrook et al. | 2003/0193515 A1 | 10/2003 | Hill et al. |
| 7,262,764 B2 | 8/2007 | Wang et al. | 2003/0214553 A1 | 11/2003 | Dodge |
| 7,263,224 B2 | 8/2007 | Wang et al. | 2003/0214669 A1* | 11/2003 | Saitoh ............... 358/1.15 |
| 7,289,103 B2 | 10/2007 | Lapstun et al. | 2004/0032393 A1 | 2/2004 | Brandenberg et al. |
| 7,292,370 B2 | 11/2007 | Iwaki | 2004/0046744 A1 | 3/2004 | Rafii et al. |
| 7,293,240 B2 | 11/2007 | Lapstun et al. | 2004/0056191 A1 | 3/2004 | Jenkins et al. |
| 7,295,193 B2 | 11/2007 | Fahraeus | 2004/0085286 A1 | 5/2004 | Wang et al. |
| 7,330,605 B2 | 2/2008 | Wang et al. | 2004/0085287 A1 | 5/2004 | Wang et al. |
| 7,359,094 B1* | 4/2008 | Sayuda ............... 358/3.28 | 2004/0085302 A1 | 5/2004 | Wang et al. |
| 7,386,191 B2 | 6/2008 | Wang et al. | 2004/0086181 A1 | 5/2004 | Wang et al. |
| 7,400,777 B2 | 7/2008 | Wang et al. | 2004/0086191 A1 | 5/2004 | Wang et al. |
| 7,403,658 B2 | 7/2008 | Lin et al. | 2004/0090429 A1 | 5/2004 | Geaghan et al. |
| 7,421,439 B2 | 9/2008 | Wang et al. | 2004/0128264 A1 | 7/2004 | Leung et al. |
| 7,430,497 B2 | 9/2008 | Wang et al. | 2004/0128511 A1 | 7/2004 | Sun et al. |
| 7,440,583 B2 | 10/2008 | Tohne et al. | 2004/0136083 A1 | 7/2004 | Wang et al. |
| 7,463,784 B2 | 12/2008 | Kugo | 2004/0140964 A1 | 7/2004 | Wang et al. |
| 7,477,784 B2 | 1/2009 | Wang et al. | 2004/0140965 A1 | 7/2004 | Wang et al. |
| 7,486,822 B2 | 2/2009 | Wang et al. | 2004/0143559 A1 | 7/2004 | Ayala |
| 7,486,823 B2 | 2/2009 | Wang et al. | 2004/0153649 A1 | 8/2004 | Rhoads et al. |

| | | | | | | |
|---|---|---|---|---|---|---|
| 2004/0189674 | A1 | 9/2004 | Zhang et al. | WO | WO-9965568 | 12/1999 |
| 2004/0212553 | A1 | 10/2004 | Wang et al. | WO | WO-0025293 | 5/2000 |
| 2004/0218830 | A1 | 11/2004 | Kang et al. | WO | WO-0072247 | 11/2000 |
| 2004/0233163 | A1 | 11/2004 | Lapstun et al. | WO | WO-0073983 | 12/2000 |
| 2005/0024324 | A1 | 2/2005 | Tomasi et al. | WO | WO-0126032 | 4/2001 |
| 2005/0044164 | A1 | 2/2005 | O'Farrell et al. | WO | WO-0148685 | 7/2001 |
| 2005/0052469 | A1 | 3/2005 | Crosby et al. | WO | WO-0171654 | 9/2001 |
| 2005/0052700 | A1 | 3/2005 | Mackenzie et al. | WO | WO-02077870 | 10/2002 |
| 2005/0104909 | A1 | 5/2005 | Okamura et al. | WO | WO-03/038741 | 5/2003 |
| 2005/0106365 | A1 | 5/2005 | Palmer et al. | WO | WO-2005106638 | 11/2005 |
| 2005/0138541 | A1* | 6/2005 | Euchner et al. ............. 715/512 | | | |
| 2005/0146518 | A1 | 7/2005 | Wang et al. | | | |
| 2005/0147281 | A1 | 7/2005 | Wang et al. | | | |
| 2005/0193292 | A1 | 9/2005 | Lin et al. | | | |
| 2005/0201621 | A1 | 9/2005 | Wang et al. | | | |
| 2006/0082557 | A1 | 4/2006 | Ericson et al. | | | |
| 2006/0109263 | A1 | 5/2006 | Wang et al. | | | |
| 2006/0123049 | A1 | 6/2006 | Wang et al. | | | |
| 2006/0125805 | A1 | 6/2006 | Marggraff | | | |
| 2006/0182309 | A1 | 8/2006 | Wang et al. | | | |
| 2006/0182343 | A1 | 8/2006 | Lin et al. | | | |
| 2006/0190818 | A1 | 8/2006 | Wang et al. | | | |
| 2006/0204101 | A1 | 9/2006 | Wang et al. | | | |
| 2006/0215913 | A1 | 9/2006 | Wang et al. | | | |
| 2006/0242560 | A1 | 10/2006 | Wang et al. | | | |
| 2006/0242562 | A1 | 10/2006 | Wang et al. | | | |
| 2006/0242622 | A1 | 10/2006 | Wang et al. | | | |
| 2006/0267965 | A1 | 11/2006 | Clary | | | |
| 2006/0269134 | A1 | 11/2006 | Wang et al. | | | |
| 2006/0274948 | A1 | 12/2006 | Wang et al. | | | |
| 2007/0001950 | A1 | 1/2007 | Zhang et al. | | | |
| 2007/0003150 | A1 | 1/2007 | Xu et al. | | | |
| 2007/0041654 | A1 | 2/2007 | Wang et al. | | | |
| 2007/0042165 | A1 | 2/2007 | Wang et al. | | | |
| 2008/0025612 | A1 | 1/2008 | Wang et al. | | | |
| 2009/0027241 | A1 | 1/2009 | Wang et al. | | | |
| 2009/0110308 | A1 | 4/2009 | Wang et al. | | | |
| 2009/0119573 | A1 | 5/2009 | Wang et al. | | | |

FOREIGN PATENT DOCUMENTS

| | | |
|---|---|---|
| CN | 1352778 | 6/2002 |
| CN | 3143455 | 9/2003 |
| CN | 200610092487 | 9/2003 |
| EP | 0407734 | 1/1991 |
| EP | 0439682 | 8/1991 |
| EP | 0564708 | 10/1993 |
| EP | 0670555 | 9/1995 |
| EP | 0694870 | 1/1996 |
| EP | 0717368 | 6/1996 |
| EP | 0732666 | 9/1996 |
| EP | 0865166 | 9/1998 |
| EP | 1154377 | 11/2001 |
| EP | 1158456 | 11/2001 |
| EP | 1168231 | 1/2002 |
| EP | 1276073 | 1/2003 |
| EP | 1416435 | 5/2004 |
| GB | 2393149 | 3/2004 |
| JP | 63165584 | 7/1988 |
| JP | 04253087 | 9/1992 |
| JP | 06006316 | 1/1994 |
| JP | 06209482 | 7/1994 |
| JP | 06230886 | 8/1994 |
| JP | 07020812 | 1/1995 |
| JP | 07225564 | 8/1995 |
| JP | 10215450 | 8/1998 |
| JP | 11308112 | 11/1999 |
| JP | 2000131640 | 5/2000 |
| JP | 2002529796 | 9/2000 |
| JP | 2002082763 | 3/2002 |
| JP | 2002108551 | 4/2002 |
| WO | WO-9630217 | 10/1996 |
| WO | WO-9960469 | 11/1999 |

OTHER PUBLICATIONS

Brush, A.J. et al., "Robust Annotation Positioning in Digital Documents," SIGCHI '01, Mar. 31-Apr. 4, 2001, ACM, Seattle, Washington, USA, pp. 285-292.

Cai, Z., "A New Decode Algorithm for Binary Bar Codes," Pattern Recognition Letters 15 (Dec. 1994), pp. 1191-1199.

Champaneria, "PADCAM: A Real-Time, Human-Centric Notetaking System," MIT Laboratory for Computer Science, Mar. 2002.

Clark et al., "Maximal and Near-Maximal Shift Register Sequences: Efficient Event Counters and Easy Discrete Logarithms," IEEE Transactions on Computers vol. 43, No. 5, pp. 560-568, May 1994.

Cotting, D. et al., "Embedding Imperceptible Patterns into Projected Images for Simultaneous Acquisition and Display," Proceedings of the Third IEEE and ACM International Symposium on Mixed and Augmented Reality, Nov. 2-5, 2004, IEEE Computer Society, Washington, DC, pp. 100-109.

Crowley et al., "*Thingss That See*," Communications of the A.C.M., vol. 43, No. 3, pp. 54-64, Mar. 2000.

Decurtins, C. et al., "Digital Annotation of Printed Documents," Proceedings of the Twelfth International Conference on Information and Knowledge Management Nov. 3-8, New Orleans, Louisiana, United States, CIKM'03. ACM 2003, pp. 552-555.

Dey, et al., "A Fast Algorithm for Computing the Euler Number of an Image and its VLSI Implementation," IEEE; 13th International Conference on VLSI Design, Jan. 2003.

Dumer et al., "Hardness of Approximating the Minimum Distance of a Linear Code," IEEE Symposium of Foundations of Computer Science, pp. 475-485, 1999.

European Search Report for Application No. EP 03021235; Applicant: Microsoft Corporation; Date of Mailing: Jun. 1, 2005 (2 pages).

European Search Report for Application No. EP 03021852; Applicant: Microsoft Corporation; Date of Mailing: Mar. 2, 2004 (3 pages).

European Search Report for Application No. EP 05000170.0-1527; Applicant: Microsoft Corporation; Date of Mailing: Jan. 6, 2005 (7 pages).

European Search Report for Application No. 03021224.5; Applicant: Microsoft Corporation; Date of Mailing: Jun. 1, 2005 (3 pages).

European Search Report for Application No. 03021236.9; Applicant: Microsoft Corporation; Date of Mailing: Sep. 16, 2005 (5 Pages).

European Search Report for Application No. 03021237.7-1527, Applicant: Microsoft Corporation; Date of Mailing: Jan. 6, 2005 (4 pages).

European Search Report for Application No. EP050000749; Applicant: Microsoft Corporation; Date of Mailing: Apr. 26, 2007 (2 pages).

European Search Report, Application No. 03021238.5-1527; Applicant: Microsoft Corporation; Date of Mailing: Jun. 1, 2005 (6 pages).

Fujieda et al., "Development of Pen-Shaped Scanners," Nec, vol. 51, No. 10, 1998.

Golovchinsky, G. and Denoue, L., "Moving Markup: Repositioning Freeform Annotations," UIST '02, Oct. 27-30, 2002, Paris, France, vol. 4, Issue 2, pp. 21-24.

Gonzalez, Rafael et al., "Digital Image Processing," Table of Contents and Preface, Second Edition, Prentice Hall, Upper Saddle River, New Jersey, 2002 (13 pages).

Grasso et al., "Augmenting Recommender Systems by Embedding Interfaces into Practices," pp. 267-275, 1999.

Guerrero, J.J. and Sagues, C. "From Lines to Homographies Between Uncalibrated Images," IX Symposium on Pattern Recognition and Image Analysis, VO4, 233-240, 2001.

Haynes, "Wacom PL-500," www.wacom.co.uk, Jul. 15, 2002.

Hecht, D.L., "Printed embedded data graphical user interfaces," Computer vol. 34, Issue 3, Mar. 2001, pp. 47-55.

IEEExplore # Search Session History, May 7, 2008, http://ieee.org/search/history.jsp, 1 page.

International Search Report for Application No. PCT/US2006/032230; Applicant: Microsoft Corporation; Date of Mailing: Jan. 9, 2007 (3 pages).

Internet Print Out: "(Electro-Magnetic Resonance) send and position sensing technology," Wacom, Technology, http://www.wacom-components.com/tech.asp, pp. 1-6, Jul. 15, 2002.

Internet Print Out: "Anoto Pen Bluetooth," Tabletpccorner, http://www.tabletpccorner.net, dated Sep. 5, 2003.

Internet Print Out: "Competitive Technologies' Investee Introduces N-Scribe Pen—Digital Ink Presents Wireless Pen At Demo 2001," Competitive Technologies, http://www.competitivetech, dated Sep. 5, 2003.

Internet Print Out: "Cordless Batteryless Pen," Wacom Penabled, Components, http://www.wacom.com/components/index.cfm, dated Jul. 15, 2002.

Internet Print Out: "DataGlyphs®: Embedding Digital Data," Parc Solutions, http://www.parc.com/solutions/dataglyphs/, dated Jul. 15, 2002.

Internet Print Out: "Digital Pens," http://www.anotofunctionality.com/navigate.asp?PageID=96, pp. 1-70, Sep. 26, 2002.

Internet Print Out: "Jot This—Nscribe Pen," PC Magazine, http://ww.pcmag.com/article2/0,4149,316500,00.asp, dated Jul. 15, 2002.

Internet Print Out: "Jot This—Nscribe Pen," PC Magazine, http://ww.pcmag.com/article2/0,4149,316500,00.asp, dated Sep. 5, 2003.

Internet Print Out: "Maxell Digital Pen to use Anoto System," Gizmo, http://www.gizmo.com.au/, dated Sep. 5, 2003.

Internet Print Out: "Mimio—Products," Mimio, http://www.mimio.com, pp. 1-8, Sep. 5, 2003.

Internet Print Out: "*N-Scribe for Digital Writing*," Flash Commerce News, http://flashcommerce.com/articles/, dated Sep. 5, 2003.

Internet Print Out: "N-Scribe for Digital Writing," Mobileinfo.com, News issue #2001—15 (Apr. 2001), http://www.mobileinfo.com/News_2001/Issue15/Digital-nscribe.htm, dated Jul. 15, 2002.

Internet Print Out: "Navilite—Optical Opportunities—Bluetooth-enabled optical transition measurement technology paves the way for an untethered stylus that can write on any surface," vol. 8, Issue No. 34, Jul. 5-11, 2002. www.computerworld.com, dated Aug. 15, 2002.

Internet Print Out: "OTM Technologies—V Pen," searched http://www.otmtech.com/vpen3.asp, pp. 1-7, Jul. 15, 2002.

Internet Print Out: "PL-500—15.1 inch Screen Digital LCD Pen Tablet System," Wacom Graphics Tablet Solution, http://ap.wacm.co.jp/products/pl/contents/pl500.html, pp. 1-13, 2002.

Internet Print Out: "Preprocessing in the Npen++ System," http://www.is.cs.cmu.edu/mie/multimodal_npen_preproc.html, dated Aug. 8, 2002.

Internet Print Out: "RF Pen Sends Your Scribbles," Appliance Manufacturing Magazine, http://www.ammagazine.com. Dated Sep. 26, 2002.

Internet Print Out: "SMART Board Interactive Whiteboard," Smarttech, http://www.smarttech.com, pp. 1-26, Sep. 5, 2003.

Internet Print Out: "The Hot New Medium: Paper—How the Oldest Interface in the Book is Redrawing the Map of the Networked World," http://www.wired.com/wired/, dated Sep. 5, 2003.

Internet Print Out: "Anoto functionality," News, dated Jul. 15, 2002.

Internet Print Out: "Anoto functionality," Showroom, dated Jul. 15, 2002.

Internet Print Out: "ChatPen CHA-30," Digital Pens, Anoto Functionality, dated Jul. 15, 2002.

Internet Print Out: "Cintig18SX—A Powerful New Way to Work Directly on the Screen," Wacom Technology, Cintiq-Interactive Pen Display, dated Sep. 5, 2003.

Internet Print Out: "Communicate Digitally With Ordinary Pen and Paper," Anoto Functionality, dated Jul. 15, 2002.

Internet Print Out: "Creating a Global De Facto Standard," Anoto Functionality, dated Jul. 15, 2002.

Internet Print Out: "Daily News," dated Aug. 15, 2002.

Internet Print Out: "Digital Pens and Technical Data," Anoto Functionality, dated Jul. 15, 2002.

Internet Print Out: "Downloads," Anoto Functionality, dated Jul. 15, 2002.

Internet Print Out: "Optical Translation Measurement (OTM™)," Technologies, dated Jul. 15, 2002.

Internet Print Out: "Partners Supporting Anoto Functionality," Anoto Functionality, dated 15, 2002.

Internet Print Out: "Possibilities," Anoto Functionality, dated Jul. 15, 2002.

Internet Print Out: "Product VPen™," OTM Technologies, dated Jul. 15, 2002.

Internet Print Out: "Products—Get Everyone on the Same Page," Mimio, dated Sep. 5, 2003.

Internet Print Out: "Sensor Board and Pen," Wacom, Product, dated Jul. 15, 2002.

Internet Print Out: "The Solution," Anoto Functionality, dated Jul. 15, 2002.

Internet Print Out: "Vision and Mission," Anoto Functionality, dated Jul. 15, 2002.

Internet Print Out: "Wacom Displays Pressure-Sensitive Pen Sensor for Tablet PCs," Wacom, News, dated Jul. 15, 2002.

Internet Print Out: "Welcome to www.anoto.com," Anoto, dated Jul. 15, 2002.

Internet Printout—http://www.anoto.com: Construction, Sep. 5, 2003.

Internet Printout—http://www.anoto.com: Page template, Sep. 5, 2003.

Internet Printout—http://www.anoto.com: Paper and Printing, Sep. 5, 2003.

Internet Printout—http://www.anoto.com: Paper space, Sep. 5, 2003.

Internet Printout—http://www.anoto.com: Pattern, Sep. 5, 2003.

Internet Printout—http://www.anoto.com: Printers supporting Anoto functionality, Sep. 5, 2003.

Internet Printout—http://www.anotofunctionality.com: Anoto Functionality—Anoto pattern & digital paper, Sep. 26, 2002.

Internet Printout—http://www.anotofunctionality.com: Anoto Functionality—Anoto pattern & digital paper, Sep. 5, 2003.

Internet Printout—http://www.anotofunctionality.com: Anoto Functionality—Applications, Sep. 5, 2003.

Internet Printout—http://www.anotofunctionality.com: Anoto Functionality—Corporate applications, Sep. 5, 2003.

Internet Printout—http://www.anotofunctionality.com: Anoto Functionality—Digital notes, Sep. 5, 2003.

Internet Printout—http://www.anotofunctionality.com: Anoto Functionality—Digital paper, Sep. 26, 2002.

Internet Printout—http://www.anotofunctionality.com: Anoto Functionality—Digital paper, Sep. 5, 2003.

Internet Printout—http://www.anotofunctionality.com: Anoto Functionality—Digital pens Use with mobile phones, Sep. 5, 2003.

Internet Printout—http://www.anotofunctionality.com: Anoto Functionality—Digital Pens Use with personal computers, Sep. 26, 2002.

Internet Printout—http://www.anotofunctionality.com: Anoto Functionality—Digital Pens, Sep. 26, 2002.

Internet Printout—http://www.anotofunctionality.com: Anoto Functionality—Digital pens, Sep. 5, 2003.

Internet Printout—http://www.anotofunctionality.com: Anoto Functionality—Digital service, Sep. 26, 2002.

Internet Printout—http://www.anotofunctionality.com: Anoto Functionality—Digital service, Sep. 5, 2003.

Internet Printout—http://www.anotofunctionality.com: Anoto Functionality—E-mail, Sep. 5, 2003.

Internet Printout—http://www.anotofunctionality.com: Anoto Functionality—Fax, Sep. 5, 2003.

Internet Printout—http://www.anotofunctionality.com: Anoto Functionality—Freedom of expression, Sep. 26, 2002.

Internet Printout—http://www.anotofunctionality.com: Anoto Functionality—Graphical SMS, Sep. 5, 2003.

Internet Printout—http://www.anotofunctionality.com: Anoto Functionality—Hints & tips Using your digital paper, Sep. 5, 2003.

Internet Printout—http://www.anotofunctionality.com: Anoto Functionality—Hints & tips Using your digital pen, Sep. 5, 2003.

Internet Printout—http://www.anotofunctionality.com: Anoto Functionality—Hints & tips Using Your Digital Service, Sep. 5, 2003.
Internet Printout—http://www.anotofunctionality.com: Anoto Functionality—Hints & tips, Sep. 5, 2003.
Internet Printout—http://www.anotofunctionality.com: Anoto Functionality—How does it work?, Sep. 26, 2002.
Internet Printout—http://www.anotofunctionality.com: Anoto Functionality—Security, Sep. 5, 2003.
Internet Printout—http://www.anotofunctionality.com: Anoto Functionality—Software and additionals, Sep. 5, 2003.
Internet Printout—http://www.anotofunctionality.com: Anoto Functionality—What is Anoto functionality?, Sep. 5, 2003.
Internet Printout—http://www.anotofunctionality.com: Anoto Functionality—You to an organization, Sep. 26, 2002.
Internet Printout—http://www.anotofunctionality.com: Anoto Functionality—You to someone else, Sep. 26, 2002.
Internet Printout—http://www.anotofunctionality.com: Anoto Functionality—You to yourself, Sep. 26, 2002.
Internet Printout—http://www.anotofunctionality.com: Anoto® functionality brings digital life to paper products, Sep. 5, 2003.
Internet Printout—http://www.edgereview.com: The Edge—First Look: Digital Ink n-scribe, Sep. 5, 2003.
Internet Printout—http://www.flashcommerce.com: n-scribe for Digital Writing, Sep. 5, 2003.
Internet Printout—http://www.gizmo.com: Maxell Digital Pen to use Anoto system, Sep. 5, 2003.
Internet Printout—http://www.is.cs.cmu.edu: Final input representation, Aug. 8, 2002.
Internet Printout—http://www.is.cs.cmu.edu: Npen++, Aug. 8, 2002.
Internet Printout—http://www.mimio.com: Capture, Save and Share, Sep. 5, 2003.
Internet Printout—http://www.mimio.com: Mimio technology, Sep. 5, 2003.
Internet Printout—http://www.mimio.com: Turn your whiteboard into an interactive whiteboard, Sep. 5, 2003.
Internet Printout—http://www.pcmag.com: Jot This, Sep. 5, 2003.
Internet Printout—http://www.smarttech.com: Carnegie Mellon research ranks the SMART Board™ interactive whiteboard as fastest, most accurate way to interact with projected information, Sep. 5, 2003.
Internet Printout—http://www.smarttech.com: SMART Board Interactive Whiteboard—Front Projection Features, Sep. 5, 2003.
Internet Printout—http://www.smarttech.com: SMART Board Interactive Whiteboard—Q&A, Sep. 5, 2003.
Internet Printout—http://www.smarttech.com: SMART Board Interactive Whiteboard, Sep. 5, 2003.
Internet Printout—http://www.smarttech.com: SMART Camfire™, whiteboard camera system effortlessly saves dry-erase whiteboard notes, Sep. 5, 2003.
Internet Printout—http://www.smarttech.com: SMART Technologies Inc. awarded another U.S. patent for touch sensitive SMART Board™ technology, Sep. 5, 2003.
Internet Printout—http://www.smarttech.com: SMART Technologies, Inc. Press Releases, Sep. 5, 2003.
Internet Printout—http://www.smarttech.com: SMART Technologies, Inc., New annotation and software functionality on all SMART Board™ Interactive Whiteboards, Sep. 5, 2003.
Internet Printout—http://www.smarttech.com: What's New, Sep. 5, 2003.
Internet Printout—http://www.smarttech.com: Press Releases—SMART launches Research Assistance Program, Sep. 5, 2003.
Internet Printout—http://www.smarttech.com: SMART Board Interactive Whiteboard Profiles—Sep. 5, 2003.
Internet Printout—http://www.smarttech.com: SMART Board Software Features—Sep. 5, 2003.
Internet Printout—http://www.tabletpccorner.com: Anoto Pen Bluetooth, Sep. 5, 2003.
Internet Printout—http://www.techtv.com: Nscribe Pen and Presenter-to-Go, Sep. 5, 2003.
Internet Printout—http://www.wacom.com: Cintiq—Interactive Pen Display, Sep. 5, 2003.
Internet Printout—http://www.wacom.com: Graphire2—Have more fun with digital phones, Sep. 5, 2003.
Internet Printout—http://www.wacom.com: Intuos2—The Professional Tablet, Sep. 5, 2003.
Internet Printout—http://www.wacom.com: intuos2, Sep. 5, 2003.
Internet Printout—http://www.wacom.com: Penabled Wacom, Sep. 5, 2003.
Internet Printout—http://www.wacom.com: tablet PC, Sep. 5, 2003.
Internet Printout—http://www.wired.com: The Hot New Medium: Paper, Sep. 5, 2003.
Jelinek, Frederic, "Statistical Methods for Speech Recognition," The MIT Press, pp. 1-283, 2001.
Ko et al., "Finger Mouse and Gesture Recognition System as a New Human Computer Interface," Computer and Graphics, col. 21, No. 5, pp. 555-561, 1997.
Lau, R., "Adaptive Statistical Language Modeling," Submitted to the Dept. of Electrical Engineering and Computer Science in Partial Fulfillment for the Degree of Master of Science at the MIT, May 1994.
Lee, Kai-Fu, "Automatic Speech Recognition—The Development of the SPHINX System," Kluwer Academic Publishers, pp. 1-207, 1992.
Louderback, Jim, "Nscribe pen and Presenter-To-Go—Infrared Pen and New Springboard Module Make Their Debut at Demo 2001," Edgereview.com, http://www.techtv.com/freshgear.pr, dated Sep. 5, 2003.
Moran, et al., "Design and Technology for Collaborage: Collaborative Collages of Information on Physical Walls," Nov. 1999.
Munich, M.E.; Perona, P., "Visual Input for Pen-Based Computers," Image Processing, 1996, Proceedings International Conference on Sep. 16-19, 1996. vol. 1, pp. 173-176.
Nathan, K.S. et al., "On-Line Handwriting Recognition Using Continuous Parameter Hidden Markov Models," 1993 IEEE.
Okad, et al. "A Method for Document Digitizer by Real Time Assembling of Mosaic Pictures," Scripta Publishing Co., Systems, Computers, Controls, vol. 13, No. 5, Sep., 1982, pp. 74-80.
Okada et al., "A High-Resolution Handwriting Character Input Device Using Laser Beams," Department of Instrumentation Engineering, Faculty of Science and Technology, vol. 10.4, No. 11.1, 1981.
Otsu, Nobuyuki, "A Threshold Selection Method From Gray-Level Histogram," IEEE Transactions on Systems, Man, and Cybernetics; Jan. 1979, vol. SMC-9, No. 1, pp. 62-66.
Pursley, M. et al., "Numerical Evaluation of Correlation Parameters for Optimal Phrases of Binar Register Sequences," Communications, IEEE Transactions on Oct. 1979, vol. 27, Issue 10, Part 1, pp. 1597-1604.
Reynaerts, D. et al., "Design of an advanced computer writing tool," Micro Machine and Human Science, 1995, Proceedings of the Sixth International Symposium, Nagoya, Japan, Oct. 4-6, 1995, pp. 229-234.
Sato et al., "Novel device for Inputting Handwriting Trajectory," Ricoh Technical Report No. 27, Nov. 2001, pp. 52-59, http://www.ricoh.co.jp/rdc/techreport/No27/Ronbun/A2707.pdf.
Sato et al., "Video Tablet— 2D Coordinate Input Device With OCD Camera," Osaka University, vol. J67-D, No. 6, Jun. 1984.
Shum, Heung-Yeung, et al., "Panoramic Image Mosaics," Microsoft Research Technical Report MSR-TR-97-23, 1997, 53 pages.
Tang, Xiaoou et al., "Video-based handwritten Chinese character recognition," Circuits and Systems for Video Technology, IEEE Transactions, Jan. 2005, vol. 15, Issue 1, pp. 167-174.
Urbanski, Brian, "Don't Break This Ink Pen," Edgereview.com, http://www.edgereview.com/ataglance.cfm?category=edge&Id=180, dated Jul. 15, 2002.
Urbanski, Brian, "Don't Break This Ink Pen," Edgereview.com, http://www.edgereview.com/ataglance.cfm?category=edge&ID=180, dated Sep. 5, 2003.
Van Liere, R. and Mulder, J.D., "Optical Tracking Using Projective Invariant Marker Pattern Properties," Virtual Reality, 2003. Proceedings, IEEE, Mar. 22-26, 2003, pp. 191-198.

* cited by examiner

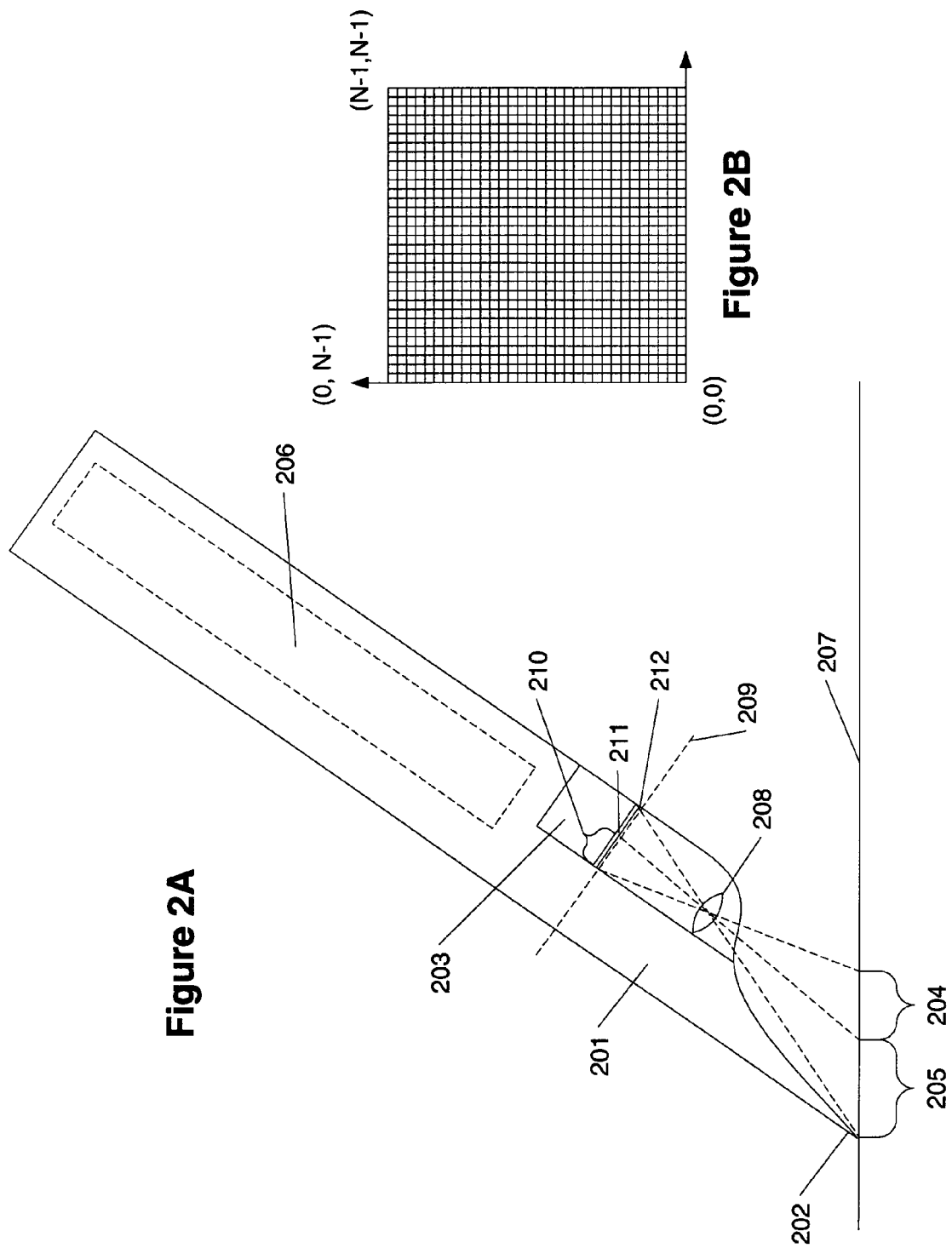

Figure 3A  0000010 00 01100 0101 001 111010 0 011001 0 010010 111 010 01101 01 0111111
Figure 3B  0000000 0011101 0100111 1110100 0111010 1000101 1110100 0100111 0011101
Figure 3C  00010010 00111110 01011101 010111101 01001001 011100111 001011010 01000011
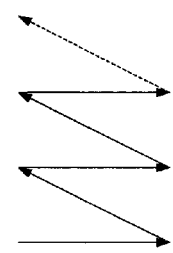
Figure 3D
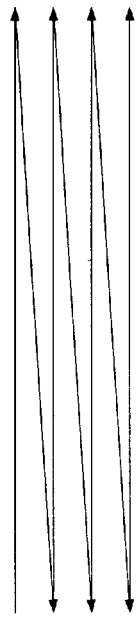
Figure 3E
Figure 3F

Figure 5A
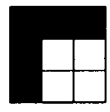
Figure 5B
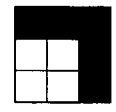
Figure 5C
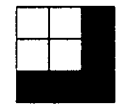
Figure 5D
Figure 4C
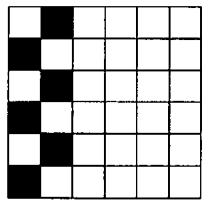
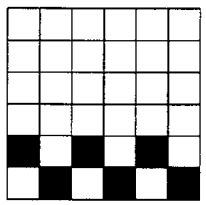
Figure 4D
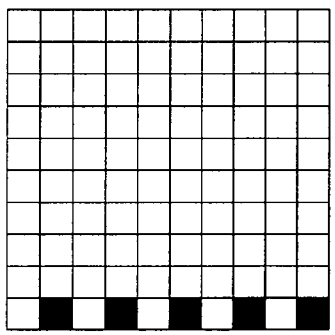
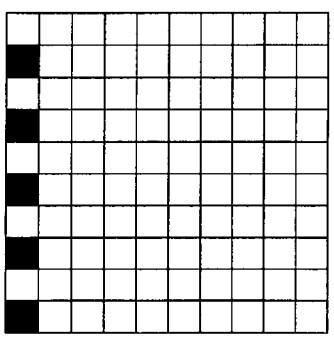
Figure 4E
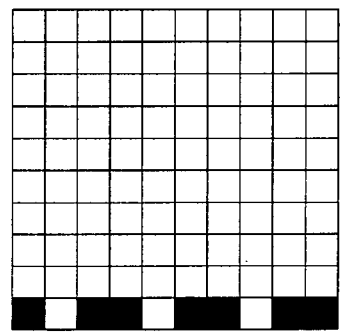
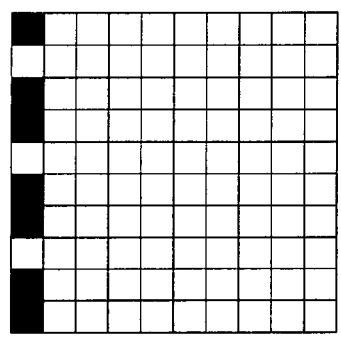

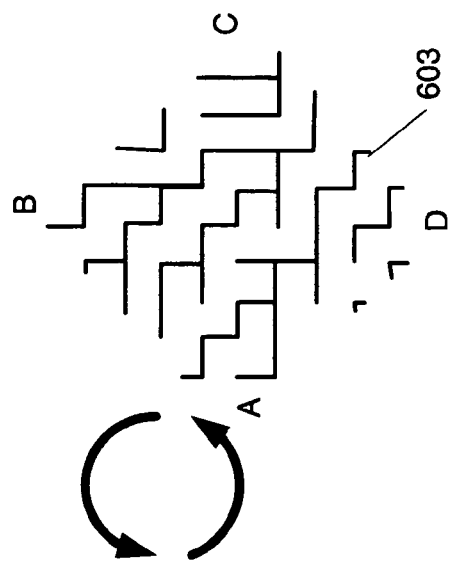
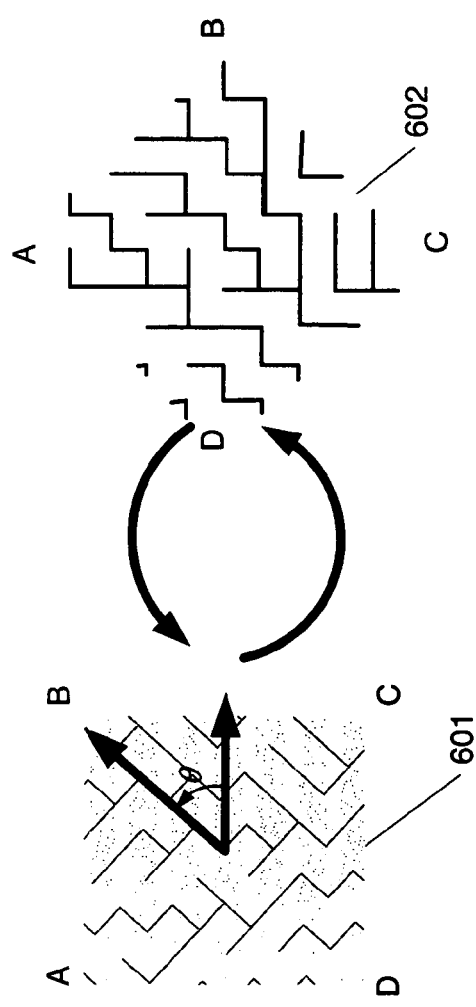
Figure 6
$$o = \theta + \begin{cases} 0 - no\ a \\ \dfrac{\pi}{2} - no\ b \\ \pi - no\ c \\ \dfrac{3\pi}{2} - no\ d \end{cases}$$
Figure 7

Performance Review

| | | | | |
|---|---|---|---|---|
| Review Period: 1701 to | 1703 | | Review Date: | 1705 |
| Name: 1707 | | Manager Name: 1709 | | |
| Title: 1711 | | Department: 1713 | | |
| ID Number: 1715 | | | | |
| E-mail Address: 1717 | | 1700 | | |

Skills Table

| Competency | Employee Rating 1719 | | | | | | Manager Rating 1721 | | | | | |
|---|---|---|---|---|---|---|---|---|---|---|---|---|
| | 1 | 2 | 3 | 4 | 5 | n/a | 1 | 2 | 3 | 4 | 5 | n/a |
| Problem solving | ○ | ○ | ○ | ○ | ○ | ◉ | ○ | ○ | ○ | ○ | ○ | ◉ |
| Decision making | ○ | ○ | ○ | ○ | ○ | ◉ | ○ | ○ | ○ | ○ | ○ | ◉ |
| Long-term thinking | ○ | ○ | ○ | ○ | ○ | ◉ | ○ | ○ | ○ | ○ | ○ | ◉ |
| Results oriented | ○ | ○ | ○ | ○ | ○ | ◉ | ○ | ○ | ○ | ○ | ○ | ◉ |
| Organization and prioritization | ○ | ○ | ○ | ○ | ○ | ◉ | ○ | ○ | ○ | ○ | ○ | ◉ |
| Flexibility and change management | ○ | ○ | ○ | ○ | ○ | ◉ | ○ | ○ | ○ | ○ | ○ | ◉ |
| Customer service | ○ | ○ | ○ | ○ | ○ | ◉ | ○ | ○ | ○ | ○ | ○ | ◉ |
| Company representation | ○ | ○ | ○ | ○ | ○ | ◉ | ○ | ○ | ○ | ○ | ○ | ◉ |
| Communication | ○ | ○ | ○ | ○ | ○ | ◉ | ○ | ○ | ○ | ○ | ○ | ◉ |
| Conflict management | ○ | ○ | ○ | ○ | ○ | ◉ | ○ | ○ | ○ | ○ | ○ | ◉ |
| Self-confidence | ○ | ○ | ○ | ○ | ○ | ◉ | ○ | ○ | ○ | ○ | ○ | ◉ |
| Integrity and reliability | ○ | ○ | ○ | ○ | ○ | ◉ | ○ | ○ | ○ | ○ | ○ | ◉ |

Signatures

Sign and print your name. 1723

Employee _____ Date _____

Manager _____ Date _____

Senior Manager _____ Date _____

Group Manager _____ Date _____

FIG. 17

FAST EMBEDDED INTERACTION CODE PRINTING WITH CUSTOM POSTSCRIPT COMMANDS

TECHNICAL FIELD

The present invention relates to printing a document for use with a digital pen. More particularly, the present invention relates to printing a document on a postscript printer using customized postscript commands.

BACKGROUND

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user. One of the difficulties, however, with having a printed document with annotations is the later need to have the annotations entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations is needed.

One technique of capturing handwritten information is by using an image capturing pen whose location may be determined during writing. One image capturing pen that provides this capability is the Anoto pen by Anoto Inc. This pen functions by using a camera to capture an image of paper encoded with a predefined pattern. An example of the image pattern is shown in FIG. 11. This pattern is used by the Anoto pen (by Anoto Inc.) to determine a location of an image capturing pen on a piece of paper.

In order to synchronize annotations and associate the annotations with content on a digital document, the corresponding paper document is typically printed with a representation of the underlying grid structure, e.g., an electronic interactive code (EIC) pattern. However, the task of printing the EIC pattern may be very demanding on the printer, requiring both an inordinate amount of memory as well as extensive processing times. The printing of an EIC pattern typically causes common GDI printing to be time consuming for the user.

Thus, it would be desirable to facilitate printing the corresponding paper document that contains both page content and the corresponding representation of the underlying grid structure. Any effective solution should consider both required memory and print times. Also, it is advantageous that the solution be printer independent for portability.

SUMMARY

Aspects of the present invention provide solutions to at least one of the issues mentioned above, supporting the printing of an electronic document with an electronic interactive code (EIC) pattern. Processes and apparatuses print documents containing embedded interactive code information by the use of custom postscript commands that are printer independent, with little overhead when printing, smaller print file size, and faster print times.

With one aspect of the invention, a document is printed one page at a time. For each page, the page content is first printed and followed by printing the associated EIC pattern. The printing of the associated EIC pattern utilizes custom postscript commands.

With another aspect of the invention, postscript commands are customized by representing each point of an EIC pattern. The processed EIC data is compressed and encoded to further reduce the data size.

With another aspect of the invention, a set of EIC symbols is treated as one font with each kind of EIC symbol being a glyph in the font. Each EIC symbol includes several dots, and each dot is represented in a glyph by an outline such as a rectangle.

With another aspect of the invention, the EIC pattern is represented with graphics procedures. A different procedure is associated with a different code.

With another aspect of the invention, the method for representing the EIC pattern is selected by memory and printing time requirements.

These and other aspects of the present invention will become known through the following drawings and associated description.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 2A and 2B show an image capture system and corresponding captured image in accordance with embodiments of the present invention.

FIGS. 3A through 3F show various sequences and folding techniques in accordance with embodiments of the present invention.

FIGS. 4A through 4E show various encoding systems in accordance with embodiments of the present invention.

FIGS. 5A through 5D show four possible resultant corners associated with the encoding system according to FIGS. 4A and 4B.

FIG. 6 shows rotation of a captured image portion in accordance with embodiments of the present invention.

FIG. 7 shows various angles of rotation used in conjunction with the coding system of FIGS. 4A through 4E.

FIG. 17 shows an exemplary embodiment of an InfoPath form according to an embodiment of the invention.

DETAILED DESCRIPTION

Figure 1:
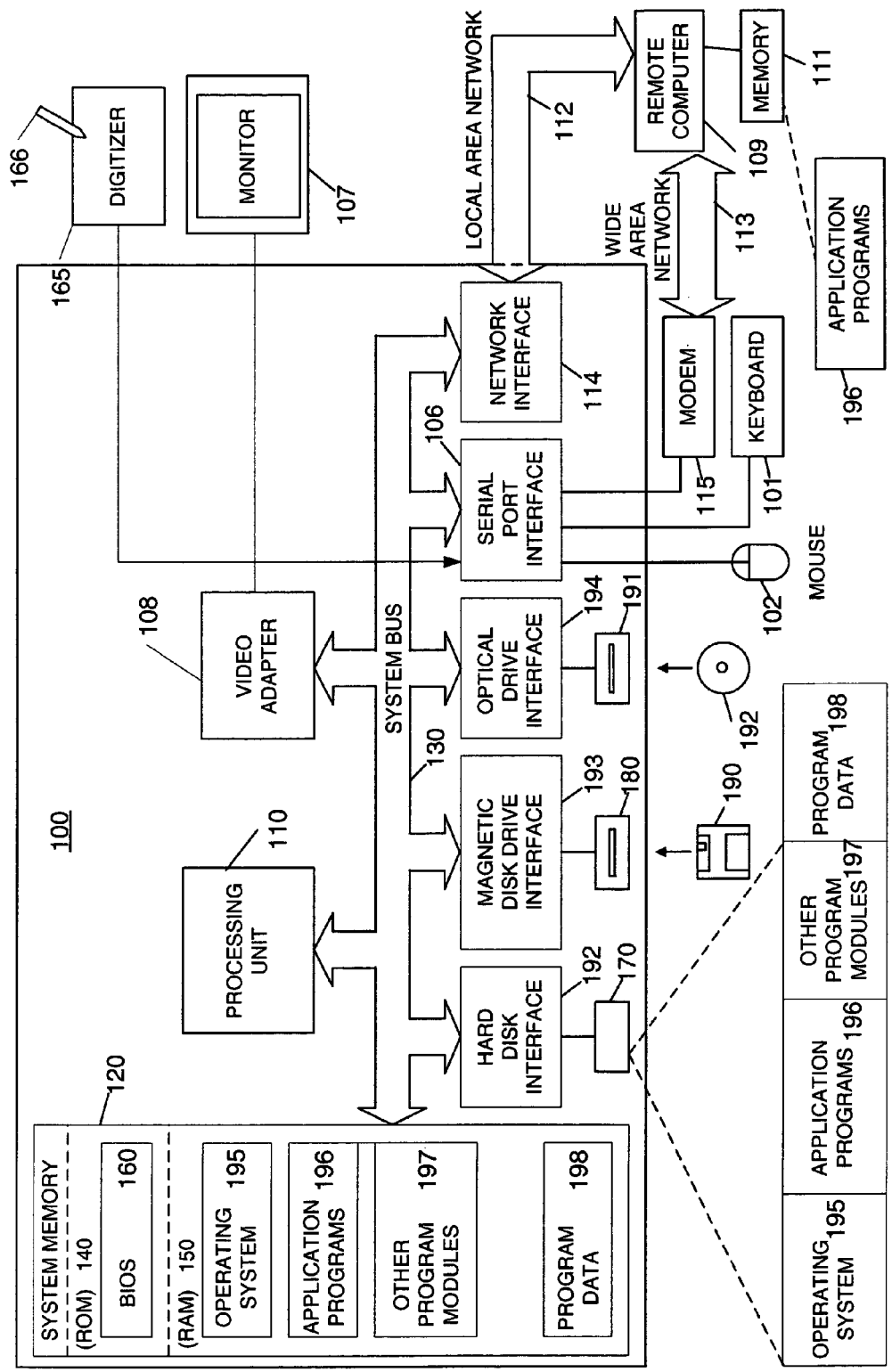
FIG. 1 shows a general description of a computer that may be used in conjunction with embodiments of the present invention.

Aspects of the present invention relate to printing an electronic document with an electronic interactive code (EIC) pattern. The EIC pattern enables a computer system to locate annotations (strokes) drawn by a user with an image capturing pen within text and graphics of the electronic document.

The following is separated by subheadings for the benefit of the reader. The subheadings include: Terms, General-Purpose Computer, Image Capturing Pen, Encoding of Array, Decoding, Error Correction, Location Determination, Embedded Interaction Code (EIC) Document, Printing with Custom Postscript Commands, and EIC Printing with Microsoft Office commands.

TERMS

Pen—any writing implement that may or may not include the ability to store ink. In some examples, a stylus with no ink capability may be used as a pen in accordance with embodiments of the present invention. An example is Microsoft's Universal Pen (uPen).

Camera—an image capture system that may capture an image from paper or any other medium.

Device Driver Interface (DDI)—includes a set of functions that are implemented by the operating system for use by drivers. Through DDI functions, drivers can access device properties and manipulate devices.

DDI Hook—a custom function that replaces or extends a DDI functions.

Enhanced Metafile (EMF)—a type of spool file used by print spoolers on Windows NT, Windows 2000, and Windows XP operating systems. An EMF reduces the time it takes for control to be returned to an application that makes a print request. A Graphical Device Interface (GDI) function call that produce the application's graphics object are stored directly in the EMF. (Graphical Device Interface is a Windows® standard for representing graphical objects and transmitting the graphical objects to output devices.) The time-consuming execution of these stored GDI functions is carried out later, in the background, when the spool file is played back. Using EMF spool files also promotes printer device independence. For example, a picture that measures 2 inches by 4 inches on a VGA display and that is stored in an EMF maintains these original dimensions, regardless of the printer's resolution.

Device Context (DC)—defines a set of graphic objects and their associated attributes, and the graphic modes that affect output. The graphic objects include a pen for line drawing, a brush for painting and filling, a bitmap for copying or scrolling parts of the screen, a palette for defining the set of available colors, a region for clipping and other operations, and a path for painting and drawing operations. Conceptually, a device context is a link between a Windows-based application, a device driver, and an output device such as a display, printer, or plotter.

XML Document Object Document—an XML file can be loaded into memory and described as an XMLDOMDocument object. The XMLDOMDocument is a kind of hierarchical structure: it contains an XMLDOMNode object as its child, and each XMLDOMNode object can contain one or more XMLDOMNode objects as its children.

Extensible Stylesheet Language Transformation (XSLT)—an XML-based language that enables you to transform one class of XML document to another class of XML document. It can also transform an XML document to an HTML document.

XML Document Object Node—the principal object with the Document Object Model (DOM). Elements, attributes, comments, processing instructions, and every other document component can be represented as an XMLDOMNode object. An XMLDOMNode can have one or more XML-DOMNode objects as it children.

XML Path—an expression that can address a part of an XML document.

Print Template—the mechanism for printing and previewing is controlled by print templates. Print template is also an HTML document, and it can print other HTML documents.

DeviceRect—a type of HTML element in a print template. It represents a page of an HTML document to be printed or viewed in print preview.

LayoutRect—a type of HTML element in print template. It represents the area or areas on a page where an HTML document's content is displayed when printed or during print preview.

OpenDoc Method—this method can start Microsoft® Word, and open a specified Microsoft Word document. Input: the file path of the Word document.

GetDocPageSize Method—This method can get page size of a Word document according to the full path of the Word document. Input: the file path of the Word document. Output: the page size of the Word document.

SHELLEXECUTEINFO Structure: Structure that contains information used by ShellExecuteEx.

ShellExecuteEx Method: This is a Windows shell function. It performs an action on a file. For example, one can set a SHELLEXECUTEINFO object with "printto\\command" command, a printer device name, a port name, and a Microsoft Word document file path, and then call ShellExecuteEx passing the SHELLEXECUTEINFO object as the parameter. Microsoft Word will be automatically launched and print the specified file to the printer. Input: address of a SHELLEXECUTEINFO structure.

IHTMLPainter Interface: This custom interface provides methods to MSHTML so that it can draw a rendering behavior.

MSHTML calls the methods of IHTMLPainter whenever a rendered behavior needs to be redrawn or when a mouse click occurs on the element to which the behavior is attached. A rendering behavior must supply an implementation of this interface to MSHTML. Members—Draw: Called by MSHTML to render a behavior.

IHTMLElementRender Interface: This interface is used to draw the contents of an element to a specified device context, normally a printer. Members—DrawToDC: Draws the contents of the element to the specified device context.

General Purpose Computer

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form that represents the encoded data stream. (For example, as will be discussed with FIG. 4B, the encoded data stream is used to create a graphical pattern.) The displayed form may be printed paper (or other physical medium) or may be a display projecting the encoded data stream in conjunction with another image or set of images. For example, the encoded data stream may be represented as a physical graphical image on the paper or a graphical image overlying the displayed image (e.g., representing the text of a document) or may be a physical (non-modifiable) graphical image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing images with a camera in the pen or stylus as the pen or stylus traverses a document, the system can track movement of the stylus being controlled by the user. The displayed or printed image may be a watermark associated with the blank or content-rich paper or may be a watermark associated with a displayed image or a fixed coding overlying a screen or built into a screen.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 (i.e., the resolution of the image sensor of the camera) is 32×32 pixels (where N=32). In the embodiment, a captured image (32 pixels by 32 pixels) corresponds to an area of approximately 5 mm by 5 mm of the surface plane captured by camera 203. Accordingly, FIG. 2B shows a field of view of 32 pixels long by 32 pixels wide. The size of N is adjustable, such that a larger N corresponds to a higher image resolution. Also, while the field of view of the camera 203 is shown as a square for illustrative purposes here, the field of view may include other shapes as is known in the art.

The images captured by camera 203 may be defined as a sequence of image frames $\{I_i\}$, where $I_i$ is captured by the pen 201 at sampling time $t_i$. The sampling rate may be large or small, depending on system configuration and performance requirement. The size of the captured image frame may be large or small, depending on system configuration and performance requirement.

The image captured by camera 203 may be used directly by the processing system or may undergo ire-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5 pixels, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211.

The following transformation $F_{S \to P}$ transforms position coordinates in the image captured by camera to position coordinates in the real image on the paper:

$$L_{paper} = F_{S \to P}(L_{Sensor})$$

During writing, the pen tip and the paper are on the same plane. Accordingly, the transformation from the virtual pen tip to the real pen tip is also $F_{S \to P}$:

$$L_{pentip} = F_{S \to P}(L_{virtual-pentip})$$

The transformation $F_{S \to P}$ may be estimated as an affine transform. This simplifies as:

$$F_{S \to P} = \begin{bmatrix} \frac{\sin\theta_y}{s_x} & \frac{\cos\theta_y}{s_x} & 0 \\ \frac{-\sin\theta_x}{s_y} & \frac{\cos\theta_x}{s_y} & 0 \\ 0 & 0 & 1 \end{bmatrix}$$

as the estimation of $F_{S \to P}$, in which $\theta_x$, $\theta_y$, $s_x$, and $s_y$ are the rotation and scale of two orientations of the pattern captured at location 204. Further, one can refine $F'_{S \to P}$ by matching the captured image with the corresponding real image on paper. "Refine" means to get a more precise estimation of the transformation $F_{S \to P}$ by a type of optimization algorithm referred to as a recursive method. The recursive method treats the matrix $F'_{S \to P}$ as the initial value. The refined estimation describes the transformation between S and P more precisely.

Next, one can determine the location of virtual pen tip by calibration.

One places the pen tip 202 on a fixed location $L_{pentip}$ on paper. Next, one tilts the pen, allowing the camera 203 to capture a series of images with different pen poses. For each image captured, one may obtain the transformation $F_{S \to P}$. From this transformation, one can obtain the location of the virtual pen tip $L_{virtual-pentip}$:

$$L_{virtual-pentip} = F_{S \to P}(L_{pentip})$$

where $L_{pentip}$ is initialized as (0, 0) and $$F_{P \to S} = (F_{S \to P})^{-1}$$

By averaging the $L_{virtual-pentip}$ obtained from each image, a location of the virtual pen tip $L_{virtual-pentip}$ may be determined. With $L_{virtual-pentip}$, one can get a more accurate estimation of $L_{pentip}$. After several times of iteration, an accurate location of virtual pen tip $L_{virtual-pentip}$ pentip may be determined.

The location of the virtual pen tip $L_{virtual-pentip}$ now known. One can also obtain the transformation $F_{S \to P}$ from the images captured. Finally, one can use this information to determine the location of the real pen tip $L_{pentip}$:

$$L_{pentip} = F_{S \to P}(L_{virtual-pentip})$$

Encoding of Array

A two-dimensional array may be constructed by folding a one-dimensional sequence. Any portion of the two-dimensional array containing a large enough number of bits may be used to determine its location in the complete two-dimensional array. However, it may be necessary to determine the location from a captured image or a few captured images. So as to minimize the possibility of a captured image portion being associated with two or more locations in the two-dimensional array, a non-repeating sequence may be used to create the array. One property of a created sequence is that the sequence does not repeat over a length (or window) n. The following describes the creation of the one-dimensional sequence then the folding of the sequence into an array.

Sequence Construction

A sequence of numbers may be used as the starting point of the encoding system. For example, a sequence (also referred to as an m-sequence) may be represented as a q-element set in field $F_q$. Here, $q=p^n$ where n 1 and p is a prime number. The sequence or m-sequence may be generated by a variety of different techniques including, but not limited to, polynomial division. Using polynomial division, the sequence may be defined as follows:

$$\frac{R_l(x)}{P_n(x)}$$

where $P_n(x)$ is a primitive polynomial of degree n in field $F_q[x]$ (having $q^n$ elements). $R_l(x)$ is a nonzero polynomial of degree l (where l<n) in field $F_q[x]$. The sequence may be created using an iterative procedure with two steps: first, dividing the two polynomials (resulting in an element of field $F_q$) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). In this environment, a relationship is established between cyclical shifting of the sequence and polynomial $R_l(x)$: changing $R_l(x)$ only cyclically shifts the sequence and every cyclical shifting corresponds to a polynomial $R_l(x)$. One of the properties of the resulting sequence is that, the sequence has a period of $q^n-1$ and within a period, over a width (or length) n, any portion exists once and only once in the sequence. This is called the "window property". Period $q^n-1$ is also referred to as the length of the sequence and n is the order of the sequence.

The process described above is but one of a variety of processes that may be used to create a sequence with the window property.

Array Construction

The array (or m-array) that may be used to create the image (of which a portion may be captured by the camera) is an extension of the one-dimensional sequence or m-sequence. Let A be an array of period $(m_1, m_2)$, namely $A(k+m_1,l)=A(k,l+m_2)=A(k,l)$. When an $n_1 \times n_2$ window shifts through a period of A, all the nonzero $n_1 \times n_2$ matrices over $F_q$ appear once and only once. This property is also referred to as a "window property" in that each window is unique. A window may then be expressed as an array of period $(m_1, m_2)$ (with $m_1$ and $m_2$ being the horizontal and vertical number of bits present in the array) and order $(n_1, n_2)$.

A binary array (or m-array) may be constructed by folding the sequence. One approach is to obtain a sequence then fold it to a size of $m_1 \times m_2$ where the length of the array is $L=m_1 \times m_2=2^n-1$. Alternatively, one may start with a predetermined size of the space that one wants to cover (for example, one sheet of paper, 30 sheets of paper or the size of a computer monitor), determine the area $(m_1 \times m_2)$, then use the size to let L $m_1 \times m_2$, where $L=2^n-1$.

A variety of different folding techniques may be used. For example, FIGS. 3A through 3C show three different sequences. Each of these may be folded into the array shown as FIG. 3D. The three different folding methods are shown as the overlay in FIG. 3D and as the raster paths in FIGS. 3E and 3F. We adopt the folding method shown in FIG. 3D.

To create the folding method as shown in FIG. 3D, one creates a sequence $\{a_i\}$ of length L and order n. Next, an array $\{b_{kl}\}$ of size $m_1 \times m_2$, where $\gcd(m_1, m_2)=1$ and $L=m_1 \times m_2$, is created from the sequence $\{a_i\}$ by letting each bit of the array be calculated as shown by equation 1:

$$b_{kl}=a_i, \text{ where } k=i \bmod(m_1), l=i \bmod(m_2), i=0, \ldots, L-1. \quad (1)$$

This folding approach may be alternatively expressed as laying the sequence on the diagonal of the array, then continuing from the opposite edge when an edge is reached.

Figures 4A, 4B:
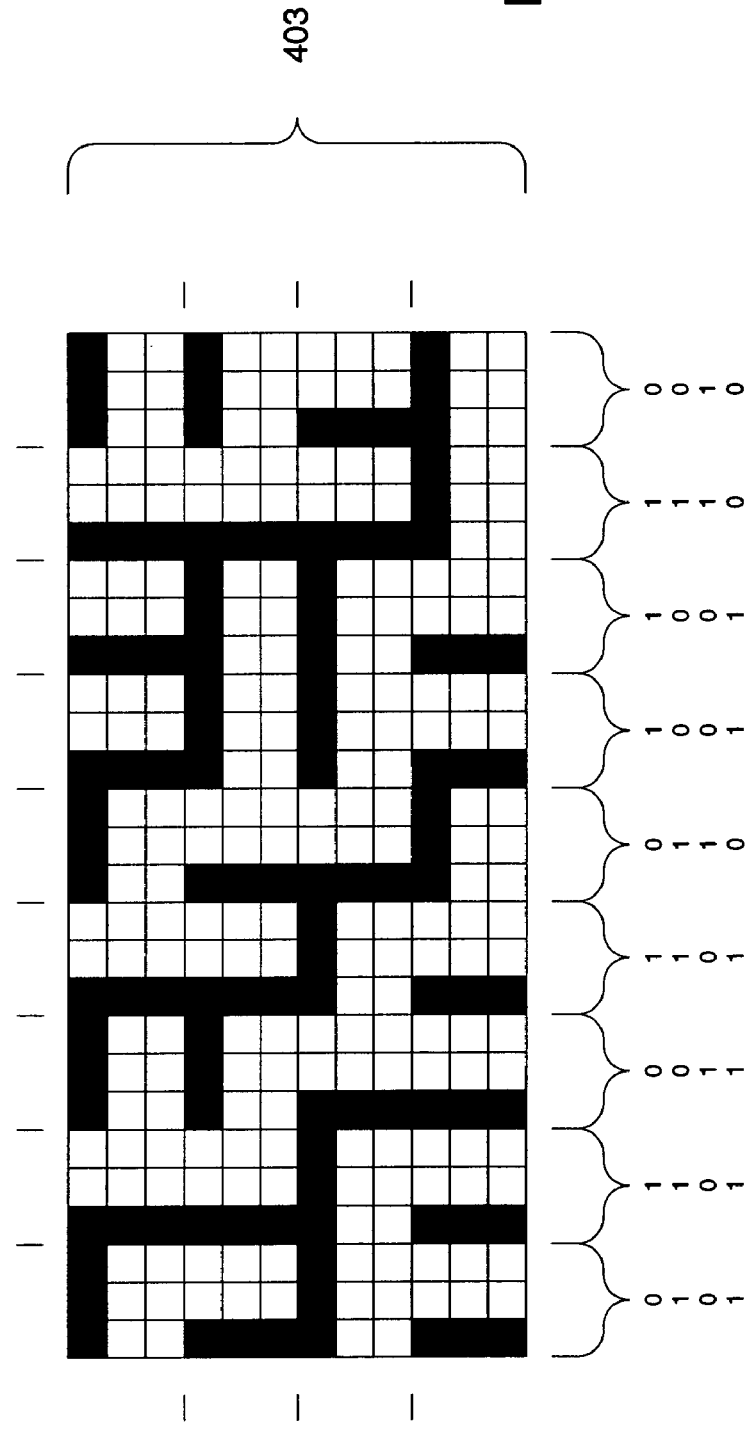
Figure 11:
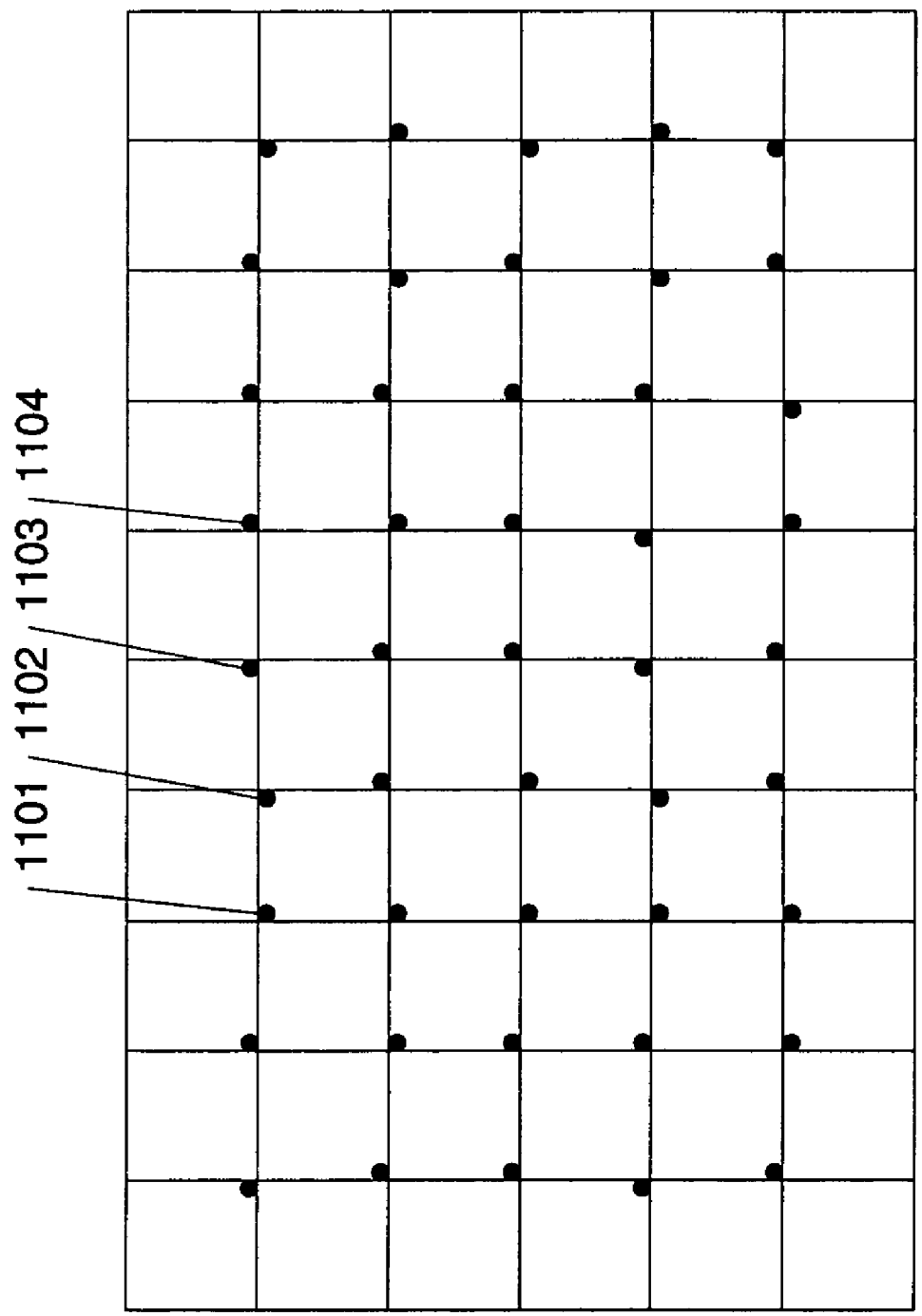
FIG. 11 shows a representation of encoding space in a document according to prior art.

FIG. 4A shows sample encoding techniques that may be used to encode the array of FIG. 3D. It is appreciated that other encoding techniques may be used. For example, an alternative coding technique is shown in FIG. 11.

Referring to FIG. 4A, a first bit 401 (for example, "1") is represented by a column of dark ink. A second bit 402 (for example, "0") is represented by a row of dark ink. It is appreciated that any color ink may be used to represent the various bits. The only requirement in the color of the ink chosen is that it provides a significant contrast with the background of the medium to be differentiable by an image capture system. The bits in FIG. 4A are represented by a 3×3 matrix of cells. The size of the matrix may be modified to be any size as based on the size and resolution of an image capture system. Alternative representation of bits 0 and 1 are shown in FIGS. 4C-4E. It is appreciated that the representation of a one or a zero for the sample encodings of FIGS. 4A-4E may be switched without effect. FIG. 4C shows bit representations occupying two rows or columns in an interleaved arrangement. FIG. 4D shows an alternative arrangement of the pixels in rows and columns in a dashed form. Finally FIG. 4E shows pixel representations in columns and rows in an irregular spacing format (e.g., two dark dots followed by a blank dot).

Referring back to FIG. 4A, if a bit is represented by a 3×3 matrix and an imaging system detects a dark row and two white rows in the 3×3 region, then a zero is detected (or one). If an image is detected with a dark column and two white columns, then a one is detected (or a zero).

Here, more than one pixel or dot is used to represent a bit. Using a single pixel (or bit) to represent a bit is fragile. Dust, creases in paper, non-planar surfaces, and the like create difficulties in reading single bit representations of data units. However, it is appreciated that different approaches may be used to graphically represent the array on a surface. Some approaches are shown in FIGS. 4C through 4E. It is appreciated that other approaches may be used as well. One approach is set forth in FIG. 11 using only space-shifted dots.

A bit stream is used to create the graphical pattern 403 of FIG. 4B. Graphical pattern 403 includes 12 rows and 18 columns. The rows and columns are formed by a bit stream that is converted into a graphical representation using bit representations 401 and 402. FIG. 4B may be viewed as having the following bit representation:

$$\begin{bmatrix} 0 & 1 & 0 & 1 & 0 & 1 & 1 & 1 & 0 \\ 1 & 1 & 0 & 1 & 1 & 0 & 0 & 1 & 0 \\ 0 & 0 & 1 & 0 & 1 & 0 & 0 & 1 & 1 \\ 1 & 0 & 1 & 1 & 0 & 1 & 1 & 0 & 0 \end{bmatrix}$$

Decoding

When a person writes with the pen of FIG. 2A or moves the pen close to the encoded pattern, the camera captures an image. For example, pen 201 may utilize a pressure sensor as pen 201 is pressed against paper and pen 201 traverses a document on the paper. The image is then processed to determine the orientation of the captured image with respect to the complete representation of the encoded image and extract the bits that make up the captured image.

For the determination of the orientation of the captured image relative to the whole encoded area, one may notice that not all the four conceivable corners shown in FIGS. 5A-5D can present in the graphical pattern 403. In fact, with the correct orientation, the type of corner shown in FIG. 5A cannot exist in the graphical pattern 403. Therefore, the orientation in which the type of corner shown in FIG. 5A is missing is the right orientation.

Continuing to FIG. 6, the image captured by a camera 601 may be analyzed and its orientation determined so as to be interpretable as to the position actually represented by the image 601. First, image 601 is reviewed to determine the angle θ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Next, image 601 is analyzed to determine which corner is missing. The rotation amount o needed to rotate image 601 to an image ready for decoding 603 is shown as o=(θ plus a rotation amount {defined by which corner missing}). The rotation amount is shown by the equation in FIG. 7. Referring back to FIG. 6, angle θ is first determined by the layout of the pixels to arrive at a horizontal and vertical (or other predefined grid orientation) arrangement of the pixels and the image is rotated as shown in 602. An analysis is then conducted to determine the missing corner and the image 602 rotated to the image 603 to set up the image for decoding. Here, the image is rotated 90 degrees counterclockwise so that image 603 has the correct orientation and can be used for decoding.

It is appreciated that the rotation angle θ may be applied before or after rotation of the image 601 to account for the missing corner. It is also appreciated that by considering noise in the captured image, all four types of corners may be present. We may count the number of corners of each type and choose the type that has the least number as the corner type that is missing.

Finally, the code in image 603 is read out and correlated with the original bit stream used to create image 403. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a Hamming distance between the two bit streams. It is appreciated that a variety of approaches may be used to determine the location of the recovered bit stream within the original bit stream.

As will be discussed, maze pattern analysis obtains recovered bits from image 603. Once one has the recovered bits, one needs to locate the captured image within the original array (for example, the one shown in FIG. 4B). The process of determining the location of a segment of bits within the entire array is complicated by a number of items. First, the actual bits to be captured may be obscured (for example, the camera may capture an image with handwriting that obscures the original code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

Let the sequence (or m-sequence) I correspond to the power series $I(x)=1/P_n(x)$, where n is the order of the m-sequence, and the captured image contains K bits of I $b=(b_0\ b_1\ b_2\ \ldots\ b_{K-1})^t$, where $K \geq n$ and the superscript t represents a transpose of the matrix or vector. The location s of the K bits is just the number of cyclic shifts of I so that $b_0$ is shifted to the beginning of the sequence. Then this shifted sequence R corresponds to the power series $x^s/P_n(x)$, or $R=T^s(I)$, where T is the cyclic shift operator. We find this s indirectly. The polynomials modulo $P_n(x)$ form a field. It is guaranteed that $x^s \equiv r_0 + r_1 x + \ldots r_{n-1} x^{n-1}\ \text{mod}(P_n(x))$. Therefore, we may find $(r_0, r_1, \ldots, r_{n-1})$ and then solve for s.

The relationship $x^s \equiv r_0 + r_1 x + \ldots r_{n-1} x^{n-1}\ \text{mod}(P_n(x))$ implies that $R = r_0 + r_1 T(I) + \ldots + r_{n-1} T^{n-1}(I)$. Written in a binary linear equation, it becomes:

$$R = r^t A \qquad (2)$$

where $r=(r_0\ r_1\ r_2\ \ldots\ r_{n-1})^t$, and $A=(I\ T(I)\ \ldots\ T^{n-1}(I))^t$ which consists of the cyclic shifts of I from 0-shift to (n−1)-shift. Now only sparse K bits are available in R to solve r. Let the index differences between $b_i$ and $b_0$ in R be $k_i$, i=1, 2, ..., k−1, then the 1st and $(k_i+1)$-th elements of R, i=1, 2, ..., k−1, are exactly $b_0, b_1, \ldots, b_{k-1}$. By selecting the 1st and $(k_i+1)$-th columns of A, i=1, 2, ..., k−1, the following binary linear equation is formed:

$$b^t = r^t M \qquad (3)$$

where M is an n×K sub-matrix of A.

If b is error-free, the solution of r may be expressed as:

$$r^t = \tilde{b}^t \tilde{M}^{-1} \qquad (4)$$

where $\tilde{M}$ is any non-degenerate n×n sub-matrix of M and $\tilde{b}$ is the corresponding sub-vector of b.

With known r, we may use the Pohlig-Hellman-Silver algorithm as noted by Douglas W. Clark and Lih-Jyh Weng, "Maximal and Near-Maximal Shift Register Sequences: Efficient Event Counters and Easy Discrete Logorithms," IEEE Transactions on Computers 43.5 (May 1994, pp 560-568) to find s so that $x^s \equiv r_0 + r_1 x + \ldots r_{n-1} x^{n-1}\ \text{mod}(P_n(x))$.

As matrix A (with the size of n by L, where $L=2^n-1$) may be huge, we should avoid storing the entire matrix A. In fact, as we have seen in the above process, given extracted bits with index difference $k_i$, only the first and $(k_i+1)$-th columns of A are relevant to the computation. Such choices of $k_i$ is quite limited, given the size of the captured image. Thus, only those columns that may be involved in computation need to saved. The total number of such columns is much smaller than L (where $L=2^n-1$ is the length of the m-sequence).

Error Correction

If errors exist in b, then the solution of r becomes more complex. Traditional methods of decoding with error correction may not readily apply, because the matrix M associated with the captured bits may change from one captured image to another.

We adopt a stochastic approach. Assuming that the number of error bits in b, $n_e$, is relatively small compared to K, then the probability of choosing correct n bits from the K bits of b and the corresponding sub-matrix $\tilde{M}$ of M being non-degenerate is high.

When the n bits chosen are all correct, the Hamming distance between $b^r$ and $r^rM$, or the number of error bits associated with r, should be minimal, where r is computed via equation (4). Repeating the process for several times, it is likely that the correct r that results in the minimal error bits can be identified.

If there is only one r that is associated with the minimum number of error bits, then it is regarded as the correct solution. Otherwise, if there is more than one r that is associated with the minimum number of error bits, the probability that $n_e$ exceeds the error correcting ability of the code generated by M is high and the decoding process fails. The system then may move on to process the next captured image. In another implementation, information about previous locations of the pen can be taken into consideration. That is, for each captured image, a destination area where the pen may be expected next can be identified. For example, if the user has not lifted the pen between two image captures by the camera, the location of the pen as determined by the second image capture should not be too far away from the first location. Each r that is associated with the minimum number of error bits can then be checked to see if the location s computed from r satisfies the local constraint, i.e., whether the location is within the destination area specified.

If the location s satisfies the local constraint, the X, Y positions of the extracted bits in the array are returned. If not, the decoding process fails.

Figure 8:
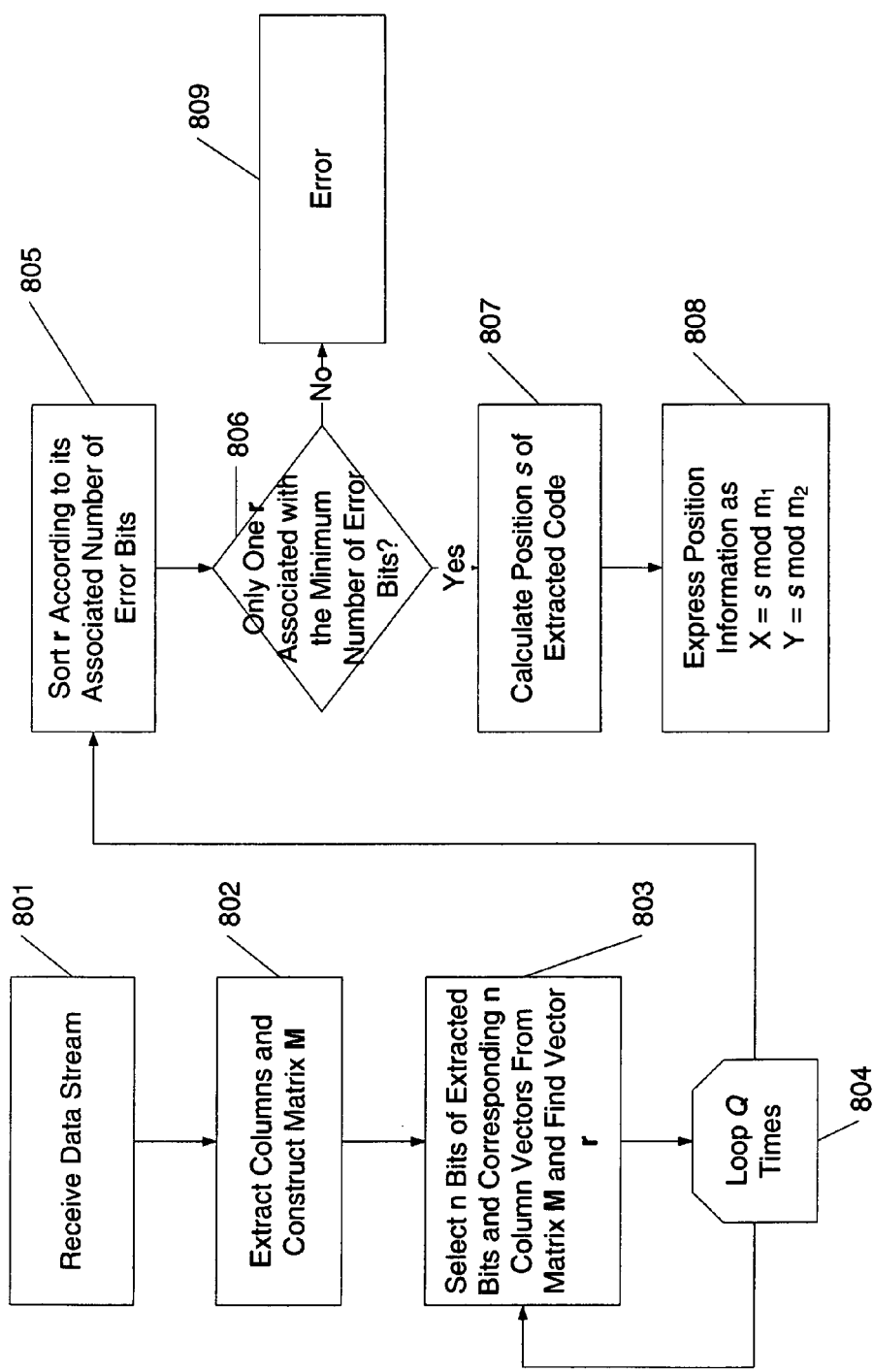
FIG. 8 shows a process for determining the location of a captured array in accordance with embodiments of the present invention.

FIG. 8 depicts a process that may be used to determine a location in a sequence (or m-sequence) of a captured image. First, in step 801, a data stream relating to a captured image is received. In step 802, corresponding columns are extracted from A and a matrix M is constructed.

In step 803, n independent column vectors are randomly selected from the matrix M and vector r is determined by solving equation (4). This process is performed Q times (for example, 100 times) in step 804. The determination of the number of loop times is discussed in the section Loop Times Calculation.

In step 805, r is sorted according to its associated number of error bits. The sorting can be done using a variety of sorting algorithms as known in the art. For example, a selection sorting algorithm may be used. The selection sorting algorithm is beneficial when the number Q is not large. However, if Q becomes large, other sorting algorithms (for example, a merge sort) that handle larger numbers of items more efficiently may be used.

The system then determines in step 806 whether error correction was performed successfully, by checking whether multiple r's are associated with the minimum number of error bits. If yes, an error is returned in step 809, indicating the decoding process failed. If not, the position s of the extracted bits in the sequence (or m-sequence) is calculated in step 807, for example, by using the Pohig-Hellman-Silver algorithm.

Next, the (X,Y) position in the array is calculated as: $x=s \mod m_1$ and $y=s \mod m_2$ and the results are returned in step 808.

Location Determination

Figure 9:
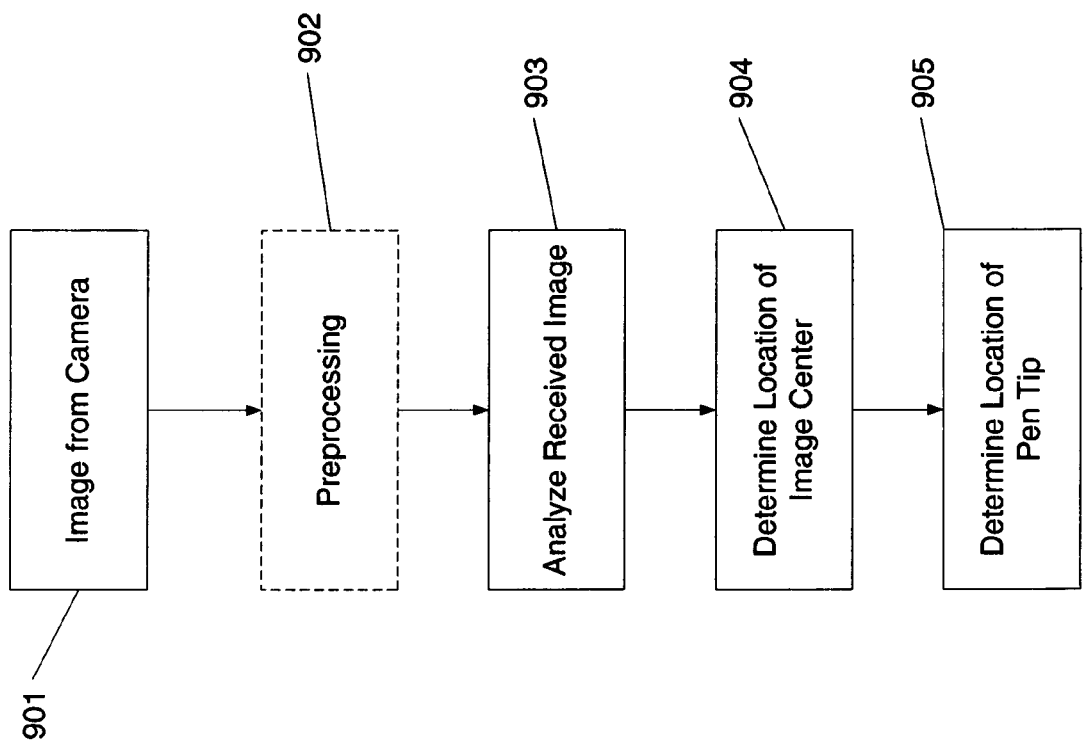
FIG. 9 shows a method for determining the location of a captured image in accordance with embodiments of the present invention.

FIG. 9 shows a process for determining the location of a pen tip. The input is an image captured by a camera and the output may be a position coordinates of the pen tip. Also, the output may include (or not) other information such as a rotation angle of the captured image.

In step 901, an image is received from a camera. Next, the received image may be optionally preprocessed in step 902 (as shown by the broken outline of step 902) to adjust the contrast between the light and dark pixels and the like.

Next, in step 903, the image is analyzed to determine the bit stream within it.

Next, in step 904, n bits are randomly selected from the bit stream for multiple times and the location of the received bit stream within the original sequence (or m-sequence) is determined.

Finally, once the location of the captured image is determined in step 904, the location of the pen tip may be determined in step 905.

Figure 10:
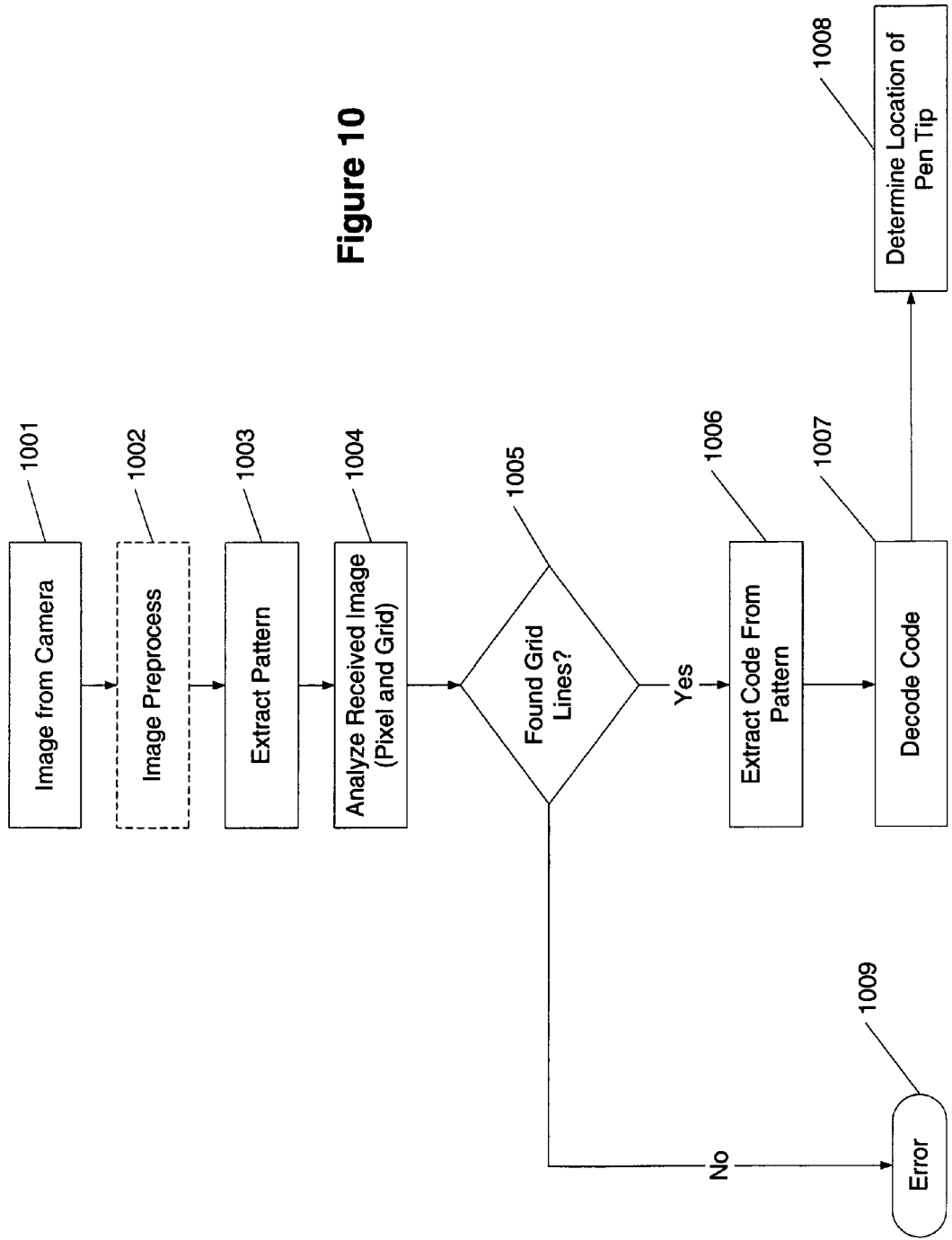
FIG. 10 shows another method for determining the location of captured image in accordance with embodiments of the present invention.

FIG. 10 gives more details about 903 and 904 and shows the approach to extract the bit stream within a captured image. First, an image is received from the camera in step 1001. The image then may optionally undergo image preprocessing in step 1002 (as shown by the broken outline of step 1002). The pattern is extracted in step 1003. Here, pixels on the various lines may be extracted to find the orientation of the pattern and the angle $\theta$.

Next, the received image is analyzed in step 1004 to determine the underlying grid lines. If grid lines are found in step 1005, then the code is extracted from the pattern in step 1006. The code is then decoded in step 1007 and the location of the pen tip is determined in step 1008. If no grid lines were found in step 1005, then an error is returned in step 1009.

Embedded Interaction Code (EIC) Document

To achieve the synchronization from a paper document to a digital document, it is desirable to establish a mapping between the paper document and the digital document. An EIC pattern may support embedded metadata as well as (x, y) position information. The metadata may include associated information, such as the URL of the digital document. However, the quantity of metadata, which can be embedded in the EIC pattern, is relatively limited. As a result, the information, which is bound together with the paper document, is not easy to modify and extend.

To improve flexibility and extensibility, an embodiment of the invention incorporates an EIC document that facilitates the integration between an image capturing pen and applications. An EIC document is a kind of digital file that serves as an intermediate tier between a paper document and a digital document. Both the paper document and the EIC document are typically generated during the printing process. An EIC document meets requirements of both the paper document and the digital document as much as possible, and plays an important role between them. There is typically an intrinsic incompatibility between the paper document and the digital document for the following reasons:

the screen display is often not the same as the printing output a paper document is based on pages, although the corresponding digital document is not necessarily so the digital document is likely to change.

The association between a paper document and a corresponding EIC document is through a DocumentID. An EIC document is uniquely identified by the DocumentID, which may be embedded as metadata into the EIC pattern of the corresponding paper document. In one embodiment of the invention, the metadata capacity is 196 bits. The DocumentID may be a globally unique ID (GUID). In the embodiment, the DocumentID is formed from a serial number component (e.g., an image capturing pen's serial number), a generated random identification component (which may comprise a plurality of random numbers), and a time stamp component (which may comprise a plurality of time stamps). In other embodiments of the invention, the uniqueness of a DocumentID may be guaranteed by an EIC Document Center (as will be discussed below) or by an application itself.

Figure 12:
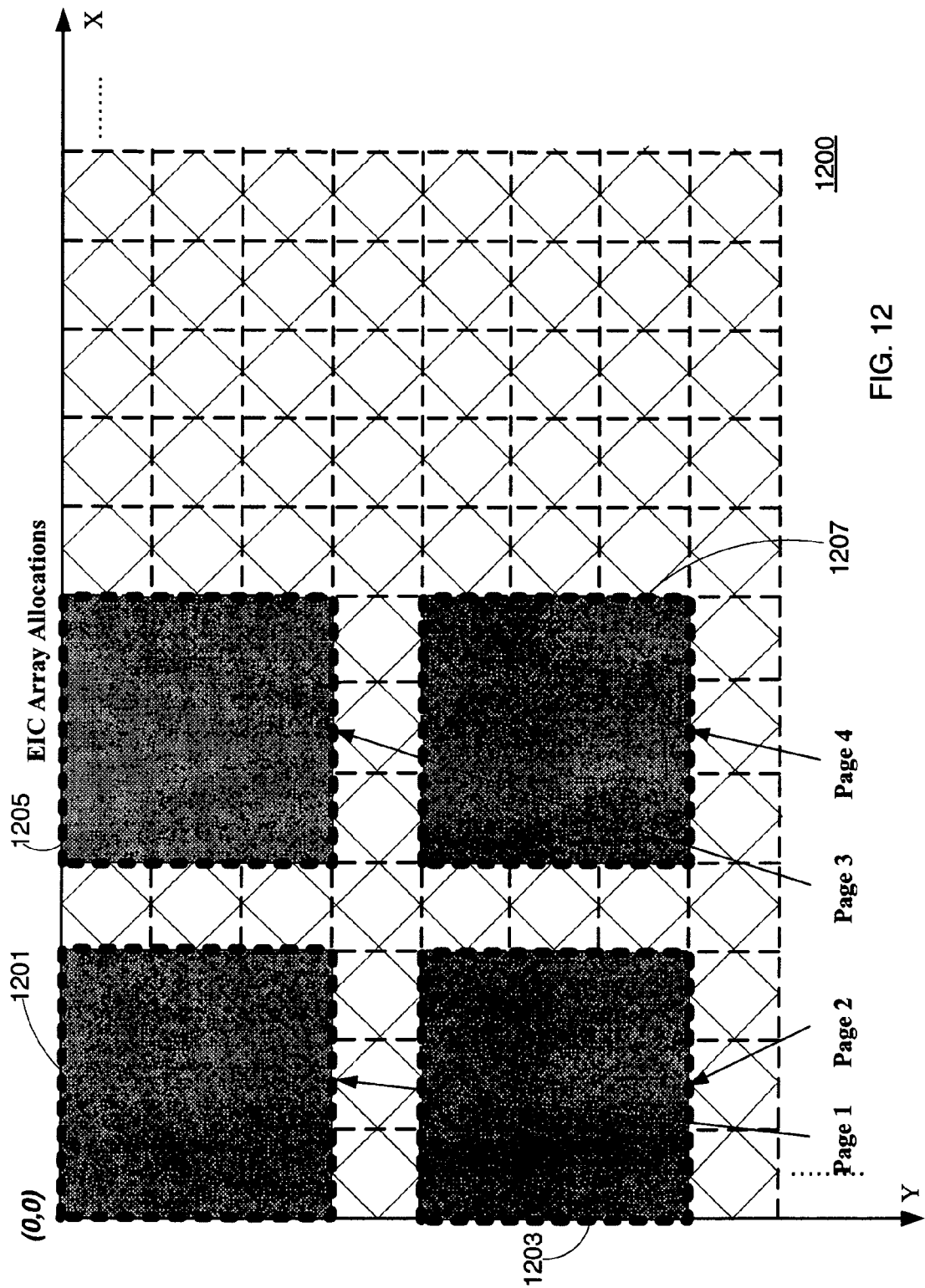
FIG. 12 shows an embedded interaction code (EIC) array allocation according to an embodiment of the invention.

FIG. 12 shows an embedded interaction code (EIC) array allocation 1200 according to an embodiment of the invention. In addition to a DocumentID, EIC Array allocations support an EIC document. A DocumentID may establish the corresponding relationship between a paper document and an EIC document. Another consideration in relating a paper document with an EIC document is how to map a stroke on a page of the paper document back to the page and the location on that page in the EIC document. This facilitates synchronization from the paper document to the digital document. The embodiment of the invention uses EIC Array allocations, as illustrated in FIG. 12. For a specific DocumentID, there is a large 2-D EIC Array that spans the entire document. In the example shown in FIG. 12, portion 1201 corresponds to page 1, portion 1203 corresponds to page 2, portion 1205 corresponds to page 3, and portion 1207 corresponds to page 4. (Please note that FIG. 12 may not depict the actual scaling of the EIC Array allocation.) An EIC array may span a maximum of approximately 1900 pages in A4 size. Each page of the paper document is allocated a different part of the EIC array. The corresponding portion of the EIC Array is printed on the corresponding page.

The EIC document records the EIC Array allocations. When an image capturing pen makes a stroke on a page of paper document, the EIC document may transform the stroke (ink) and inform an application which page the user is writing on and where the ink is on that page.

Figure 13:
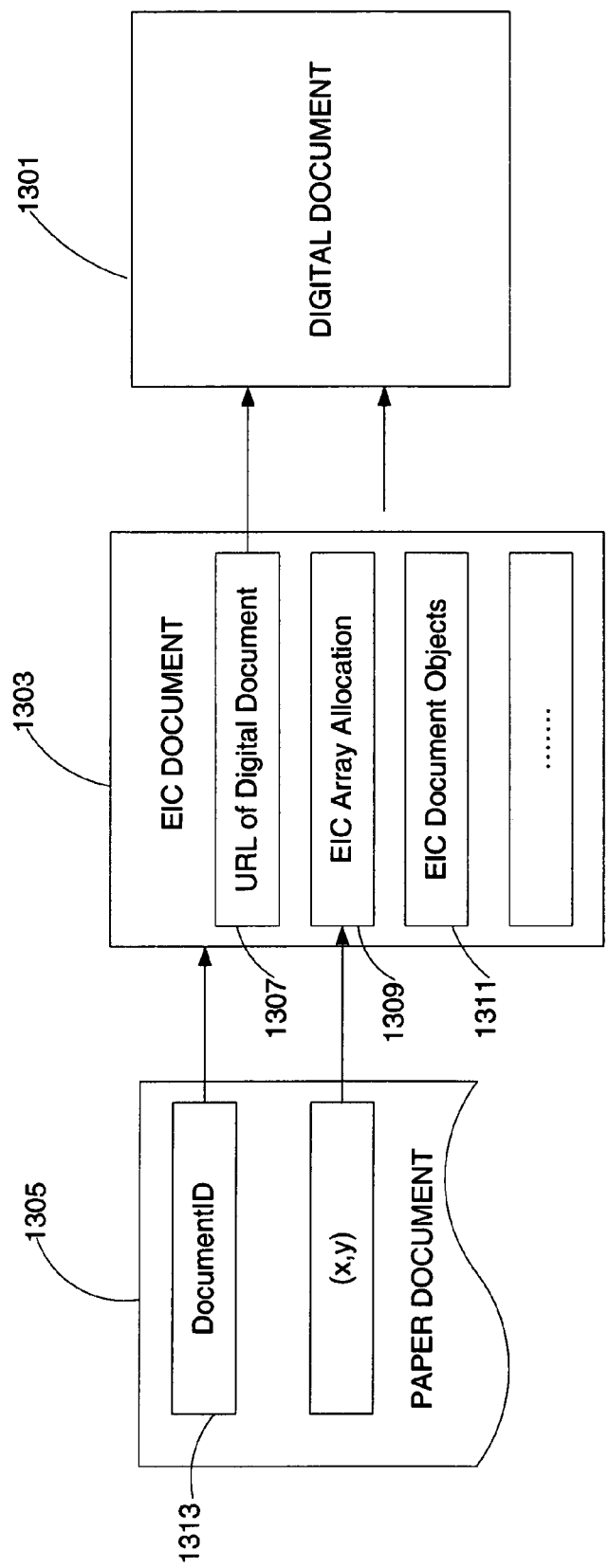
FIG. 13 shows a relationship of a digital document, EIC document, and a paper document according to an embodiment of the invention.

FIG. 13 shows a relationship of a digital document 1301, an EIC document 1303, and a paper document 1305 according to an embodiment of the invention. EIC document 1303 is a snapshot of digital document 1301. EIC document 1303 contains useful information such as URL 1307 of the original digital document, (optionally) the compressed images of pages, EIC array allocation 1309, and so forth. When an image capturing pen makes a stroke on a page of paper document 1305, the embodiment determines which page the user is writing on and where the stroke is on the page within a desired degree of accuracy. Moreover, one needs to recover the stroke into digital document 1301. A stroke in paper document 1305 may not directly translate to digital document 1301.

Although one can decode and then calculate a stroke in paper document 1305, one needs a mechanism to determine where to insert the stroke in digital document 1301 and how to handle the stroke in an application. This issue is resolved by EIC document objects 1311. EIC document objects 1311 are defined and instantiated by an application and are then delegated to EIC document 1303. EIC document object 1311 includes an application-defined data object (which may be of any type), and binding context (which is typically of rectangular region). EIC document object 1311 can install an association between regions on paper document 1305 and objects in digital document 1301. For example, a line/word in a Microsoft® Word document may be associated with an associated printing region in paper document 1305 through EIC document object 1311. When an image capturing pen makes a stroke on the line/word, both the stroke and EIC document object 1311 are sent together as the decoding result to the corresponding application. Referring to EIC document object 1311, the application can process the stroke correctly.

The relationship among paper document 1305, digital document 1301 and EIC document 1303 can be illustrated as below:

DocumentID 1313 embedded in paper document 1305 uniquely identities EIC document 1303.

EIC document 1303 includes URL 1307 pointing to digital document 1301.

Ink position is transformed according to EIC array allocations 1309.

Ink is recovered and synchronized to digital document 1301. EIC document objects 1311 may be used to map from regions in paper document 1305 to objects in digital document 1301.

EIC document 1303 may contain five categories of information: basic information, EIC document image (not shown and as discussed later), EIC command control (not shown and as discussed later), EIC document objects 1311, and strokes objects (not shown and as discussed later).

Basic information includes:

DocumentID: a unique ID identifying the document, and being embedded as metadata in the EIC pattern of the corresponding paper document.

Document Version: the version of the original digital document. The digital document in some environment such as SharePoint Document Library supports the version management. The document version in an EIC document specifies which version of digital document the paper document corresponds to.

Date Modified: the latest date when the original digital document is modified.

Document URL: the location of the original digital document.

Printing setup: paper size, etc.

EIC Array Allocations: the information about which segment of the EIC Array is allocated to each page.

An EIC document image refers to the compressed images of pages of paper document 1305 with one image for every page. This property may be optional or may be mandatory according to an embodiment of the invention.

Figure 14:
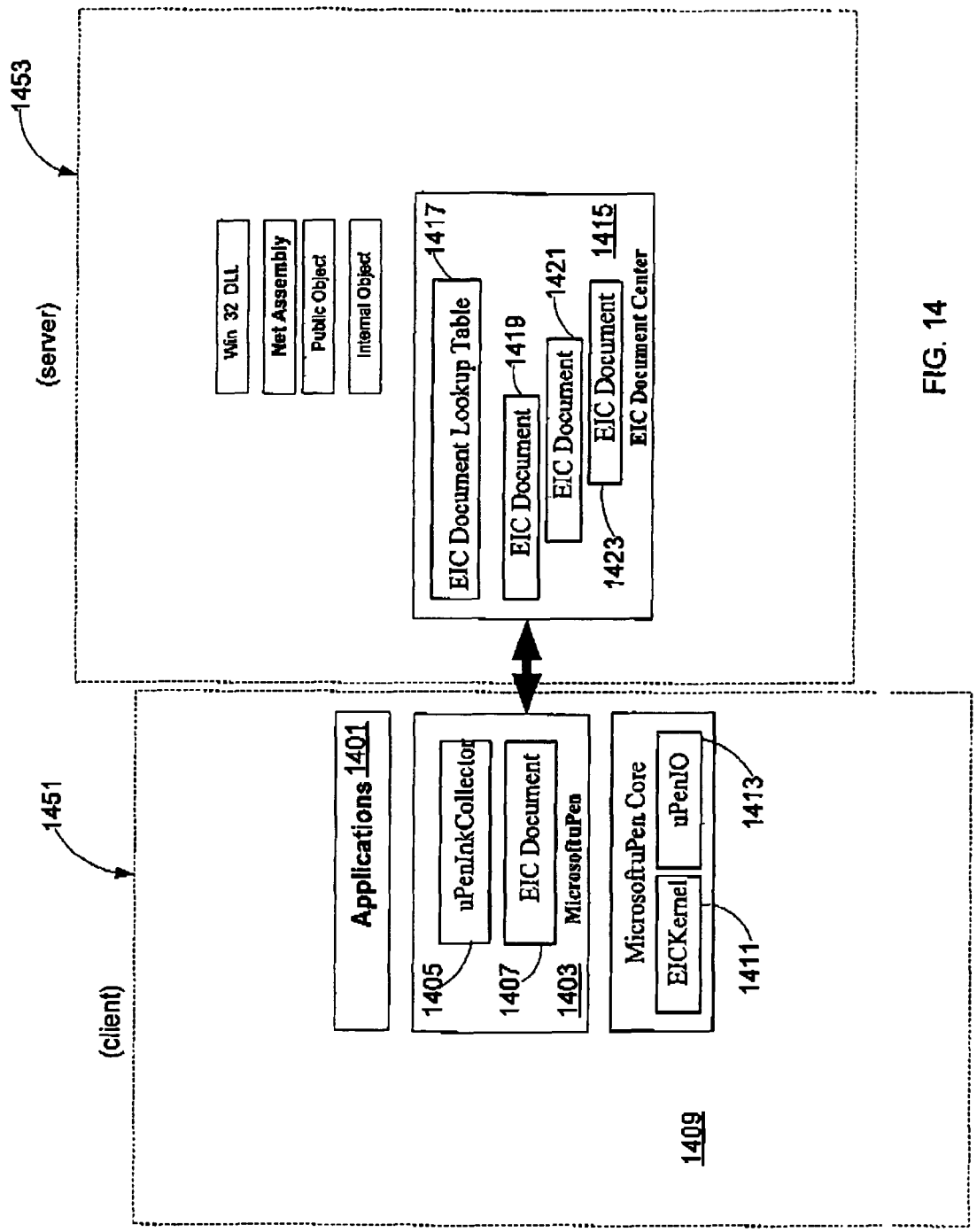
FIG. 14 shows a client-server relationship based on an EIC document center according to an embodiment of the invention.

FIG. 14 shows a client-server relationship based on an EIC document center 1415 according to an embodiment of the invention. An EIC Document (e.g., EIC document 1419, 1421, and 1423) enables high layer uPen module 1403 (in conjunction with low layer uPen module 1409) to synchronize information from paper document 1305 to digital document 1301. With one embodiment of the invention, one accesses an EIC document according to a DocumentID decoded from a paper document and saves the EIC document with the original digital document. (In the embodiment, the EIC document is saved as part of the digital document.) This embodiment may have disadvantages in some user scenarios. For example, applications 1401 are consequently involved with maintenance of the EIC document. Another embodiment of the invention manages substantially all EIC documents in a user's computer, so that applications 1401 can access an EIC document from a central location in the local machine. This embodiment is machine-dependent. With another embodiment of the invention, EIC document center (a central server) 1453 is responsible for maintenance and retrieval of EIC documents 1419, 1421, and 1423. Client 1451 interacts with server 1451 in order to access an EIC document as identified by a DocumentID.

On the client side, uPenInkCollector object 1405 is responsible for receiving uPen strokes from low layer module 1409, receiving EIC Document 1407 from EIC document center 1451, and notifying the decoding result to applications 1401.

On the server side, substantially all EIC documents (1419, 1421, and 1423) are maintained by EIC document center 1415. In the embodiment, lookup table 1417 records relationships from DocumentID to the corresponding EIC document. (Other embodiments of the invention may use other techniques for identifying the relationship.) When client 1451 requests an EIC document, EIC document center 1415 simply looks up the specified DocumentID in lookup table 1417, and subsequently returns the corresponding EIC Document to client 1451.

FIG. 14 shows an architecture of integrating uPen module 1403 with applications 1401. uPen.core module (low layer module) 1409 contains uPen core algorithms that are implemented with EICKernel 1411 and uPenIO 1413. uPen module (high layer module) 1403 resides above module 1409 in the hierarchical stack in order to provide application program interfaces (APIs) for applications 1401. uPenInkCollector object 1405 is responsible for receiving strokes from low layer module 1409, retrieving EIC document 1407 from EIC document center 1415, and notifying final results to applications 1401. When EIC document 1407 is downloaded from EIC document center 1415, EIC document 1407 is typically cached in local machine (client) 1451. As shown in FIG. 14, applications 1401 are freed from the maintenance of EIC documents, so that applications 1401 may focus on synchronizing information from paper documents.

Figure 15:
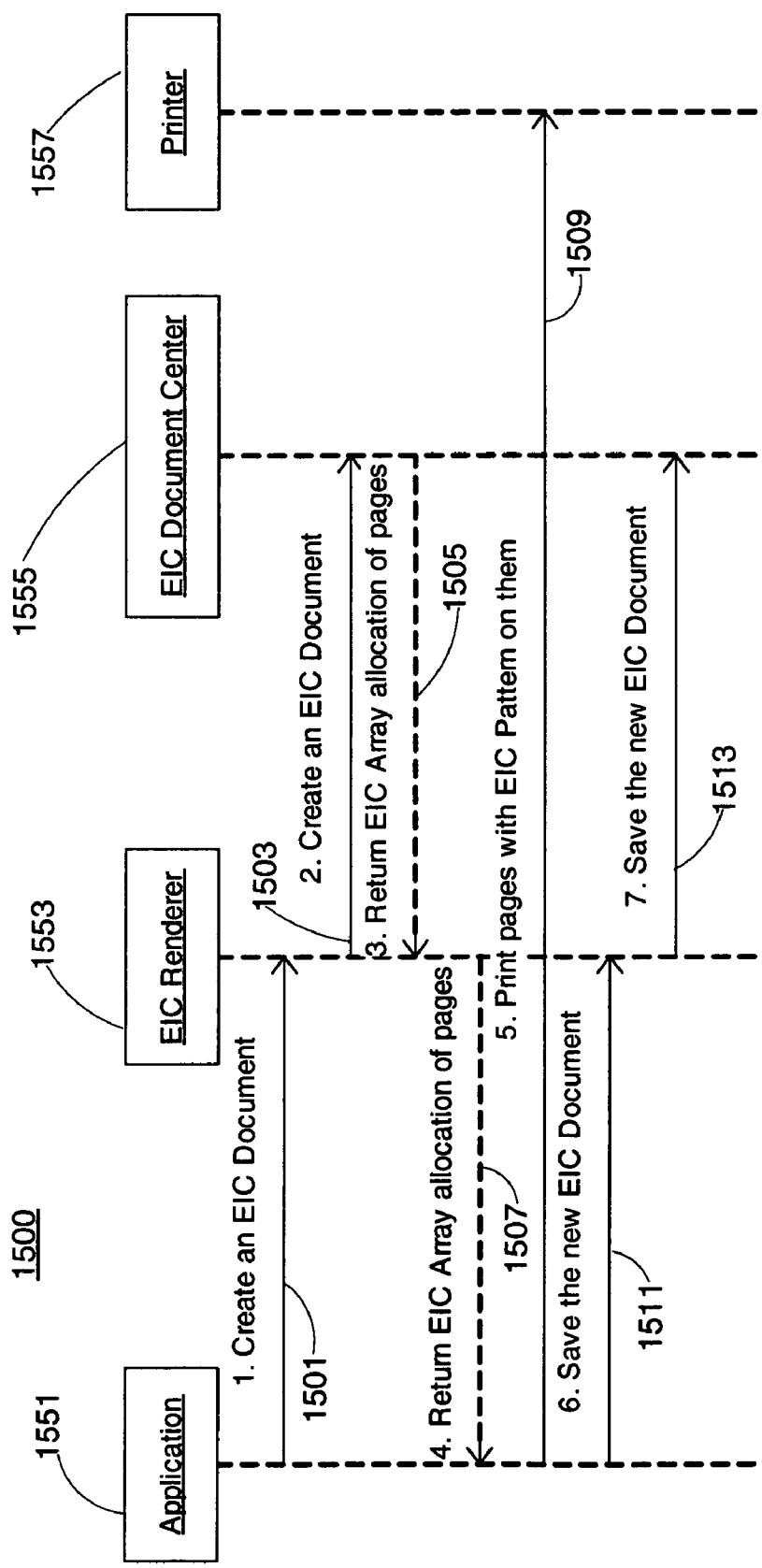
FIG. 15 shows a scenario sequence for EIC document generation according to an embodiment of the invention.

FIG. 15 shows scenario 1500 sequence for EIC document generation according to an embodiment of the invention. In the embodiment, an EIC Document is generated at substantially the same time as a paper document. In other words, both documents are generated during the printing process. The uPen SDK (software development kit) includes EIC renderer object 1553, which is responsible for generating an EIC array, allocating the EIC array to pages, creating the EIC document, and finally saving the resulting EIC document at EIC document center 1555.

In scenario 1500, application 1551 generates request 1501 to EIC renderer 1553 (which is typically implemented at client 1451) to create an EIC document. With request 1501, application 1551 provides EIC renderer 1553 the URL and the version information (if available) of the corresponding digital document. Application 1551 may implement command controls as described later. Also, application 1551 may delegate EIC document objects to the EIC document.

EIC renderer 1553 asks EIC document center 1555 (which is typically implemented at the server) to create the EIC document by sending request 1503 to EIC document center 1555. After the EIC document is generated by EIC document center 1555, EIC array allocations 1505 are returned to EIC renderer 1553. EIC renderer 1553 subsequently forwards the EIC Array allocations to application 1551 with response 1507.

In scenario 1500, application 1551 sends request 1509 to printer 1557 in order to print the document page by page, with a respective corresponding EIC pattern on each page. Subsequently, application 1551 generates request 1511 to EIC renderer 1553 to save the resulting EIC document. (In the embodiment, the document may or may not be printed even though the document is saved.) EIC renderer 1553 then sends request 1513 to EIC document center 1553 in order to save the EIC document.

Figure 16:
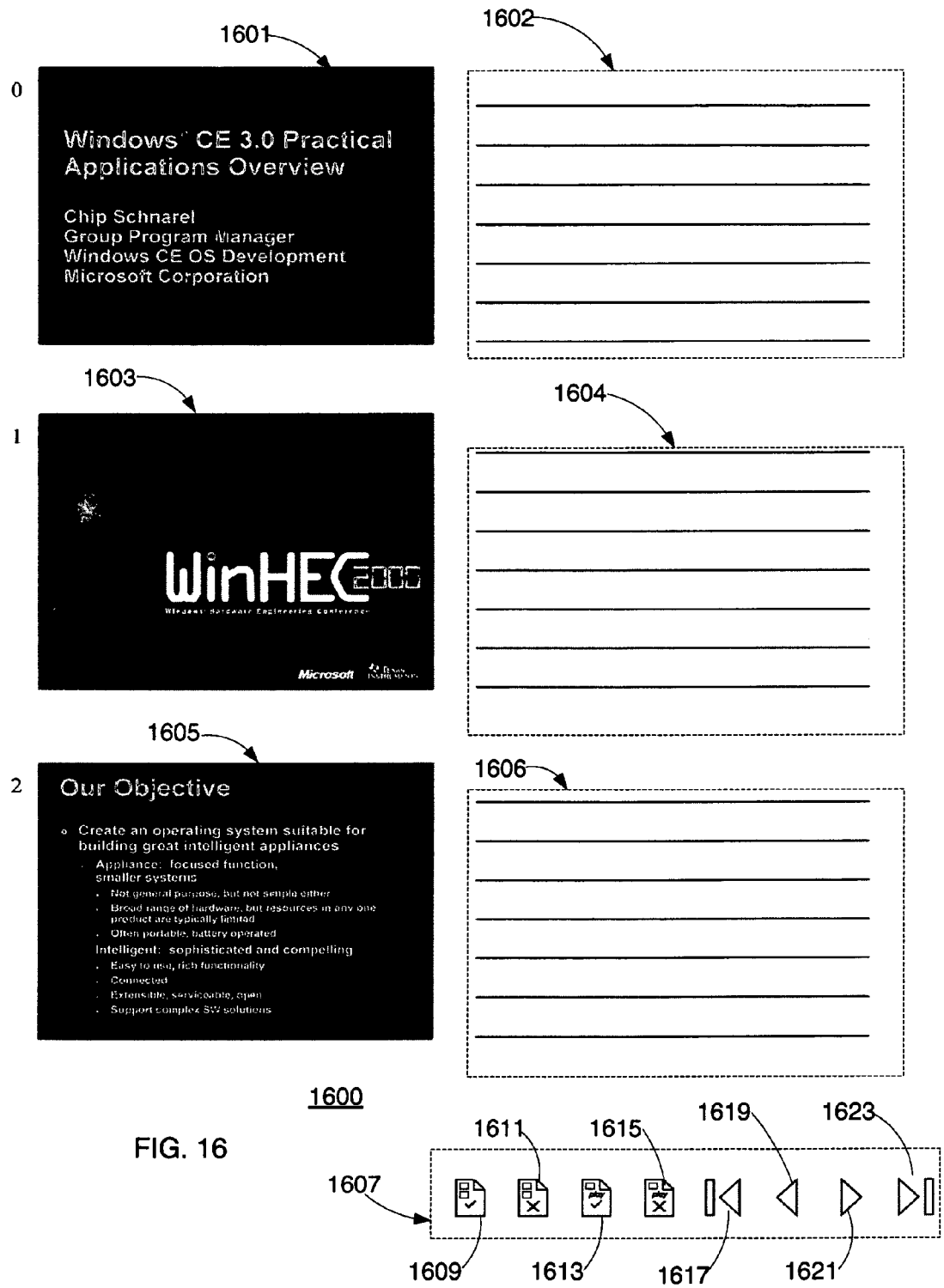
FIG. 16 shows an exemplary embodiment for EIC command control according to an embodiment of the invention.

FIG. 16 shows an exemplary embodiment for EIC command control on printed page 1600 according to an embodiment of the invention. In order to improve the interactive capacity of a uPen system, an embodiment of the invention supports an EIC command control capability (corresponding to interactive command control region 1607). A command control region (e.g., interactive command control region 1607) is typically a rectangular area on the paper document 1305. When a user puts a pen tip in contact with a command control region on the paper document 1305, a command request with a command ID and command specific information is sent to the application. The application may subsequently perform a corresponding application command that is associated with a command control (e.g., command 1617 to go to the first slide in a PowerPoint presentation). The command request contains the following information:

Command ID: the ID identifying the command.

Command Parameters: bound together with the command, which are sent to the corresponding application to process when the command is activated.

Command Control Region: the area of the EIC Command Control.

Command Transformation: the transformation, which is applied on the resulting stroke when the command is activated, and the transform result is sent to the corresponding application to process.

FIG. 16 illustrates an example of the EIC command control capability. The capability supports 14 command controls as follows.

3 command controls for slides: if uPen writes on these controls (controls 1601, 1603, and 1605), strokes will be synchronized into the corresponding slide in PowerPoint® through an Addin. The PowerPoint Addin is responsible for receiving and processing command requests from uPen.

3 command controls for notes: if uPen writes on these controls (controls 1602, 1604, and 1606), strokes will be recognized and the result will be synchronized into PowerPoint.

8 command controls for interactive commands: the command controls represent 8 typical commands in PowerPoint, open a ppt document (command 1609), close a ppt document (command 1611), show slides (command 1613), quit showing (command 1615), go to the first slide (command 1617), go to the previous slide (command 1619), go to the next slide (command 1621), and go to the last slide (command 1623).

FIG. 17 shows an exemplary embodiment of InfoPath™ form 1700 (corresponding to a printed document) according to an embodiment of the invention. An EIC document object refers to objects defined by applications and delegated to the EIC document. In the embodiment, the EIC document object contains the following information:

EIC object ID: a unique ID identifying the object.

Data: the data information of the object. It is of any type, e.g., text and/or graphic Binding Context: specifies to which part the object is associated. The binding context includes:

Global: which means that the object is bound with the entire EIC Document; or

Page: which means that the object is bound to a specified page; or

Region: the object is bound to a specified region in the EIC Document.

From the structure of an EIC document object, one observes that the EIC document provides a mechanism to associate a part of a paper document with an application-defined object in the corresponding digital document. Consequently, an uPen operation may be associated with one or more application-defined objects in the corresponding digital document. As a result, even though the digital document looks different from the paper document or may change, an uPen operation is interpreted and synchronized to the digital document if corresponding EIC document objects exist.

A typical application of EIC document object is Info-Path®. InfoPath should be informed of which form field (e.g., fields 1701-1723) that the new ink (stroke) belongs to. Info-Path should also recognize the ink according to the type of the field and then fill the recognized results into the field automatically. (For example, a converted character string may be inserted in field 1701 while the strokes that correspond to a signature remain in field 1723 to preserve the original signature.) While the ink positions may not be related to the screen view of the digital document, the ink positions are related to the printing view of the paper document. Moreover, the screen display may continually change during form filling. The application should be informed of the positions of the field on the printed paper. The application may then correctly determine which field should be filled by the new ink. If an EIC document object is used, an association process can be handled as follows: calculating the printing position of fields, wrapping relevant information such as the position and type of field into an EIC document object, and delegating the EIC document objects to the EIC document during the printing process. Subsequently, InfoPath may retrieve the EIC document objects for recognizing and filling.

Figure 18:
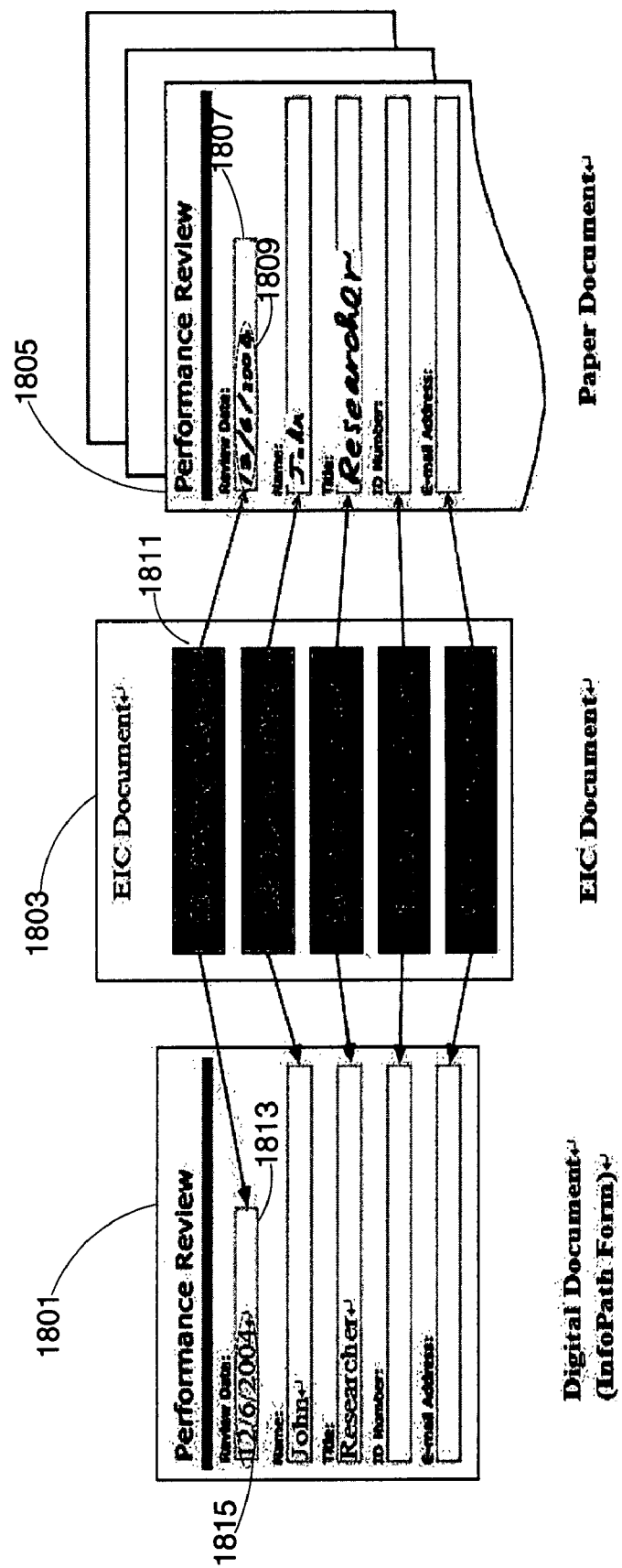
FIG. 18 illustrates a relationship between EIC document objects and strokes according to an embodiment of the invention.

FIG. 18 illustrates a relationship between EIC document objects and associated strokes according to an embodiment of the invention. Every field of interest (e.g., field 1807 of paper document 1805) has a corresponding EIC document object (e.g., EIC document object 1811 in EIC document 1803), which describes the position, type and some other application-specific information.

In the embodiment, every EIC document object contains corresponding information, including the position (x,y) of the field on paper and the XPath of the field in InfoPath form 1801. (The primary purpose of )(Path is to address parts of an Extensible Markup Language (XML) document.) When a stroke (ink) is written, InfoPath receives the stroke information. The stroke (e.g., stroke 1809) corresponds to a stroke object. The strokes object stores stroke data. The stroke object may include a Pen ID, which is a unique ID identifying the pen that writes the stroke, and binding information for binding the stroke object to one or more EIC document objects.

InfoPath then iterates over substantially all EIC document objects in the EIC document and finds the EIC document object that is nearest to the stroke (according to position information of fields on paper). By this means, InfoPath can figure out which EIC document object each stroke belongs to. The embodiment may associate different strokes with each other if the different strokes are associated with the same document entity, e.g., a user's signature. Each stroke may be associated with multiple stroke objects, which are mapped to the same or different EIC document objects. A stroke object is typically mapped to an EIC document object, although a stroke object may be mapped to a plurality of EIC document objects.

When a user requests InfoPath to convert strokes into character strings and to put the character strings (e.g., character string 1815) into fields (e.g., field 1813) of the InfoPath form 1801, InfoPath performs the conversion by the following:

For each EIC document object, InfoPath knows the strokes that belong to the EIC document object. InfoPath recognizes the strokes into text.

InfoPath gets the field in InfoPath form according to the XPath information, and puts the text into the field.

In the examples shown in FIGS. 16 and 17, a printed EIC pattern is embedded. However, the printed EIC pattern is typically inconspicuous to reduce visibility to a user while providing (x,y) information to uPen low layer module 1409 as shown in FIG. 14.

Printing with Custom PostScript Commands

Embedded Interaction Code (EIC) relates to data-embedding technology for encoding data and embedding the data into a digital document for device-surface interaction. Printing performance is important to EIC technology. The data size may present a significant problem and may pose a significant overhead to EIC printing. For example, there may be more than 100,000 coding characters in one A4 page of paper with EIC. The data size may be approximately 100 Mbytes when printing using common GDI functions. The printing process may occupy more than 100 Mbytes memory and may require more than 5 minutes to print one page. Furthermore, the data size increases with an increase of paper size and printer DPI. With such approaches, EIC printing is typically device dependent since most printers and computers can not satisfy the associated high demands. The printing overhead makes EIC page printing tedious and inconvenient to the user, especially for low bandwidth network printing.

Fast Embedded Interaction Code printing with custom postscript commands enables one to print EIC pages substantially faster and with less overhead than with GDI functions. Advantages of fast EIC printing with custom postscript commands include printer independence and overhead reduction when printing. With an embodiment of the invention, the data size is approximately 1 Mbyte per page, the printing process occupies approximately 10 Mbytes of memory, and the printing process requires approximately 1 minute to print one page.

The inclusion of an EIC pattern may cause common GDI printing to execute slowly from the perspective of the user. Printing poses a serious problem for the application of EIC documents. Fast Embedded Interaction Code printing with custom postscript commands addresses the problem.

Fast EIC printing creates well defined postscript commands and sends the postscript commands directly to a printer as will be discussed with FIG. 20. In embodiments of the invention, there are three types of postscript commands one can select: image command, text command and graphics command. The type of postscript command may be selected by the printing requirements as will be discussed with Table 1.

The first postscript command type utilizes an imagemask command to represent an EIC array. The imagemask command represents every point of the EIC pattern using one bit, so the data size of printing is reduced to approximately 10 percent of the original size. (Prior art typically uses 3 bytes to represent each dot of an EIC pattern.) The datasource of the imagemask command may also be a file, so that a compression filter can be used to achieve an even smaller data size. The data size may be further reduced to approximately 1 percent of the original size after using filters. FlateEncode compresses data using the public-domain zlib/deflate compression method. FlateEncode is a good general-purpose encoding that is useful for image data. An embodiment of the invention compresses the data using zlib compression and uncompresses the data using FlateDecode filter.

To improve the portability of the resulting data and avoid the problem of interference by operating systems or communication channels that preempt the use of control characters, the embodiment represents text as 7-bit characters and imposes line-length restrictions. The embodiment utilizes ASCII85Encode because the encoding is efficient. The embodiment cascades the FlateEncode filter and the ASCII85Encode filter to form a pipeline to pass portable data with a significantly reduced size.

The second postscript command type utilizes EIC codes (EIC symbols) that can be represented by user defined fonts. Every EIC array type comprises a set of EIC symbols. For example, a two bit-EIC array contains four kinds of EIC symbols, and an eight bit-EIC array contains 256 kinds of EIC symbols. (While an EIC representation, e.g., the EIC representation shown in FIG. 4A, may represent only one bit, other EIC representations may correspond to a plurality of bits.) The embodiment treats a set of EIC symbols as one font, and each kind of EIC symbol is a glyph (font character) of the font. Each EIC symbol comprises several dots, in which each dot is represented in a glyph by an outline, namely a rectangle.

Since there are at most 256 kinds of codes (EIC symbols) in one document with an eight bit-EIC array, one Type3 font is used to avoid the overhead of changing the font. A font character that has a value less than 33 is encoded by means of the \ddd escape convention. Since the length of one code is m*n bits (e.g., 8 dots wide and 8 dots high as shown in FIG. 22A, where each dot may be represented as 3 bytes), each EIC symbol requires substantially more than 8 bits. With a Type3 font code, font characters are represented by one byte so that the data size is dramatically decreased. At the same time, Type3 font is a PostScript level 1 feature and the postscript commands are compatible with all postscript printers. Since font operation is optimized for a PostScript Interpreter, the printing speed is also increased. Moreover, the printing operation is scalable, in which the data size does not increase when the printer DPI increases.

The third postscript command type is defined by graphics procedures. With the embodiment, one defines a procedure for each EIC symbol and inserts the associated procedure to an array object. For example, a point may be represented with command "rectfill" or "lineto". A code is outputted in the following steps: read data from the current file, transform the data to the relevant procedure, and execute the procedure. To output all codes, loops for line and column are needed. This method has the same advantages as the font approach. Because the third postscript command type is implemented using only basic graphics commands, there is no overhead as with font operations. The printing speed using graphics commands is the fastest among the three kinds of postscript commands as discussed above.

After data is created, the program sends the data to printer using GDI function ExtEscape with an escape function PASSTHROUGH.

Table 1 is the comparison among GDI printing and three postscript printing. Table 1 suggests that postscript printing achieves faster printing, much smaller data size, and less memory overhead with respect to GDI printing. From Table 1, the most appropriate postscript approach may be selected from the projected data size, printing speed, and memory size.

TABLE 1

Comparison between GDI Printing and PostScript Printing

| | Data size (M) | Printing speed (second/page) | Memory (M) | PS compatibility |
|---|---|---|---|---|
| GDI printing | 100 | 300 | 100 | PS1 |
| Image command | 1 | 90 | <10 | PS3 |
| Text command | <1 | 60 | <10 | PS1 |
| Graphics command | <1 | <60 | <10 | PS1 |

Figure 19:
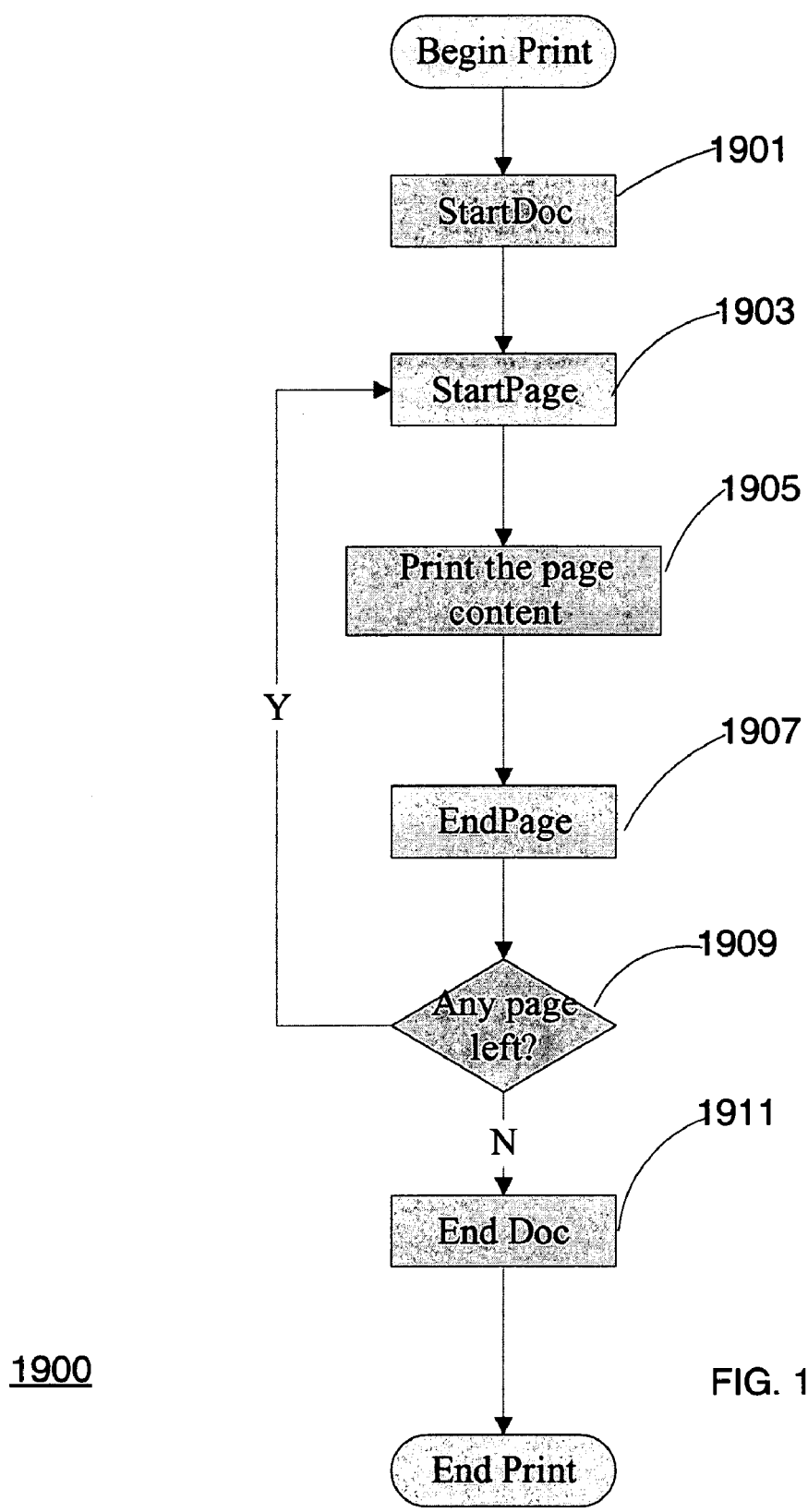
FIG. 19 shows a printing workflow according to prior art.

FIG. 19 shows printing workflow 1900 according to prior art. StartDoc 1901 is a GDI function used before printing a document. StartDoc 1901 ensures that multipage documents are not interspersed with other printing documents. StartPage 1903 is a GDI function used before printing one page and prepares the printer driver to accept data. The application calls GDI functions 1905 to print the page content. For example, GDI function DrawText draws some text and LineTo draws a line segment. EndPage 1907 is a GDI function executed after printing one page. It notifies the printer that the application has finished writing to a page. The process between the function pair of StartPage 1903 and EndPage 1907 is an integral one of printing the document. If there is another page left to print, as determined by step 1909, the application starts the process of printing an additional page. Otherwise, the application exits the loop of printing one page. EndDoc 1911 is a GDI function executed after printing one document. EndDoc 1911 ends a print job.

Figure 20:
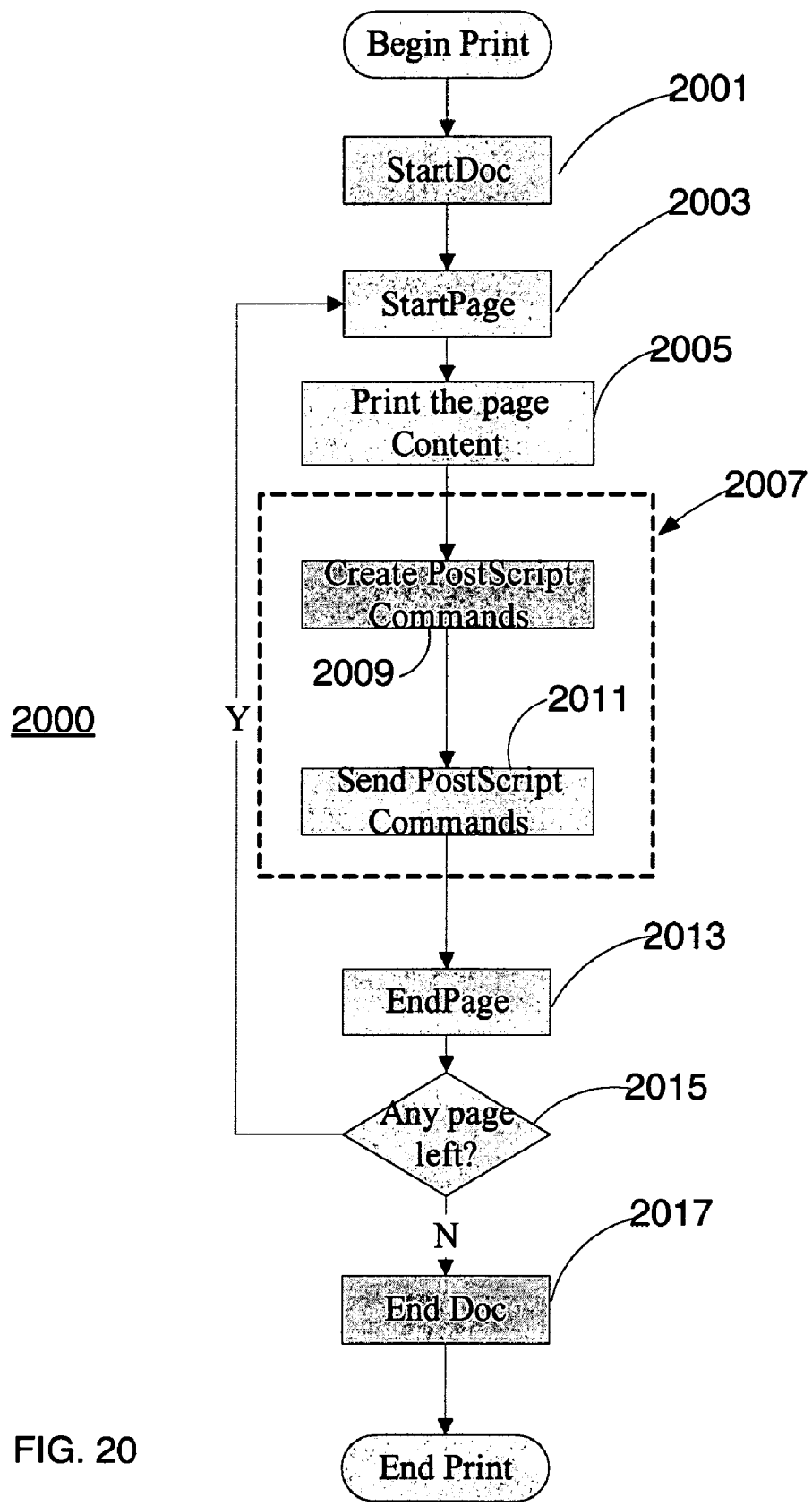
FIG. 20 shows a printing workflow with customized postscript commands according to an embodiment of the invention.

FIG. 20 shows printing workflow 2000 with customized postscript commands according to an embodiment of the invention. Compared with normal Windows printing process, two more steps (corresponding to steps 2009 and 2011) are added. (Steps 2001, 2003, 2005, 2013, 2015, and 2017 correspond to 1901, 1903, 1905, 1907, 1909, and 1911, respectively as shown in FIG. 19.) Added steps 2009 and 2011 are designated as process 2007 (shown as a dashed rectangle) in FIG. 20. The application creates defined custom postscript commands to represent the EIC patterns in step 2009. As previously discussed, there are three types of commands that are defined in the embodiment: image command, text command and graphics command. The application calls the GDI function ExtEscape to send postscript commands directly to the printer in step 2011.

Figure 21:
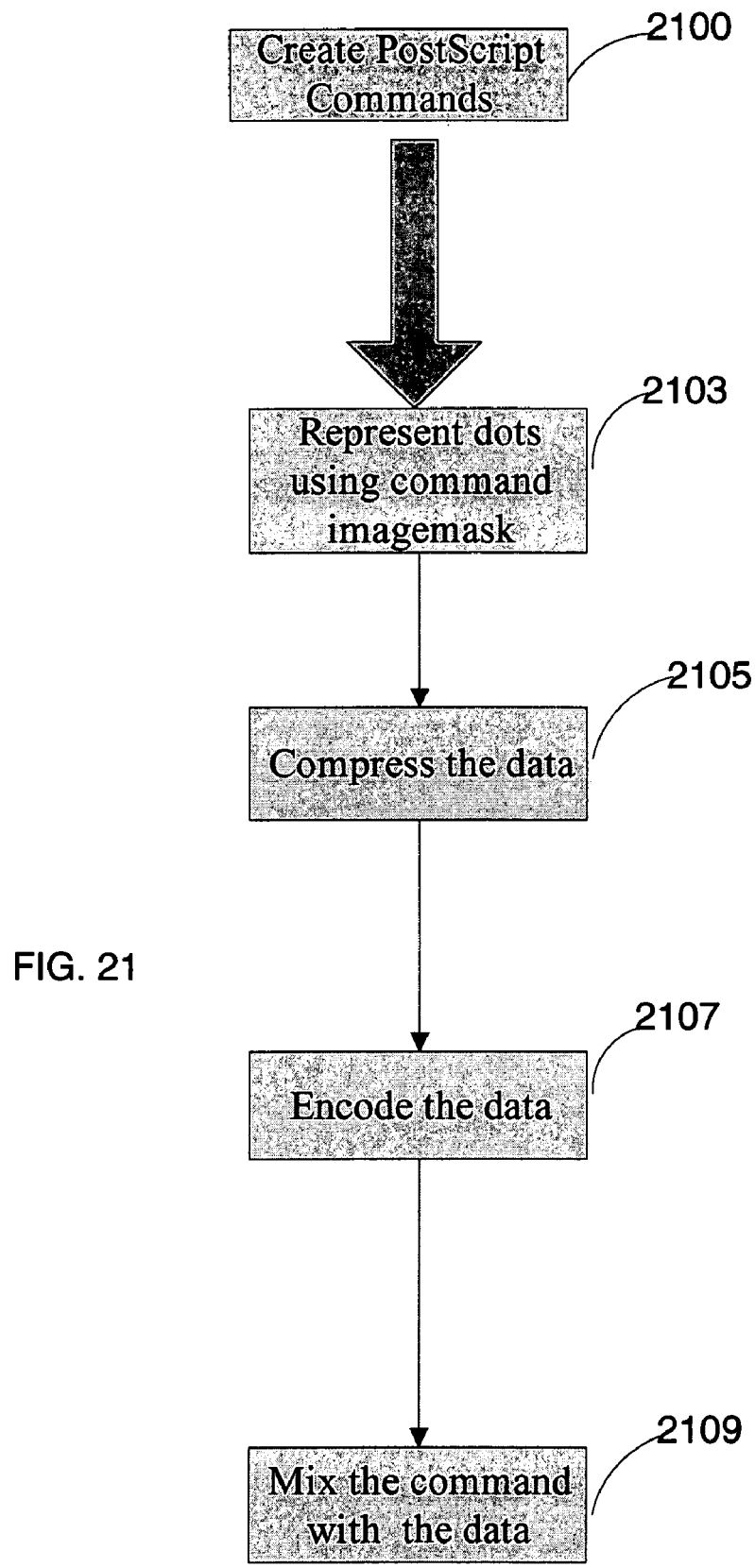
FIG. 21 shows a postscript process with an imagemask command according to an embodiment of the invention.

FIG. 21 shows postscript process 2100 with an imagemask command according to an embodiment of the invention. Process 2100 is expanded into steps 2103-2109. The command imagemask is a postscript command, which represents one dot of an EIC pattern with one bit in step 2103. Without postscript processing, each dot is typically represented by three bytes. Due to the huge number of dots, the data size is reduced but is still large. The application uses the zlib compression method to compress the data in step 2105. The method is a good general-purpose approach that is useful for image data. The data size is decreased to approximately 10 percent of the uncompressed data size. Since the data is in binary format in step 2105, there may be a problem of portability and interference of communication channels. To improve the portability of the resulting data, the embodiment utilizes an ASCII85Encode method in step 2107. The method is commonly used and is typically much more efficient compared with other encoding methods. Before sending the data to printer, the encoded data is mixed with the customized postscript commands to obtain a valid sequence in step 2109. In the sequence, the encoded data represents the dots, and customized postscript commands control the data. A sample customized postscript command is mystream defined in the following sample that is expressed in pseudo code.

```
1 Define the relevant PostScript command
2 Output all EIC symbols
      Get the data
         Loop for each line
            Loop for each EIC symbol in the line
               Represent each dot in EIC symbol with a bit
            End
         End
      Compress the data
      Encode the data
      Mix the command with the data
/mystream { currentfile /ASCII85Decode
                              Define the relevant PostScript command
filter /FlateDecode filter} def
gsave
   0 0 translate
   224 280 scale
   224 280 false [224 0 0 280 0 0]
                              Output all EIC symbols
mystream
   imagemask
   Gau0E>E0pY$se%+Puu . . . ~>
grestore
```

Figure 21A:
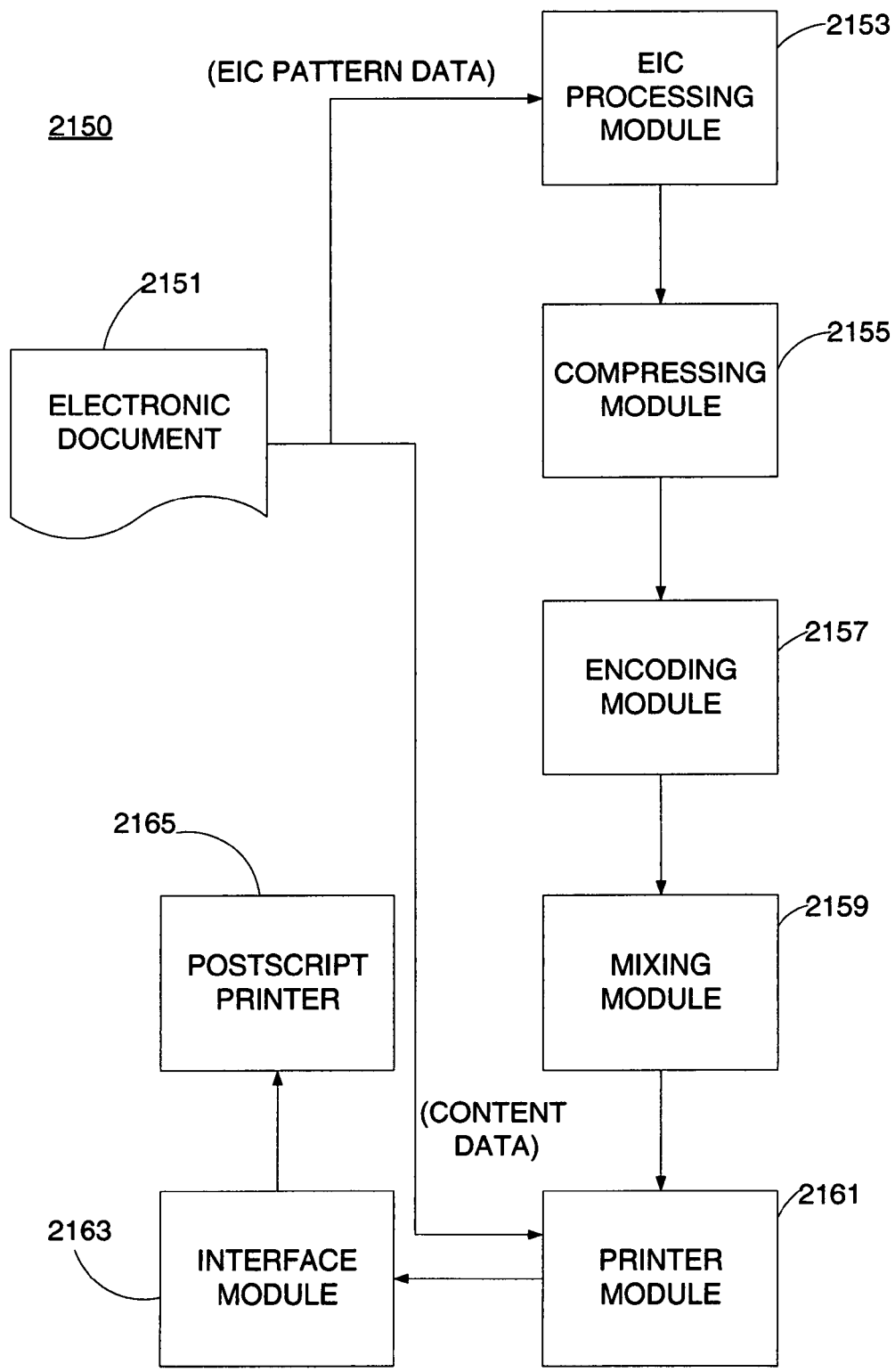
FIG. 21A shows apparatus that performs the processes shown in FIGS. 20 and 21 according to an embodiment of the invention.

FIG. 21A shows apparatus 2150 that performs the processes shown in FIGS. 20 and 21 according to an embodiment of the invention. EIC processing module 2153 processes electronic document 2151 in order to represent the dots of the EIC pattern with imagemask commands (referenced as EIC pattern data and corresponding to step 2103 as shown in FIG. 21). Compressing module 2155 compresses (using zlib compression) the EIC processed data (corresponding to step 2105). Encoding module 2157 encodes (using ASCII85Encode) the compressed data (corresponding to step 2107). Mixing module 2159 mixes the encoded EIC data with the customized commands. Printer module 2163 instructs postscript printer 2165 to print the EIC pattern through interface module 2161. Printing module 2163 also receives page content and instructs postscript printer 2165 to print the page content. The printing of page content corresponds to step 2005 and the printing of the EIC pattern corresponds to steps 2009 and 2011 as shown in FIG. 20.

Figure 22:
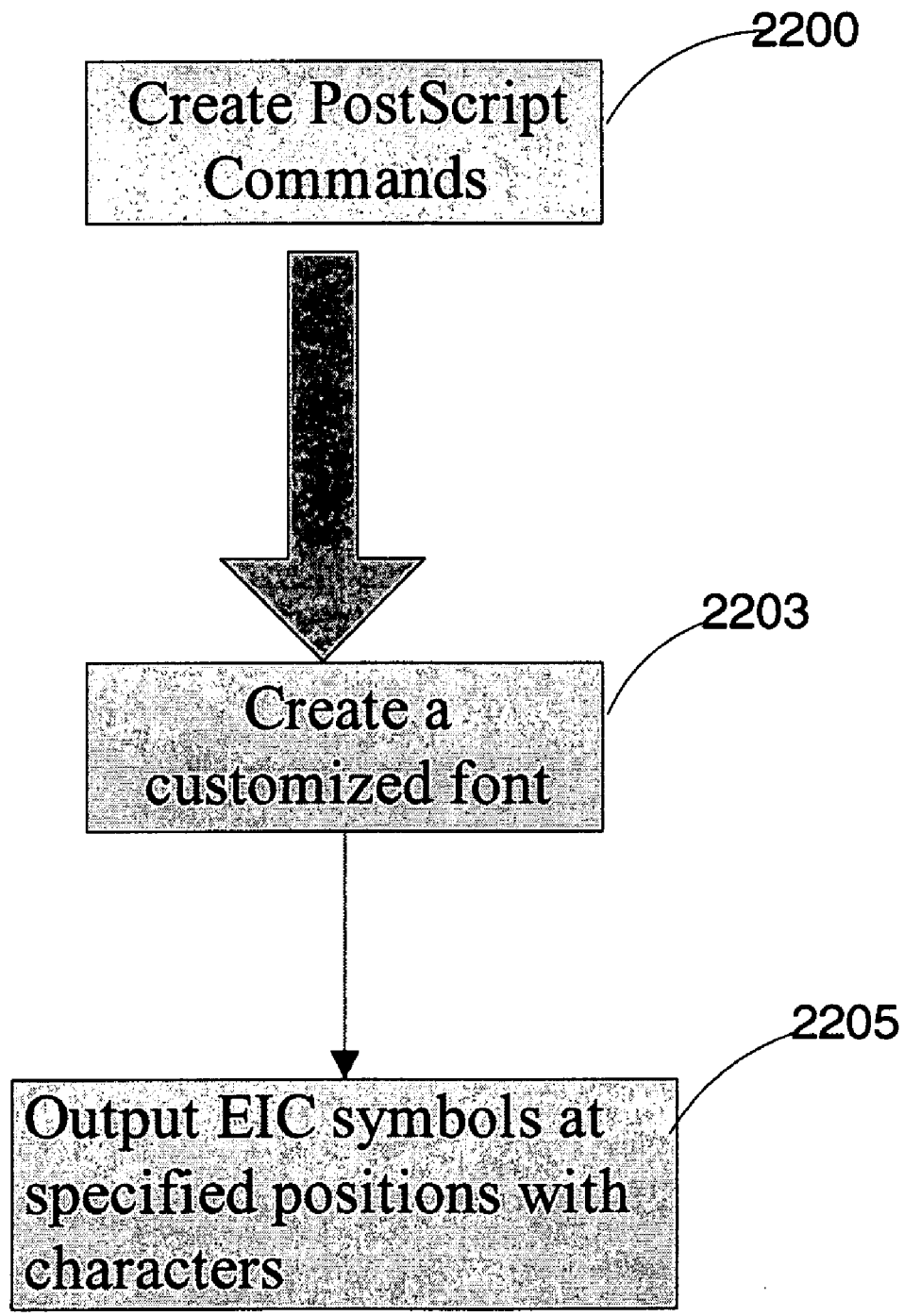
FIG. 22 shows a postscript process with a font command according to an embodiment of the invention.
Figure 22A:
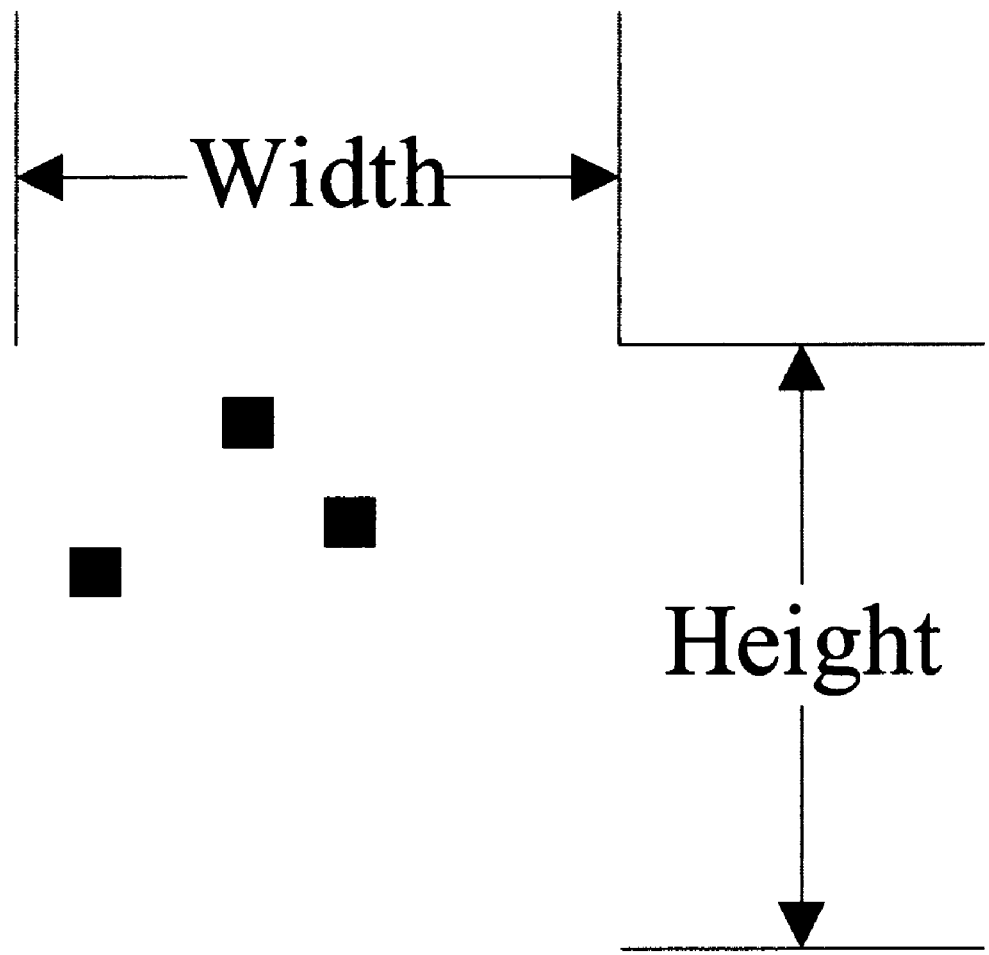
FIG. 22A shows an enlarged EIC symbol according to an embodiment of the invention.

FIG. 22 shows postscript process 2200 with a font command according to an embodiment of the invention. Process 2200 for printing with customized postscript commands is expanded with steps 2203-2205. In step 2203, process 2200 creates a customized collection of postscript characters. Every EIC array is made up of a set of EIC symbols. In step 2205, each EIC array is represented with one Type3 PostScript font. One EIC symbol in the EIC array is represented by a corresponding character in the font. FIG. 22A shows an enlarged EIC symbol according to an embodiment of the invention. (Without postscript processing, the data size of one EIC symbol is typically equal to height*width*3 bytes, in which each dot of the EIC symbol is represented by three bytes. Height corresponds to the number of dots in the vertical direction; width corresponds to the number of dots in the horizontal direction.) The data size of one character with postscript process 2200 is essentially 1 byte, thus greatly reducing the data size in comparison without postscript processing. The following pseudo code listing provides an example using a Type3 PostScript font.

```
1 Create a customized Type3 font
      Define the common font properties
      Loop from 1 to 256
         Define each member of the font
      End
2 Output all EIC symbols
      Loop for each line
         Loop for each EIC symbol in the line
            Output one EIC symbol
         End
      End
```

The following listing is an example of a customized PostScript Type3 font, which comprises 256 characters. The example provides details for two of the 256 characters.

| | |
|---|---|
| 8 dict begin | Begin to define a font. |
| /FontType 3 def | This is a Type3 font. |
| /FontMatrix [0.000977 0 0 0.000977 0 0] def | |
| | Specify some attributes of the font |
| /FontBBox [0 0 1024 1024] def | |
| /Encoding 256 array def | There are 256 characters in the |
| 0 1 255 {Encoding exch /.notdef put} for | |
| Encoding 33 /symbol__33 put | font. Encode each character with |
| Encoding 34 /symbol__34 put | the number from 0 to 255. So each |
| . . . | character can be represented with one byte. |
| /CharProcs 256 dict def | |
| CharProcs begin /.notdef { } def | |
| /symbol__33 { 16 528 32 32 rectfill . . . } bind def | Define the outline of each |
| /symbol__34 { 16 528 32 32 rectfill . . . } bind def | character. |
| . . . | |
| end | |
| /BuildGlyph { 1024 0 0 0 1024 1024 | |
| setcachedevice exch /CharProcs get exch 2 copy | |
| | Procedures to construct the |
| known not {pop /.notdef} if get exec } bind def | |
| | requested glyph. |
| /BuildChar { 1 index /Encoding get exch get 1 | |
| index /BuildGlyph get exec } bind def | |
| currentdict end | End of defining a font |
| /MyPatternFont exch definefont pop | Define MyPatternFont as the created Type3 font. |

Figure 23:
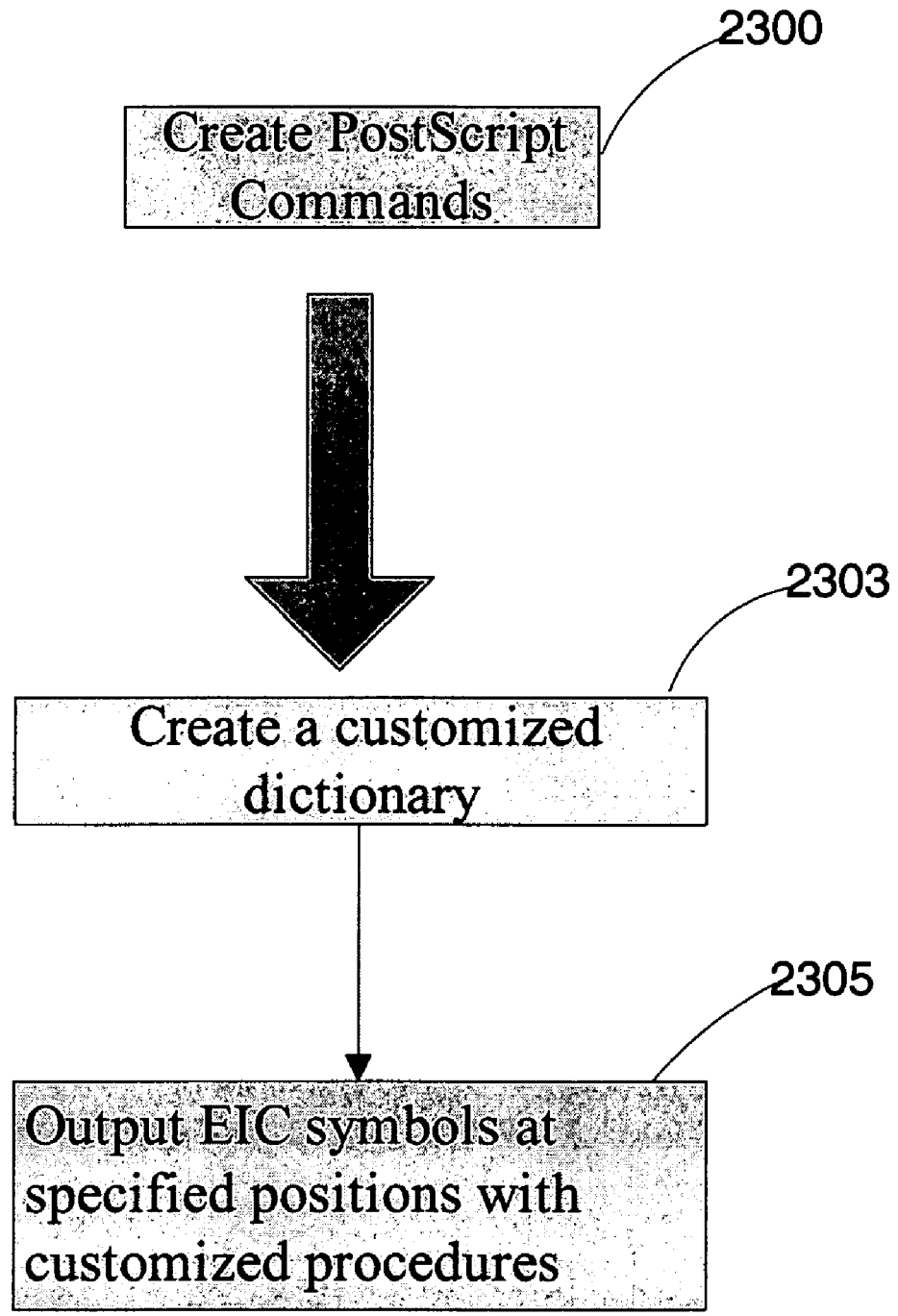
FIG. 23 shows a postscript process with a graphics command according to an embodiment of the invention.

FIG. 23 shows postscript process 2300 with a graphics command according to an embodiment of the invention. Process 2300 for printing with customized PostScript commands are expanded with steps 2303 and 2305. Every EIC array is made up of a set of EIC symbols. One EIC array is represented with one customized PostScript dictionary (as specified in step 2303), which defines a set of procedures. In step 2305, each EIC symbol in the EIC array is represented by one procedure in the dictionary. (Without postscript processing, the data size of one EIC symbol is height*width*3 bytes as previously discussed. Height means the number of dots in the vertical direction; width means the number of dots in the horizontal direction.) The data size of one procedure is a little more than 1 byte with this approach. The data size is greatly reduced.

```
1 Create a customized PostScript dictionary
        Loop from 1 to 256
                Define each member of the dictionary
        End
2 Create a customized PostScript command to output all EIC symbols
        Loop for each line
                Loop for each EIC symbol in the line
                        Output each EIC symbol
                End
        End
3 Output all EIC symbols
        Loop for each line
                Loop for each EIC symbol in the line
                        Output each EIC symbol using the code of
the relevant procedure in the dictionary
                End
        End
```

The following listing illustrates an example of a customized PostScript according to an embodiment of the invention.

| /MyProcDict 256 dict def | Define the customized PostScript dictionary. There are 256 procedures in the dictionary. |
| --- | --- |
| MyProcDict 0 {0 8 1 1 rectfill . . . } put | |
| MyProcDict 1 {0 8 1 1 rectfill . . . } put | Define each procedure in the dictionary. |
| . . . | |

The following listing illustrates an example of a customized PostScript command to output EIC symbols.

| /MyProc | MyProc is a customized PostScript command to output EIC symbols. |
| --- | --- |
| { | |
| 4768 −16 translate | |
| 426 | Loop to output each line. |
| { | |
| −4768 16 translate | |
| 298 | Loop to output EIC symbol in the line. |
| { | |
| MyProcDict | |
| currentfile read pop cvi get exec 16 0 translate | |
| } repeat | End of loop to output EIC symbol in the line. |
| } repeat | End of loop to output each line. |
| }def | |

Figure 23A:
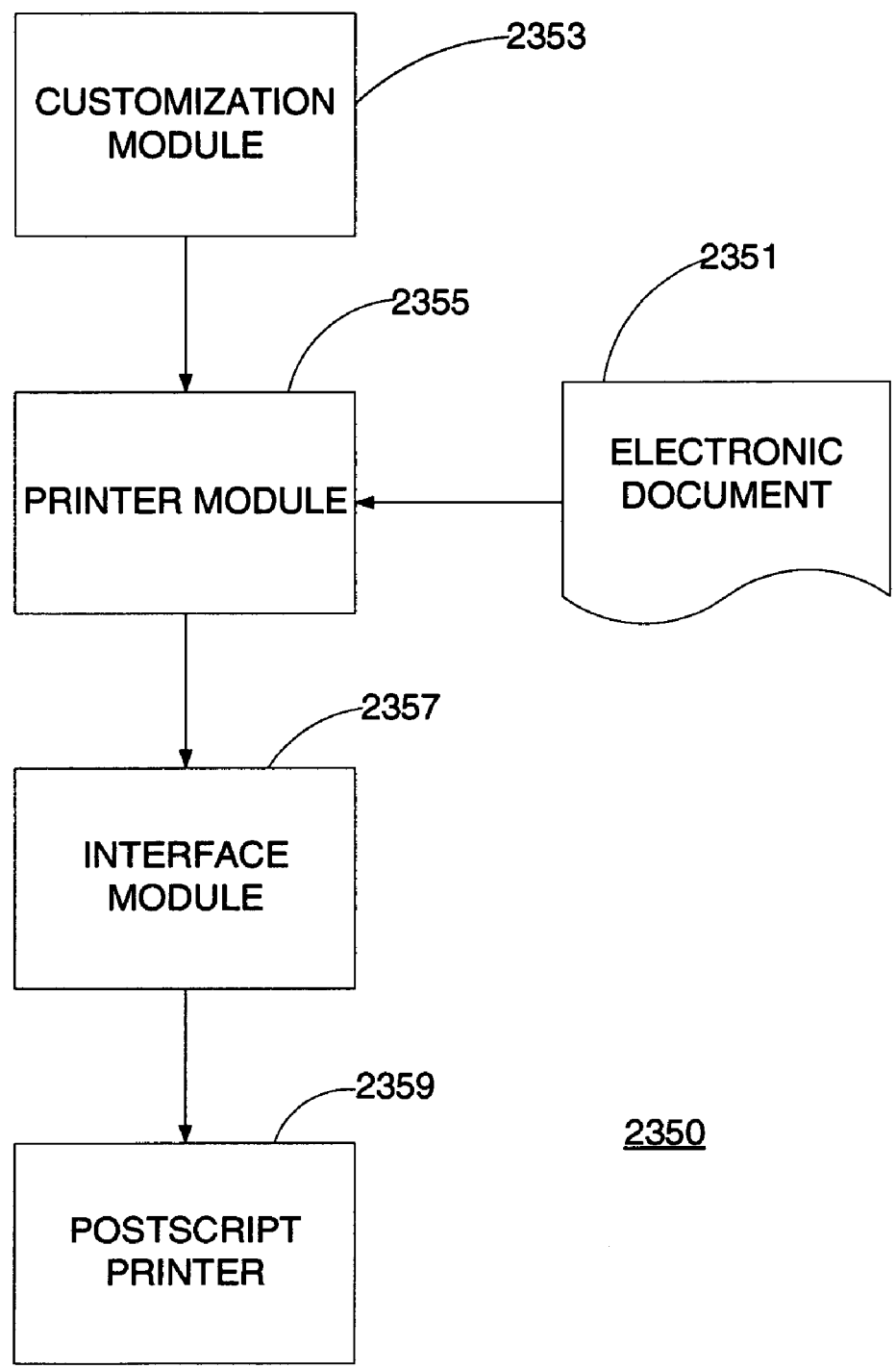
FIG. 23A shows apparatus that performs processes shown in FIGS. 20, 22, and 23 according to an embodiment of the invention.

FIG. 23A shows apparatus 2350 that performs processes shown in FIGS. 20, 22 and 23 according to an embodiment of the invention. Customization module 2353 creates a collection of postscript components with a customized dictionary of procedures (corresponding to step 2303 as shown in FIG. 23) or a customized font (corresponding to step 2203 as shown in FIG. 22). Printer module 2355 selects appropriate postscript components in order to represent the EIC pattern of electronic document 2351. As shown in FIG. 20, printer module initiates the printing of page content and then initiates the printing of the EIC pattern for the corresponding page on postscript printer 2359 through interface module 2357.

EIC Printing with Microsoft Office Documents

The ability to print an Office document with an EIC pattern facilitates integration of an image capturing pen (e.g., uPen) with Microsoft Office applications. Some special methods may be used when printing the documents of Microsoft® Word, PowerPoint® and InfoPath™. Corresponding methods will be discussed.

Figure 24:
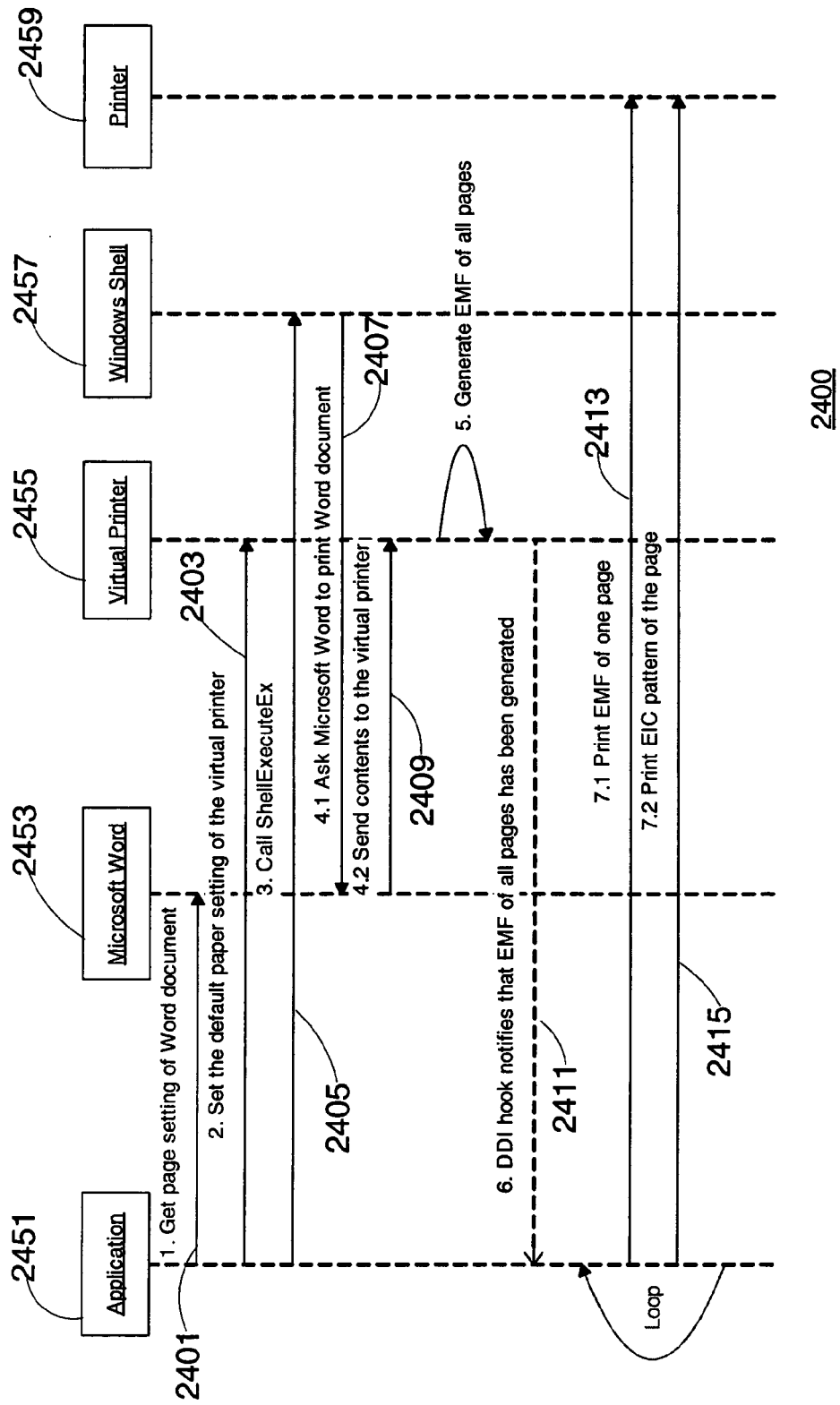
FIG. 24 shows a process for printing a Word document with an EIC pattern according to an embodiment of the invention.

FIG. 24 shows a process 2400 for printing a Word document with an EIC pattern according to an embodiment of the invention. There is no direct way to render one page of a Word document to device context with the APIs exposed by Microsoft Word 2453, so the embodiment of the invention utilizes a method to print the EIC pattern together with the original page content. The method incorporates virtual printer driver 2455. Virtual printer driver 2455 is a printer driver installed on a local computer. Virtual printer driver 2455 comprises a print processor, a printer local monitor, a DDI hook, and a user interface (UI). When a user prints a file from Microsoft Word 2453, virtual printer 2455 intercepts the spooled print job in EMF format and saves it. Process 2400 subsequently prints the EMF file with the EIC pattern at printer 2459.

Process 2400 performs the following:
  Application 2451 obtains the paper setting information by calling the automation interface of Microsoft Word by:
    Creating a Word Application object wo.
    Calling the OpenDoc method of wo to open the Word document.
    Obtaining the page setup information from the document attribute.
  Set the default paper setting to the virtual printer. When a new job comes, printer 2459 prints the job with its default paper setting.
  Print the Word document to virtual printer 2455 using Windows® shell 2457 by:
    Setting SHELLEXECUTEINFO with "printto\\command", and the virtual printer device name and port name, and printing file path.
    Calling Win32 API ShellExecuteEx with above parameters.
  Windows shell 2457 starts Microsoft Word 2453 and prints the file to virtual printer 2455.
  Virtual printer 2455 intercepts all pages and saves them in EMF format.
  Monitor the end of the printing to virtual printer 2455, and start printing to the actual printer 2459 when it is finished.
  Print each page of EMF and then print the EIC pattern by:
    Getting printable area of the printer 2459.
    Printing each page of EMF within printable area.
    Generating the EIC image for the printable area of the current page.
    Printing the EIC pattern image.

Referring to FIG. 24, process 2400 performs the following steps. Application 2451 starts Microsoft Word 2453, requests Microsoft Word 2453 to open the specified Word document, and gets the page setting of the document, e.g., the page size, in step 2401. In step 2403, application 2451 then sets the default paper setting of the virtual printer according to the page setting of the document. In step 2405, application 2451 calls ShellExecuteEx (which is contained in Windows Shell 2457) to print the document using virtual printer 2455. The following listing illustrates pseudocode for ShellExecuteEx as invoked by step 2405.

```
SHELLEXECUTEINFO sei;
sei.lpFile = <The path of the Word document>;
sei.lpVerb = "printto";
sei.lpParameters = <The information of the virtual printer>;
ShellExecuteEx(&sei);
```

In step 2407, Windows shell 2457 asks Microsoft Word to print the document using virtual printer 2455. Virtual printer executes printing, and generates EMF of all pages in response to Microsoft Word sending the contents in step 2409. In step 2411, DDI hook notifies that EMF of all pages has been generated.

Application 2451 repeatedly initiates printing a page on printer 2459 for each page of the document by executing the following steps, one time per page. In step 2413, application 2451 instructs printer 2459 to print the EMF of one page. Application 2451 subsequently instructs printer 2459 to print the EIC pattern of the page in step 2415.

Figure 25:
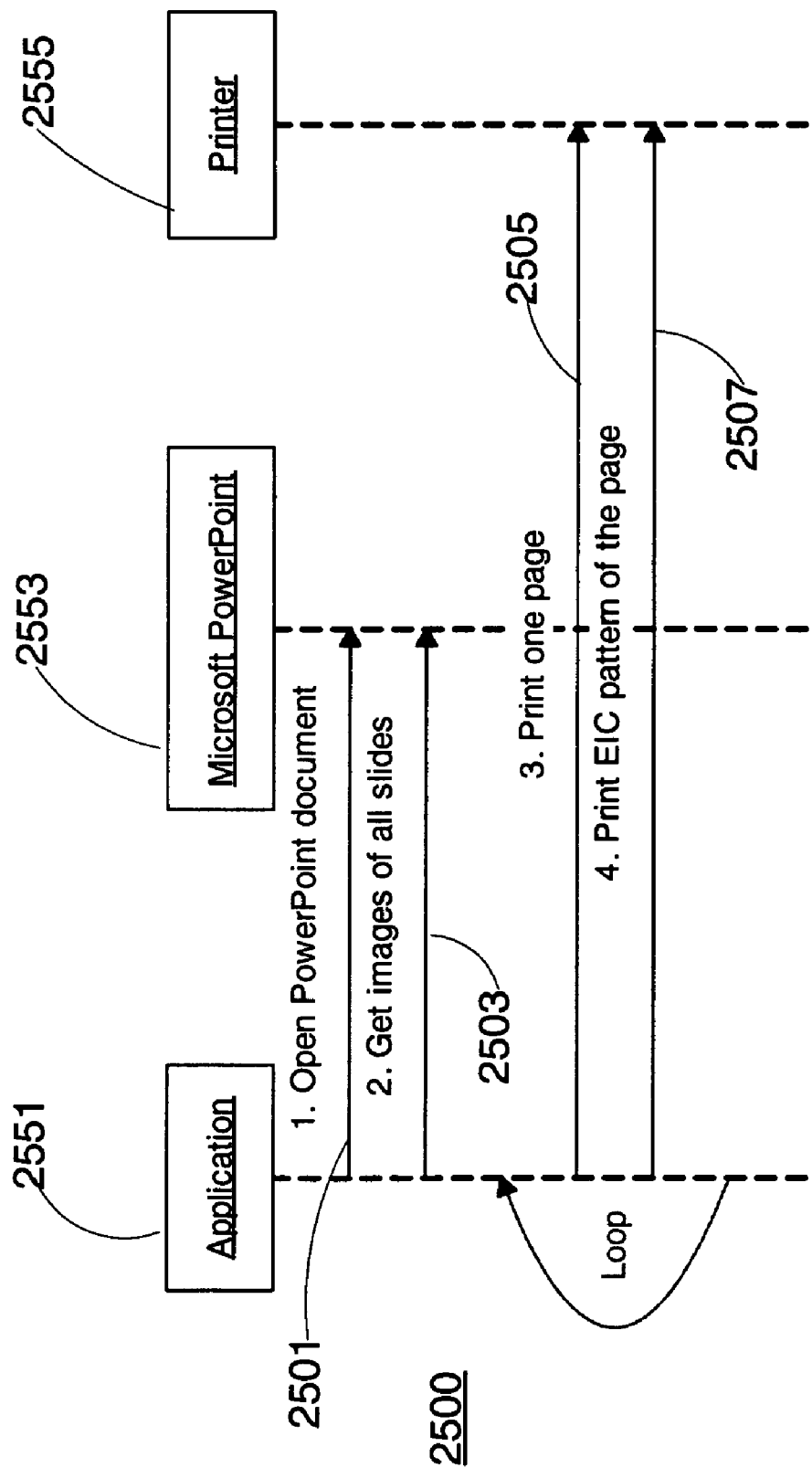
FIG. 25 shows a process for printing a PowerPoint document with an EIC pattern according to an embodiment of the invention.

FIG. 25 shows process 2500 for printing a PowerPoint document with an EIC pattern according to an embodiment of the invention. (FIG. 16 illustrates an example of a PowerPoint document as previously discussed.) An objective in printing an EIC pattern with PowerPoint is to generate the command control (e.g., controls 1601-1623) of the EIC document in the processing of printing. Process 2500 uses the interfaces of the PowerPoint object model to enumerate slides and to save a slide into an image file. Process 2500 performs the following:

Application 2551 launches PowerPoint application 2553 and opens the PowerPoint file.

Application 2551 gets slides count and allocates all slides in different pages, where each page contains three slides. (Another embodiment may allocate a different number of slides per page.)

For each page, application 2551 instructs printer 2555 to draw three slides on the left, draw several lines on the right of each slide image for note-taking, and draw play control buttons at the bottom of each page. These buttons, including Open, Close, Show, Quit Showing, First, Previous, Next, and End, are used to play slides using uPen.

Application 2551 instructs printer 2555 to print the associated EIC pattern as the background of each page.

Referring to FIG. 25, application 2551 starts Microsoft PowerPoint 2553 and asks PowerPoint to open the specified PowerPoint document in step 2501. Application 2551 obtains images of all slides of the document from Microsoft PowerPoint 2553 in step 2503. Steps 2551 and 2553 is repeatedly executed, one time per page.

Application 2551 allocates and arranges the image of one page. Referring to FIG. 16 application 2551 draws 3 slides of images on the left of the page. To the right of each slide area, application 2551 draws several lines as the note-taking area on the page. At the bottom of the page, application 2551 draws eight command buttons, representing "open slides", "close slides", "play slides", "quit playing", "go to the first slide", "go to the previous slide", "go to the next slide", and "go to the last slide". After the image of the page has been prepared, application 2551 prints this page in step 2505. Application 2551 subsequently prints the EIC pattern of the page in step 2507.

Figure 26:
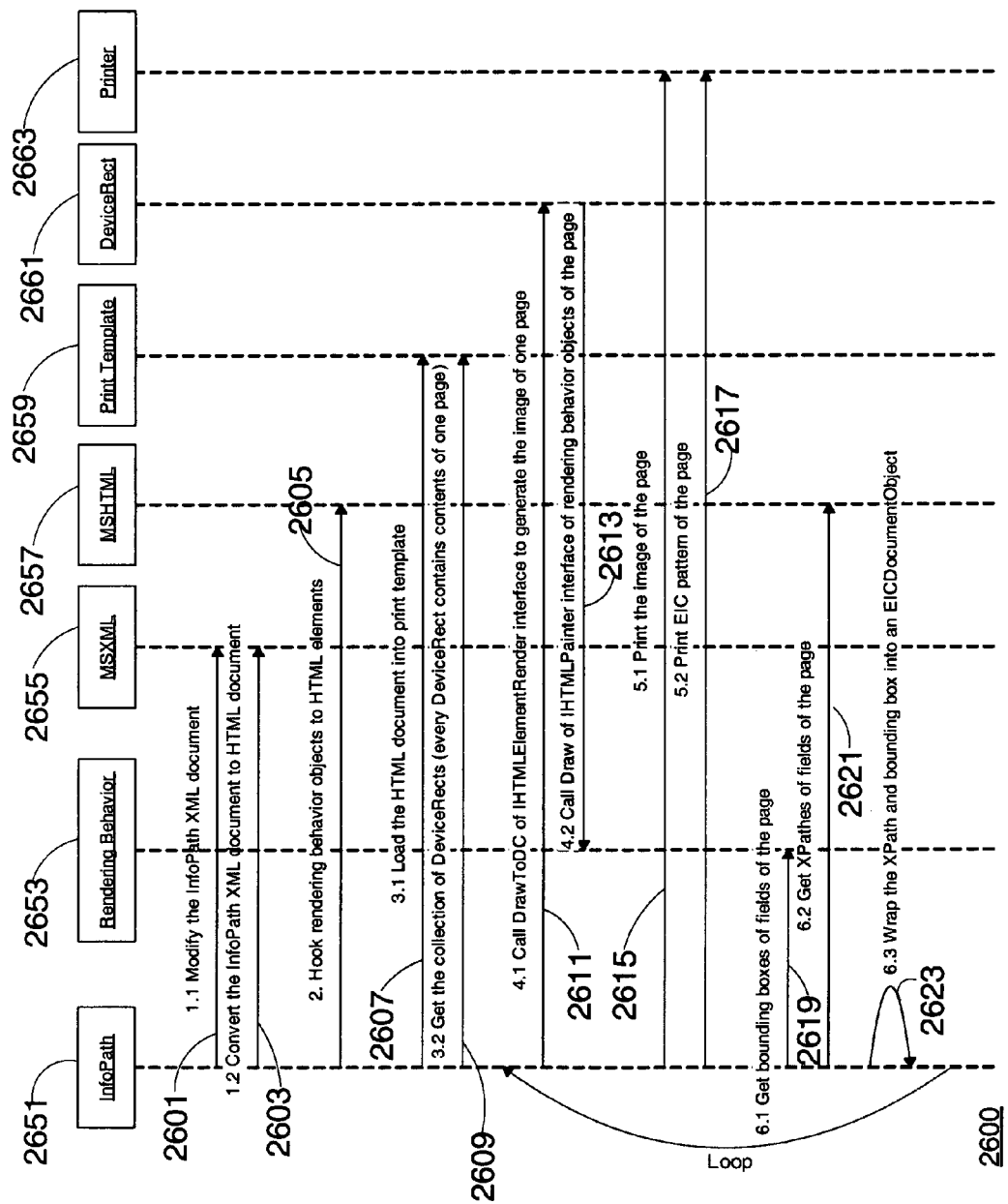
FIG. 26 shows a process for printing an InfoPath XML document with an EIC pattern according to an embodiment of the invention.

FIG. 26 shows process 2600 for printing an InfoPath XML document with an EIC pattern according to an embodiment of the invention. The printing and display functionality of InfoPath depends on MSHTML. Integrating uPen with InfoPath is challenging, simply because there is no direct way to separate an HTML document into pages and to render them to a device context page by page. An even more difficult issue related to information synchronization is about how to calculate the position of HTML elements during the printing process. The following method supports the printing of InfoPath documents with an EIC pattern.

In the embodiment, an InfoPath document has an XML format. The document is transformed by XSLT to an HTML document before printing, and the resulting HTML document is printed. The synchronization from a paper document to an InfoPath digital document is more than ink recovery. For example, the ink (i.e., associated strokes) should be recognized and the result inserted into the corresponding XMLDOMNode. The relationship between every HTML element and the corresponding XMLDOMNode, i.e., XPath should be recorded. First, XMLDOMDocument is modified to assure that every XMLDOMNode possesses an attribute for its XPath, e.g., xpath="/my:myFields/my:group1/my:field1". XSL transformation is modified, using xsl:attribute, to create attribute nodes and attach the attribute nodes to the corresponding output HTML elements.

Another consideration is to obtain the position of every field (strictly speaking, HTML element) on the printed paper. A rendering behavior object is implemented and attaches its instance to every concerned HTML element. The behavior object has implemented and exposed an IHTMLPainter interface. Thus, a bounding box is obtained for every HTML element when the IHTMLPainter::Draw is called during printing process 2600.

With InfoPath, the printing of an HTML document is based on the print template, which loads the HTML document and separates the HTML document into pages. After the HTML document is completely loaded by the print template, one obtains layout information of pages, e.g., the DeviceRect and LayoutRect element of every page. Since the DeviceRect implements the IHTMLElementRender interface, process 2600 may call IHTMLElementRender::DrawToDC to print the content of every page. Thus, process 2600 may create a memory device context and subsequently call IHTMLElementRender::DrawToDC to draw a page to the memory device context. Finally, process 2600 obtains a page image. As discussed above, one creates a printer device context (DC and designated as IHTMLElementRender::DrawToDC) to print the content of every page and immediately followed by a call to print the EIC pattern.

For every field, process 2600 wraps relevant information, e.g., XPath and the position in paper document with an object, and delegates the object as an EIC document object to the EIC document.

Referring to FIG. 26, InfoPath 2651 calls XSLT (MSXML) 2655 in step 2601 to transform the InfoPath XML document to an HTML document in step 2603. InfoPath 2651 modifies the InfoPath XML document. For each node in the InfoPath XML document, InfoPath 2651 obtains its XPath and then adds an attribute to the node according to the XPath, e.g. xpath="/my:myFields/my:group1/my:field1". Subsequently, InfoPath 2651 changes the XSLT, using xsl:attribute to create attribute nodes in accordance with the xpath attribute of nodes in the InfoPath XML document. By this means, every corresponding output HTML element will have an xpath attribute corresponding to the node of the InfoPath XML document. InfoPath 2651 calls XSLT (which is a functionality of MSXML 2655) to transform the InfoPath XML document to the HTML document.

InfoPath 2651 attaches a rendering behavior object to every HTML element in step 2605. Every rendering behavior implements an interface called IHTMLPainter.

InfoPath utilizes a print template to process the HTML document. In step 2607, InfoPath 2651 loads the HTML document into a print template. In step 2609, InfoPath 2651 obtains a collection of DeviceRect through the print template. Each DeviceRect contains contents of a page of the HTML document.

Steps 2611-2623, as will be discussed, are repeatedly executed for each page.

InfoPath 2651 generates images of all pages. Every DeviceRect implements an interface called IHTMLElementRender. By calling the DrawToDC method of this interface in step 2611, InfoPath 2651 can obtain the image of each page. In step 2613, the Draw method of IHTMLPainter of HTML elements is called. With the Draw method, process 2600 obtains bounding boxes of the HTML elements.

InfoPath 2651 subsequently prints one page. In step 2615, InfoPath 2651 prints the image of one page. InfoPath 2651 then prints the EIC pattern of the page in step 2617.

For each HTML element, InfoPath 2651 wraps information into an EICDocumentObject. In step 2619, InfoPath 2651 gets the bounding box of an HTML element. In step 2621, InfoPath 2651 obtains the XPath from the xpath attribute of the HTML element. InfoPath 2651 wraps corresponding information (XPath and bounding box) into an EICDocumentObject in step 2623.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

We claim:

1. A method performed by a computer having a memory and a processor, the method comprising:

with a processor, generating a one-dimensional sequence of numbers that does not repeat over a length n;

generating a two-dimensional array of numbers by folding the one-dimensional sequence of numbers;

generating an EIC pattern by, converting each number in the two-dimensional array into a graphical representation corresponding to an EIC symbol, each EIC symbol having an associated grid pattern and a plurality of dots, so that when an image of a portion of the EIC pattern is captured, the position of the image relative to the pattern can be determined by decoding the EIC symbols in the captured image, determining a unique document identifier for the electronic document, and embedding, within the EIC pattern, the determined unique document identifier as metadata so that position information and the document identifier can be decoded by analyzing the EIC pattern;

for each unique EIC symbol of the EIC pattern, creating a set of postscript commands to print the EIC symbol so that there exists one set of postscript commands for each unique EIC symbol;

associating a portion of the EIC pattern with each page of the electronic document;

storing an EIC array allocation within an EIC document, the EIC array allocation storing mappings of each page of the electronic document to a unique portion of the EIC pattern associated with the page so that when a page is printed, the page can be uniquely identified using the stored mappings and the portion of the EIC pattern associated with the page, wherein the EIC document is not a physical document and is stored separately from any version of the electronic document and wherein the EIC document contains an unencoded URL associated with the electronic document, compressed images of pages of the electronic document, an indication of a document version associated with the electronic document, and a plurality of EIC document objects, each EIC document object providing an association between a region on a physical document corresponding to a printed version of the electronic document and an object of the electronic document;

preparing an associated printer driver to accept data;

printing page content for a selected page of the electronic document;

for each EIC symbol within the portion of the EIC pattern associated with the selected page, executing the set of postscript commands to print the EIC symbol; and providing a notification that printing the selected page is complete.

2. The method of claim 1, further comprising:

customizing a collection of postscript components; and selecting the set of postscript commands from the collection of postscript components.

3. The method of claim 1, further comprising:

ascertaining that pages of the electronic document are not interspersed with another electronic document during a print job.

4. The method of claim 3, further comprising:

ending the print job.

5. The method of claim 1, wherein outputting the set of postscript commands comprises:

representing each dot of the EIC pattern with a corresponding bit; and obtaining postscript data that represents the EIC pattern.

6. The method of claim 5, wherein outputting the set of postscript commands further comprises:

compressing the postscript data to obtain compressed data;

encoding the compressed data to obtain encoded data; and mixing the encoded data with the postscript commands to obtain a valid sequence.

7. The method of claim 6, wherein compressing the postscript data is performed via zlib compression.

8. The method of claim 6, wherein encoding the compressed data is performed via ASCII85Encode.

9. The method of claim 1, wherein outputting the set of postscript commands comprises:
representing each EIC symbol of the EIC pattern with a corresponding font character.

10. The method of claim 9, wherein the corresponding font character is a member of a Type3 postscript font.

11. The method of claim 1, wherein outputting the set of postscript commands comprises:
representing each EIC symbol of the EIC pattern with a corresponding procedure, wherein the corresponding procedure is a member of a dictionary.

12. The method of claim 1, wherein preparing an associated printer driver to accept data, printing page content for a selected page of the electronic document, and providing a notification that printing the selected page is complete utilize a GDI function.

13. The method of claim 1, further comprising:
determining a postscript approach based on at least one printing parameter.

14. The method of claim 13, wherein the at least one printing parameter is selected from the group consisting of a data size of the electronic document and a memory size associated with the method.

15. The method of claim 13, wherein a postscript command is selected from the group consisting of an imagemask command, a font command, and a graphics command.

16. Apparatus that prints an electronic document with an embedded interaction code (EIC) pattern, comprising:
an interface module that interfaces with a postscript printer;
a customization module that creates a collection of postscript components to represent possible EIC patterns, each EIC pattern including a plurality of EIC symbols having an associated graphical representation and an associated set of postscript commands for printing the graphical representation so that when an image of a portion of the EIC pattern is captured, the position of the image relative to the pattern can be determined by decoding the EIC symbols in the captured image;
an EIC array allocation module that, for each page of the electronic document, allocates a unique portion of an EIC pattern to the page and that stores a mapping of each page of the electronic document to the unique portion of the EIC pattern allocated to that page so that when an image of a page is captured, the page can be uniquely identified by the portion of the EIC pattern in the captured image, wherein the mapping and the electronic document are stored separately; and
a printer module that, in response to receiving a request to print a page of the electronic document,
determines a portion of an EIC pattern allocated to the page of the electronic document at least in part by accessing the stored mapping of the page to the portion of the EIC pattern allocated to the page, and
for each EIC symbol in the determined portion of the EIC pattern, determines a set of postscript commands from the collection of postscript components to represent the EIC symbol and that provides the set of postscript commands to the interface module to print the page of the electronic document.

17. The apparatus of claim 16, wherein the collection of postscript components comprises a collection of font characters.

18. The apparatus of claim 16, wherein the collection of postscript components comprises a collection of procedures.

19. Apparatus that prints an electronic document with an embedded interaction code (EIC) pattern, comprising:
an interface module that interfaces with a postscript printer;
an EIC pattern module that generates an EIC pattern for an electronic document, the EIC pattern including a plurality of EIC symbols having an associated graphical representation comprised of a plurality of dots and an associated set of postscript commands for printing the graphical representation so that when an image of a portion of the EIC pattern is captured, the position of the image relative to the pattern can be determined by decoding the EIC symbols in the captured image;
an EIC array allocation module that allocates a unique portion of an EIC pattern to a page of the electronic document and that stores a mapping of the page of the electronic document to the portion of the EIC pattern allocated to the page so that when the page is printed, the portion of the EIC pattern on the page can be used to uniquely identify the page, wherein the mapping and the electronic document are stored separately;
an EIC processing module that, for a page of the electronic document,
obtains EIC pattern data corresponding to the portion of the EIC pattern allocated to the page, and
converts a bit of information for each dot of the EIC pattern to form processed data;
a compression module that compresses the processed data to form compressed data;
an encoder module that encodes the compressed data to form encoded data;
a mixer module that mixes the encoded data with customized postscript commands to obtain valid sequences; and
a printer module that instructs the postscript printer, through the interface module, to print page content and the portion of the EIC pattern associated with the page content.

20. A method performed by a computer having a memory and a processor, the method comprising:
with a processor, generating an embedded interaction code pattern;
for each of a plurality of pages of the electronic document,
allocating a unique portion of the generated embedded interaction code pattern to the page, wherein each of the plurality of pages is associated with a different portion of the generated embedded interaction code pattern, and
storing a mapping between the allocated portion of the generated embedded interaction code pattern and the page, wherein the mapping is not stored within a version of the electronic document; and
printing a page of the electronic document at least in part by,
using a stored mapping to identify the unique portion of the generated embedded interaction code pattern associated with the page, and
executing at least one postscript command to print the identified unique portion of the generated embedded interaction code pattern.

21. The method of claim 20, further comprising:
capturing an image of a first page of a version of the electronic document; and
identifying the first page from which the image was captured based at least in part on a portion of the generated embedded interaction code pattern a stored mapping.

* * * * *